July 27, 1965 P. F. STANLEY ETAL 3,197,618
DATA PROCESSING SYSTEM
Filed Dec. 12, 1958 42 Sheets-Sheet 1

INVENTORS
PAUL F. STANLEY
FERDINAND G. von KUMMER
BY
ATTORNEYS

July 27, 1965    P. F. STANLEY ETAL    3,197,618
DATA PROCESSING SYSTEM
Filed Dec. 12, 1958    42 Sheets-Sheet 2

Fig.2

| READER | CODE | COMMON | PUNCH |
|---|---|---|---|
| READER TAPE | P | | MAIN POWER |
| TAPE CLEAR | A | KEYBOARD LOCK | PUNCH TAPE |
| INCH | N | READY | INTERLOCK NULLIFY |
| REGENERATE | 8 | EOL STOP | TAPE FEED |
| READER STOP | 4 | EOM STOP | PUNCH OFF |
| READER TO TYPEWRITER | 2 | COMPUTER TYPEWRITER MODE | TYPEWRITER TO PUNCH |
| READER TO COMPUTER | 1 | | COMPUTER TO PUNCH |

INVENTORS
PAUL F. STANLEY
FERDINAND G. von KUMMER
BY
ATTORNEYS

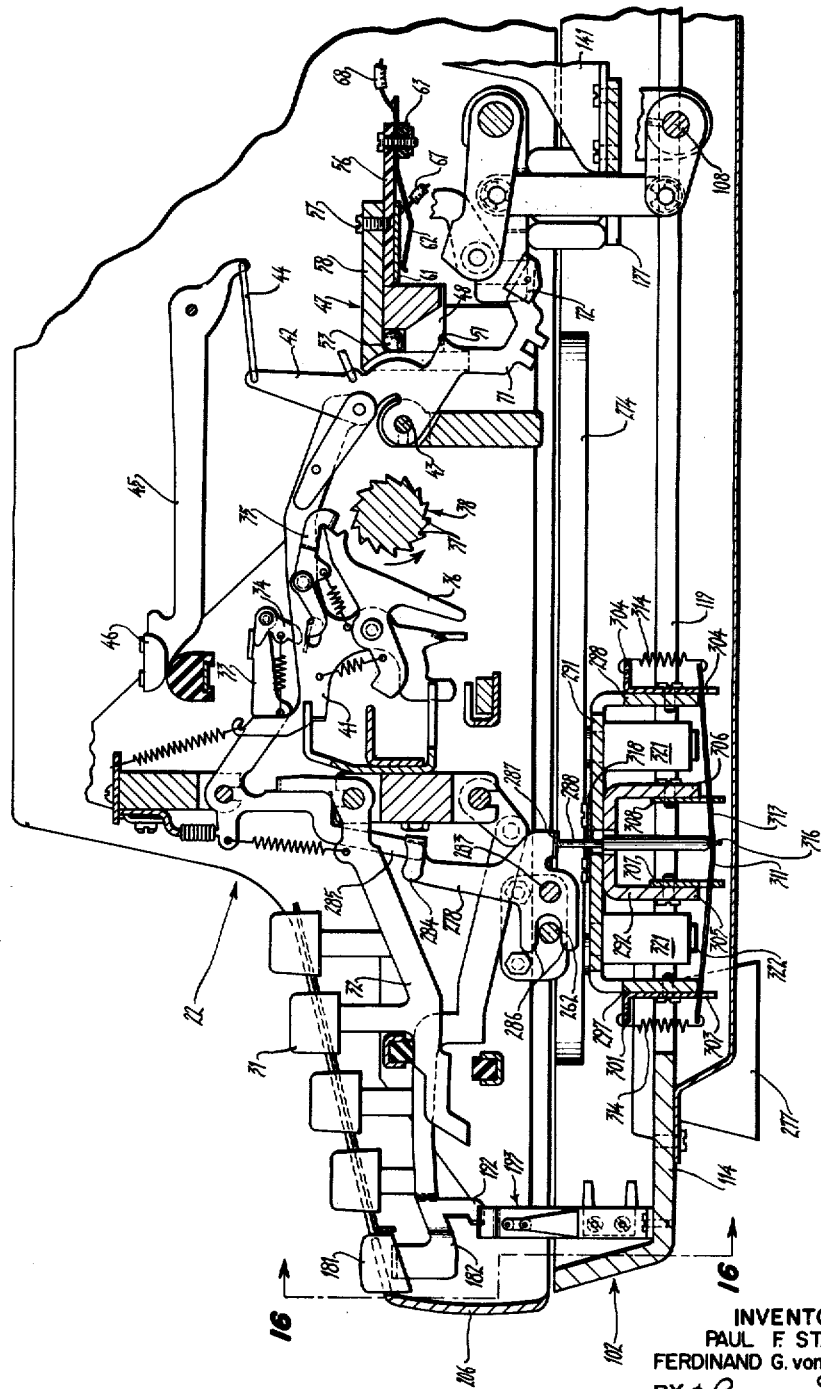

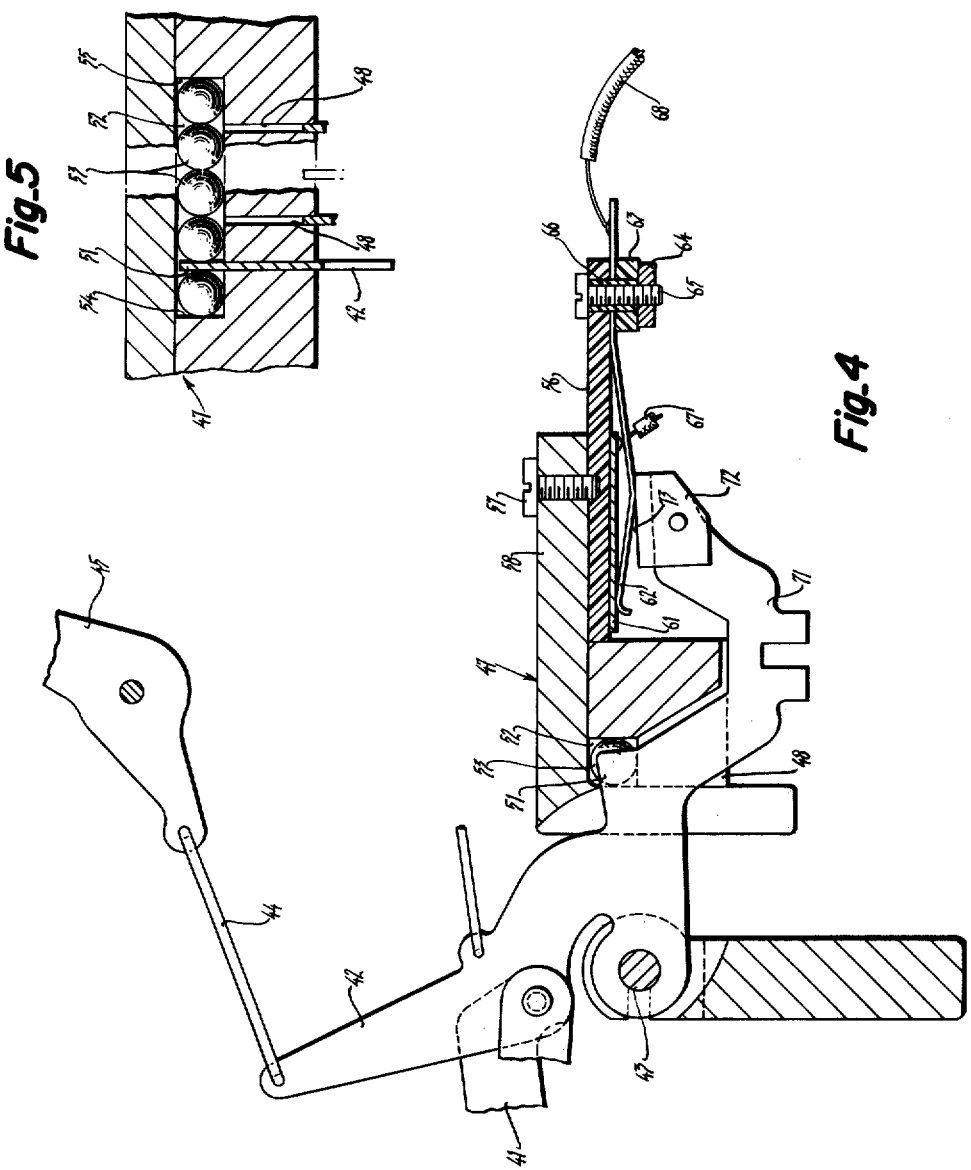

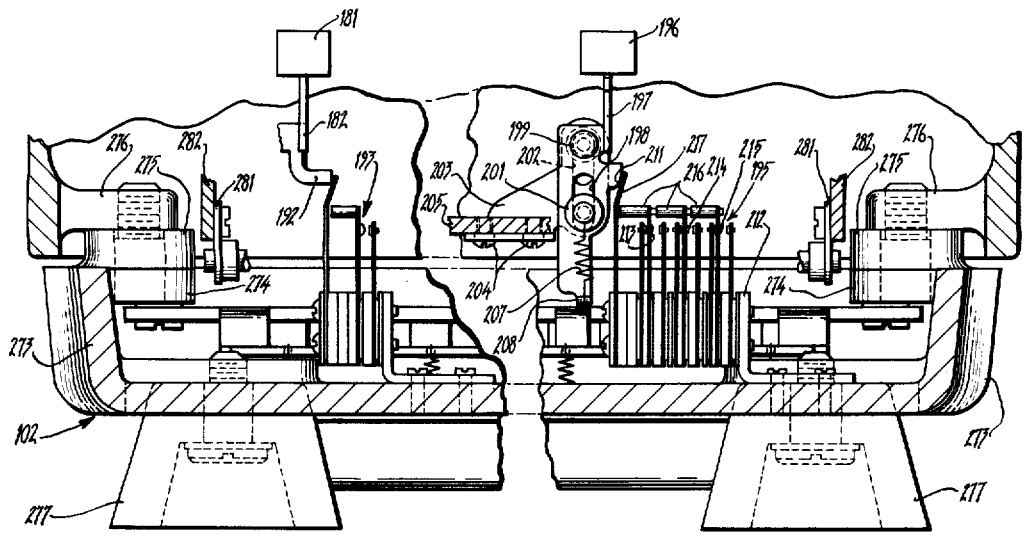
Fig_16
Fig_7
Fig_6
INVENTORS
PAUL F. STANLEY
FERDINAND G. von KUMMER
BY Thomas S. Ross
ATTORNEYS July 27, 1965 P. F. STANLEY ETAL 3,197,618
DATA PROCESSING SYSTEM
Filed Dec. 12, 1958 42 Sheets-Sheet 6

INVENTORS
PAUL F. STANLEY
FERDINAND G. von KUMMER
BY Thomas S. Ross
ATTORNEYS

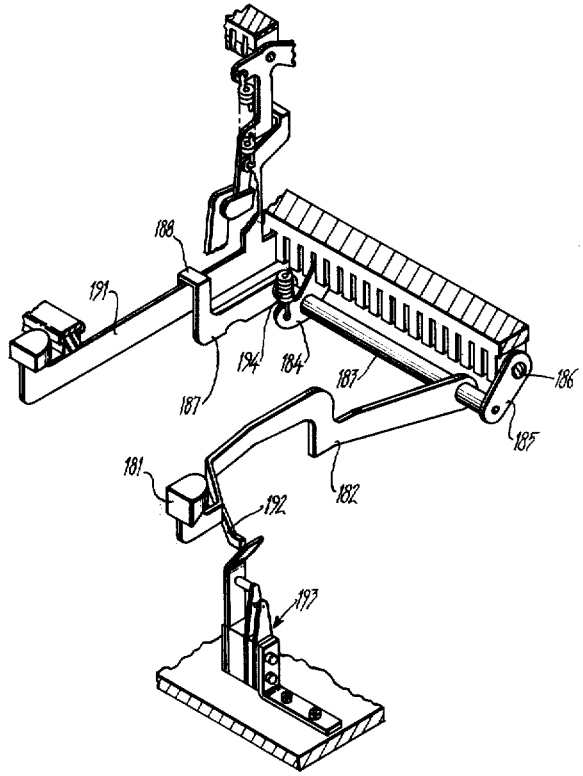
Fig_12
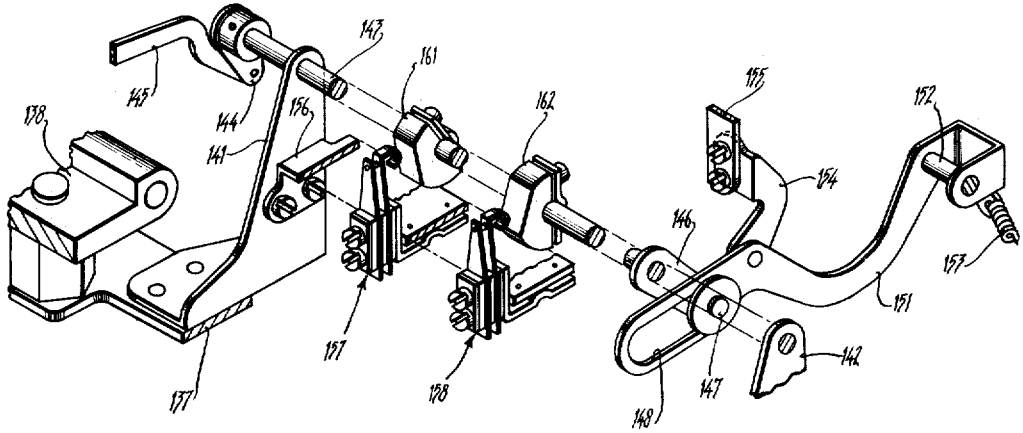
Fig_13
INVENTORS
PAUL F. STANLEY
FERDINAND G. von KUMMER
BY Thomas S. Ross
ATTORNEYS

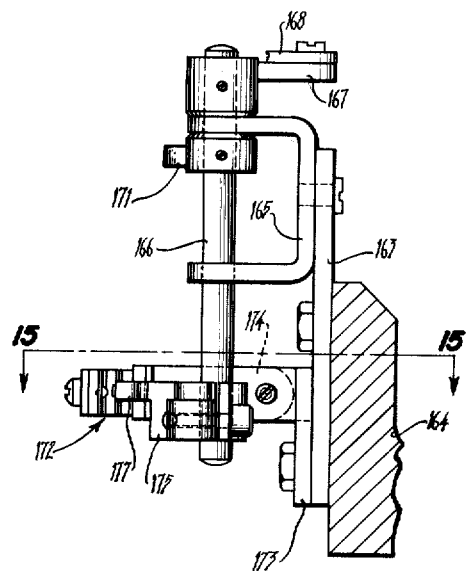
Fig_14
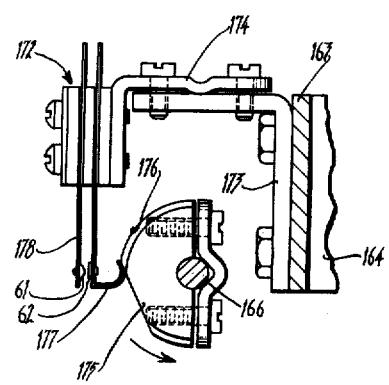
Fig_15
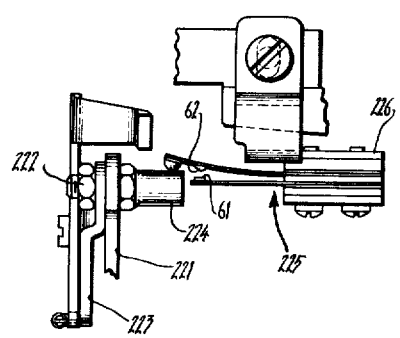
Fig_17
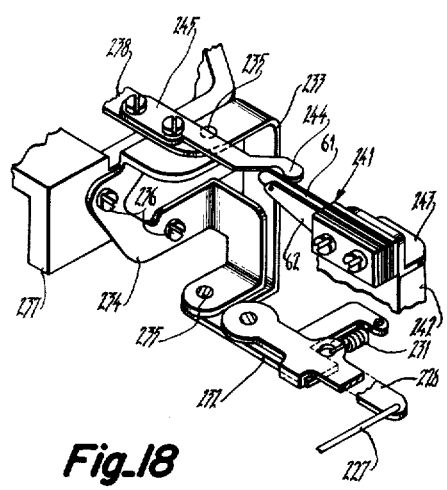
Fig_18

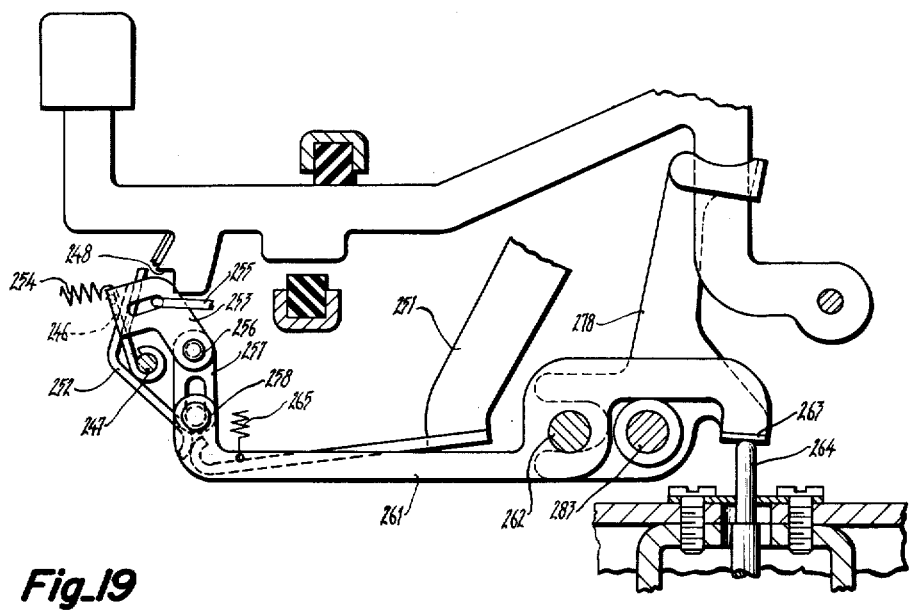
Fig_19
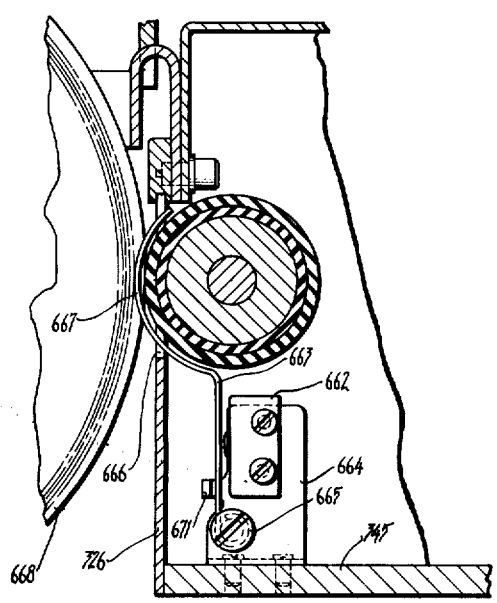
Fig_43

INVENTORS
PAUL F. STANLEY
FERDINAND G. von KUMMER
BY Thomas S. Ross
ATTORNEYS

July 27, 1965 P. F. STANLEY ETAL 3,197,618
DATA PROCESSING SYSTEM
Filed Dec. 12, 1958 42 Sheets-Sheet 15

INVENTORS
PAUL F. STANLEY
FERDINAND G. von KUMMER
BY Thomas S. Ross
ATTORNEYS

July 27, 1965    P. F. STANLEY ETAL    3,197,618
DATA PROCESSING SYSTEM

Filed Dec. 12, 1958    42 Sheets-Sheet 16

INVENTORS
PAUL F. STANLEY
FERDINAND G. von KUMMER

BY Thomas S. Ross
ATTORNEYS

INVENTORS
PAUL F. STANLEY
FERDINAND G. von KUMMER
BY Thomas S. Ross
ATTORNEYS.

INVENTORS
PAUL F. STANLEY
FERDINAND G. von KUMMER
BY Thomas S. Ross
ATTORNEYS

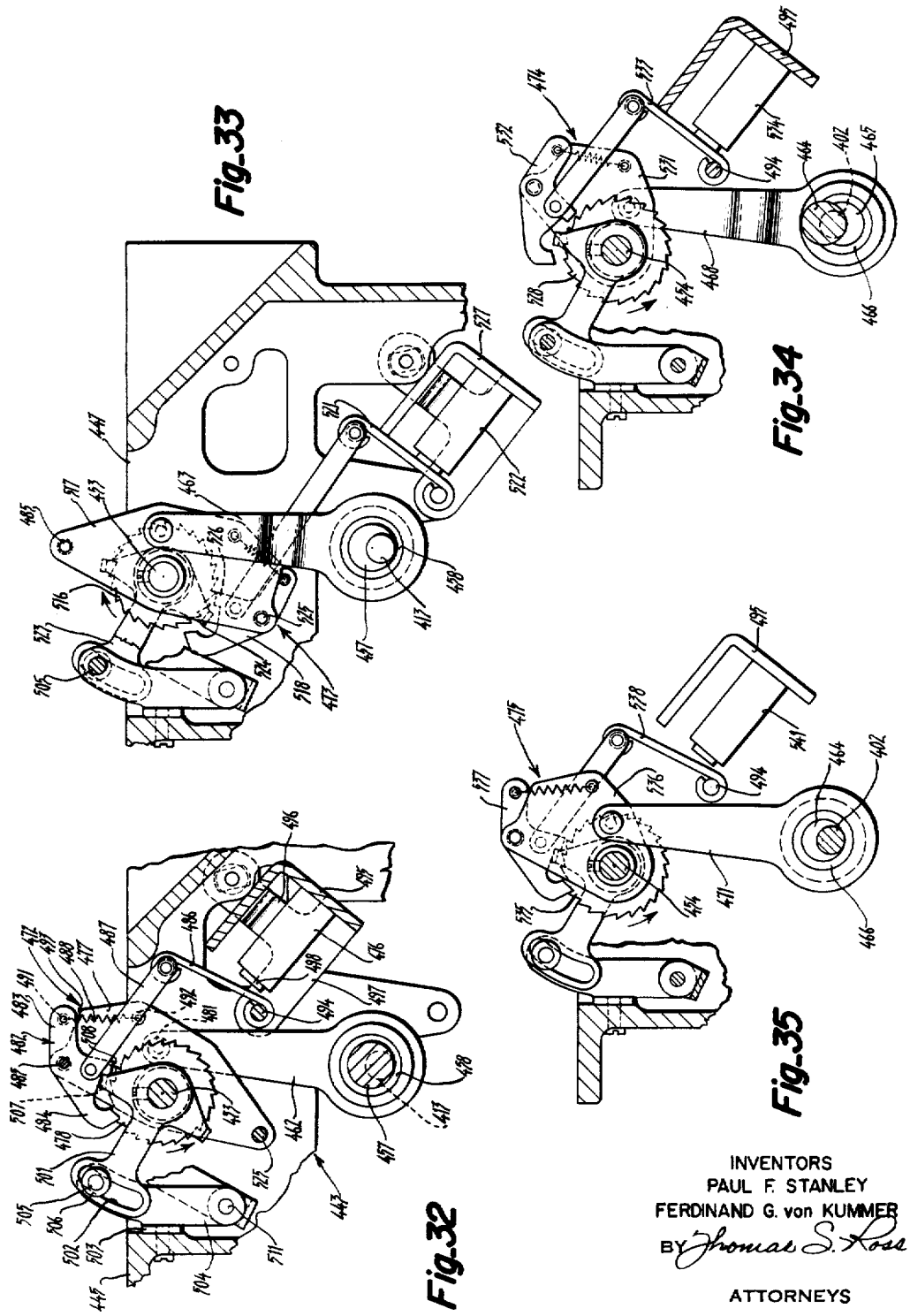

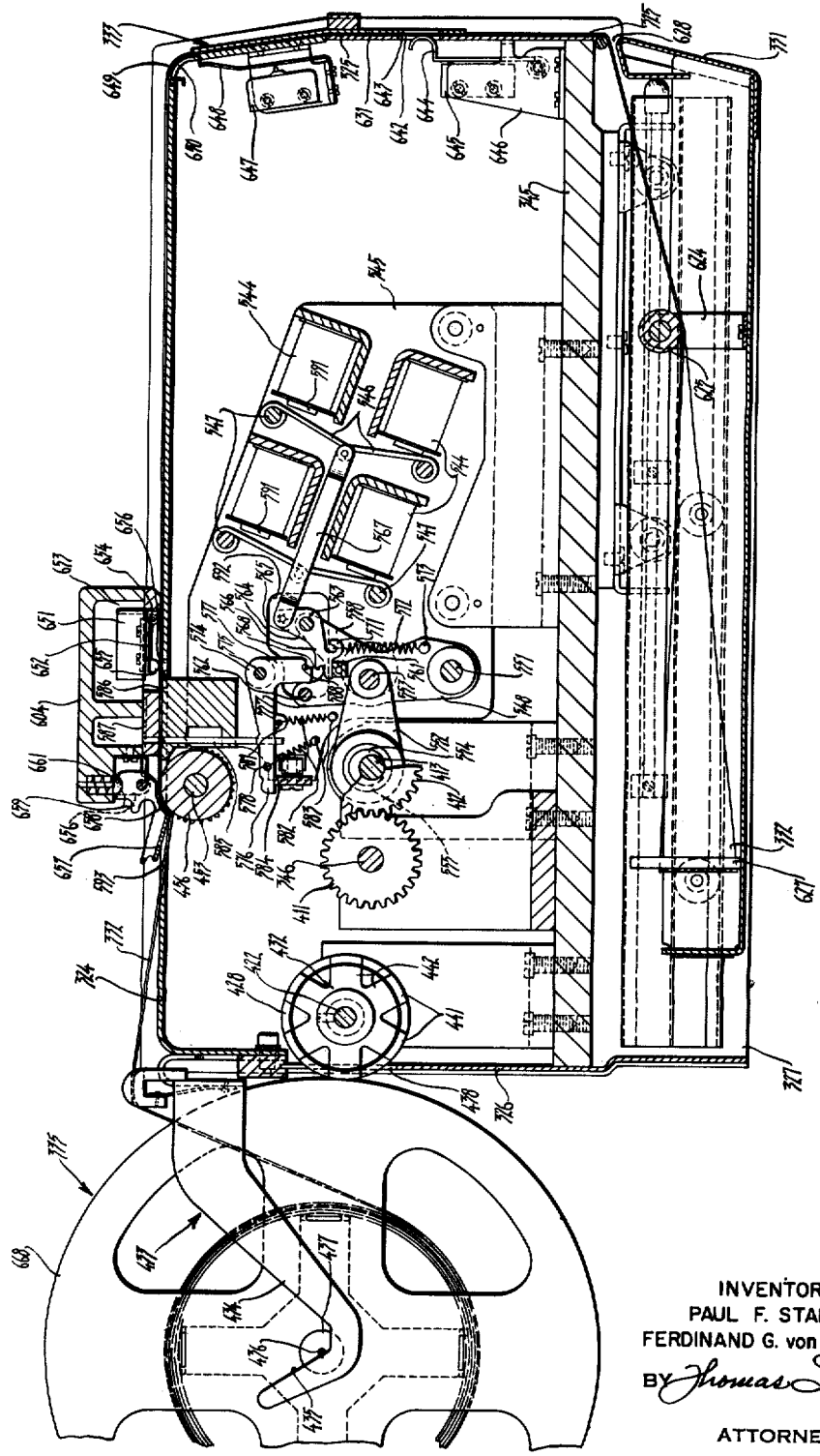

July 27, 1965

P. F. STANLEY ETAL 3,197,618

DATA PROCESSING SYSTEM

Filed Dec. 12, 1958

INVENTORS
PAUL F. STANLEY
FERDINAND G. von KUMMER

BY Thomas S. Ross

ATTORNEYS

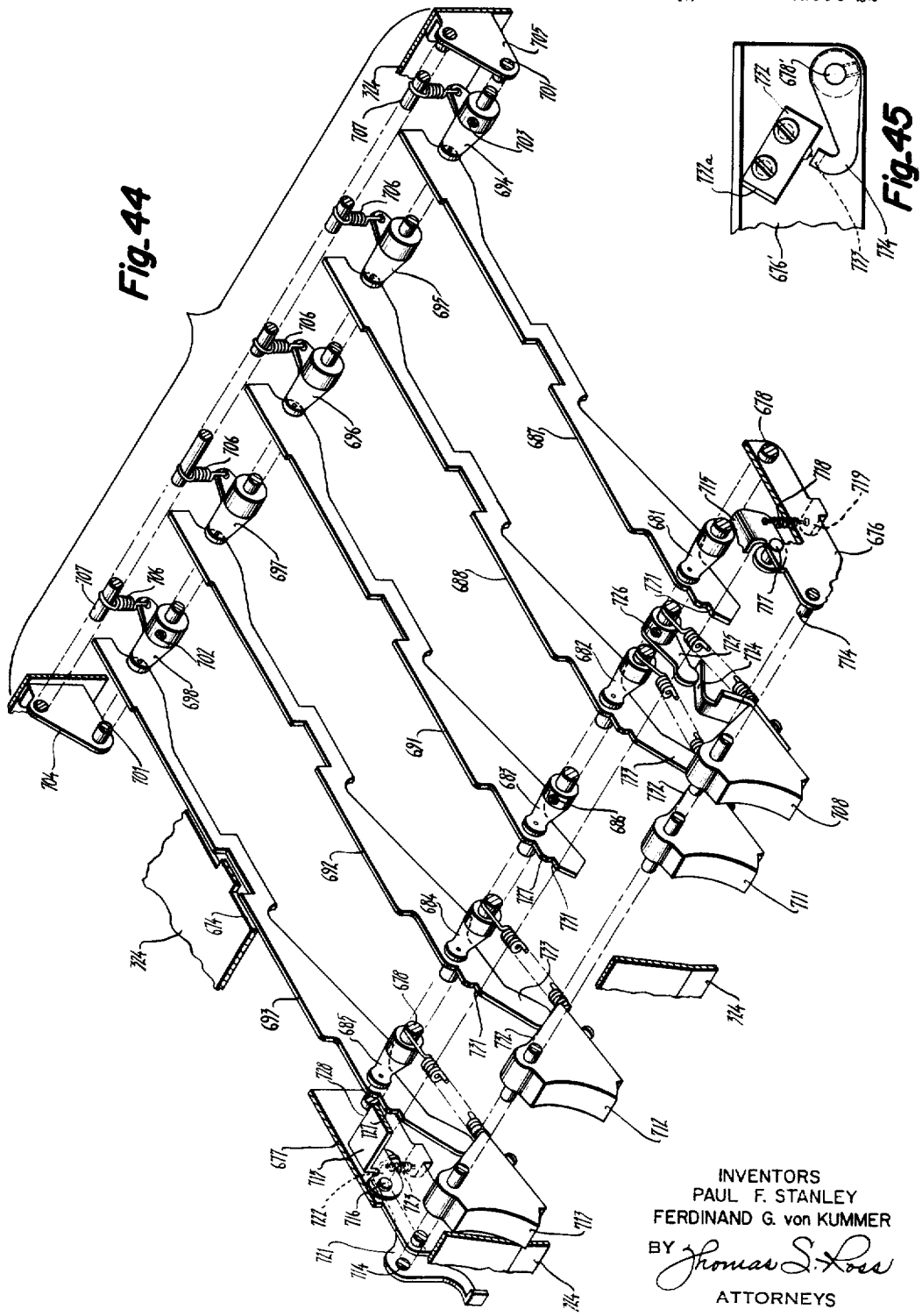

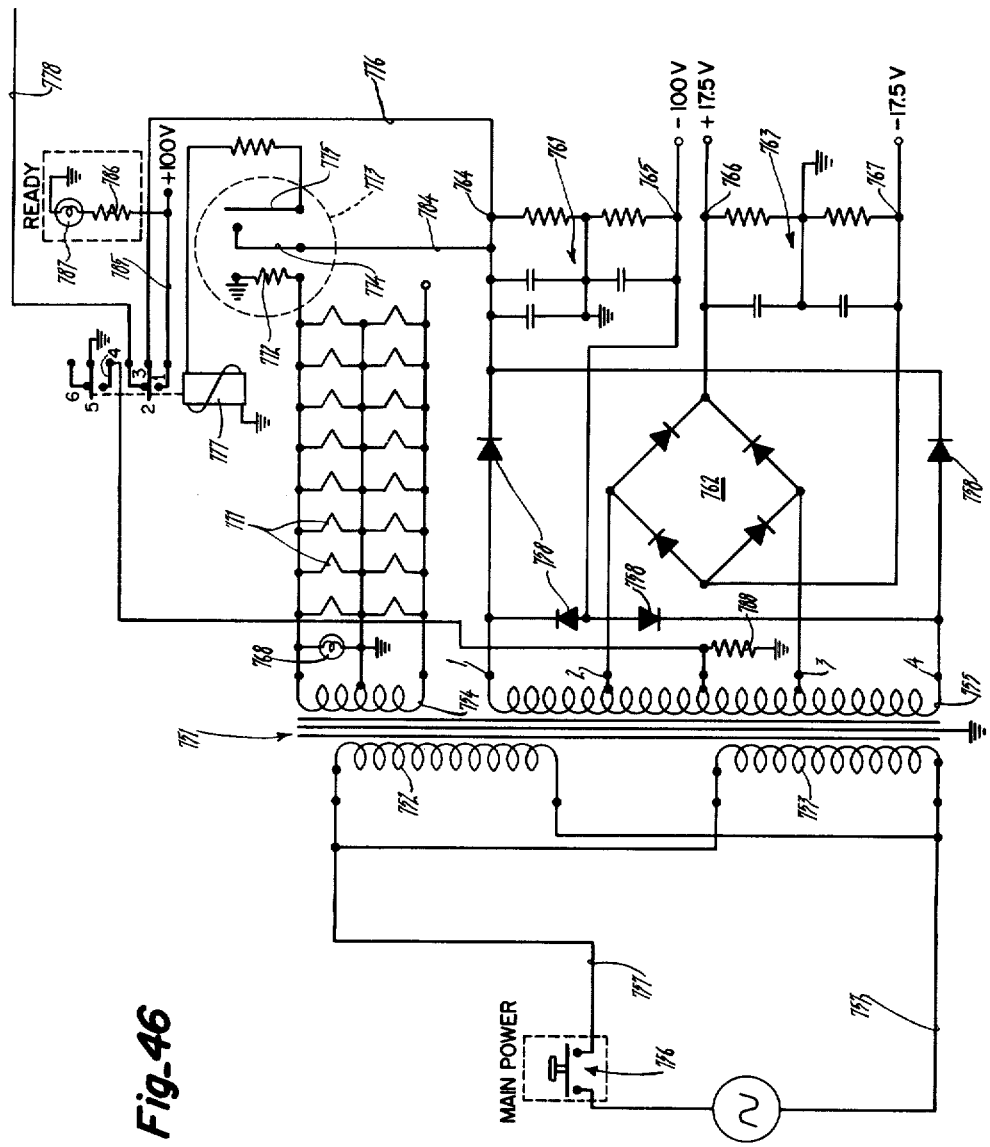

July 27, 1965

P. F. STANLEY ETAL 3,197,618

DATA PROCESSING SYSTEM

Filed Dec. 12, 1958

INVENTORS
PAUL F. STANLEY
FERDINAND G. von KUMMER
BY Thomas S. Ross
ATTORNEYS

July 27, 1965  P. F. STANLEY ETAL  3,197,618
DATA PROCESSING SYSTEM
Filed Dec. 12, 1958  42 Sheets-Sheet 28
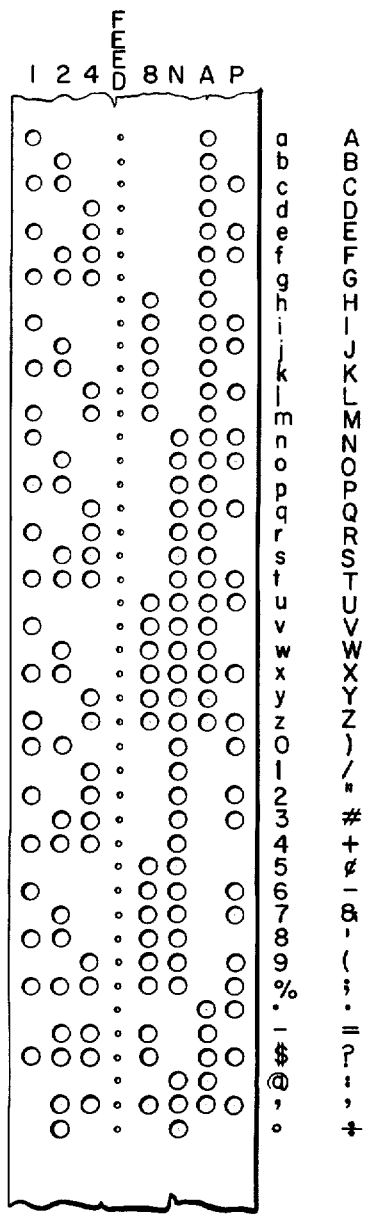
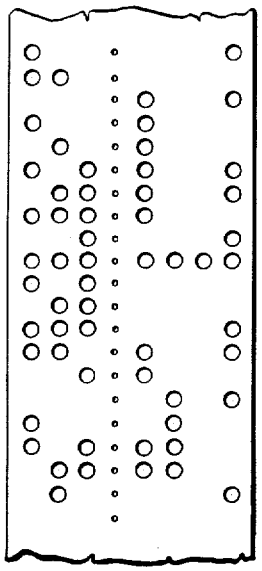
Fig.51
LINE FEED
SPACE
CARRIAGE RETURN
E.O.M.(STOP) □ ✱
VOID (△▽)
TAB.
UPPER CASE
LOWER CASE
BACK SPACE
  NULL
INVENTORS
PAUL F. STANLEY
FERDINAND G. von KUMMER
BY *Thomas S. Ross*
ATTORNEYS INVENTORS
PAUL F. STANLEY
FERDINAND G. von KUMMER
BY Thomas S. Ross
ATTORNEYS

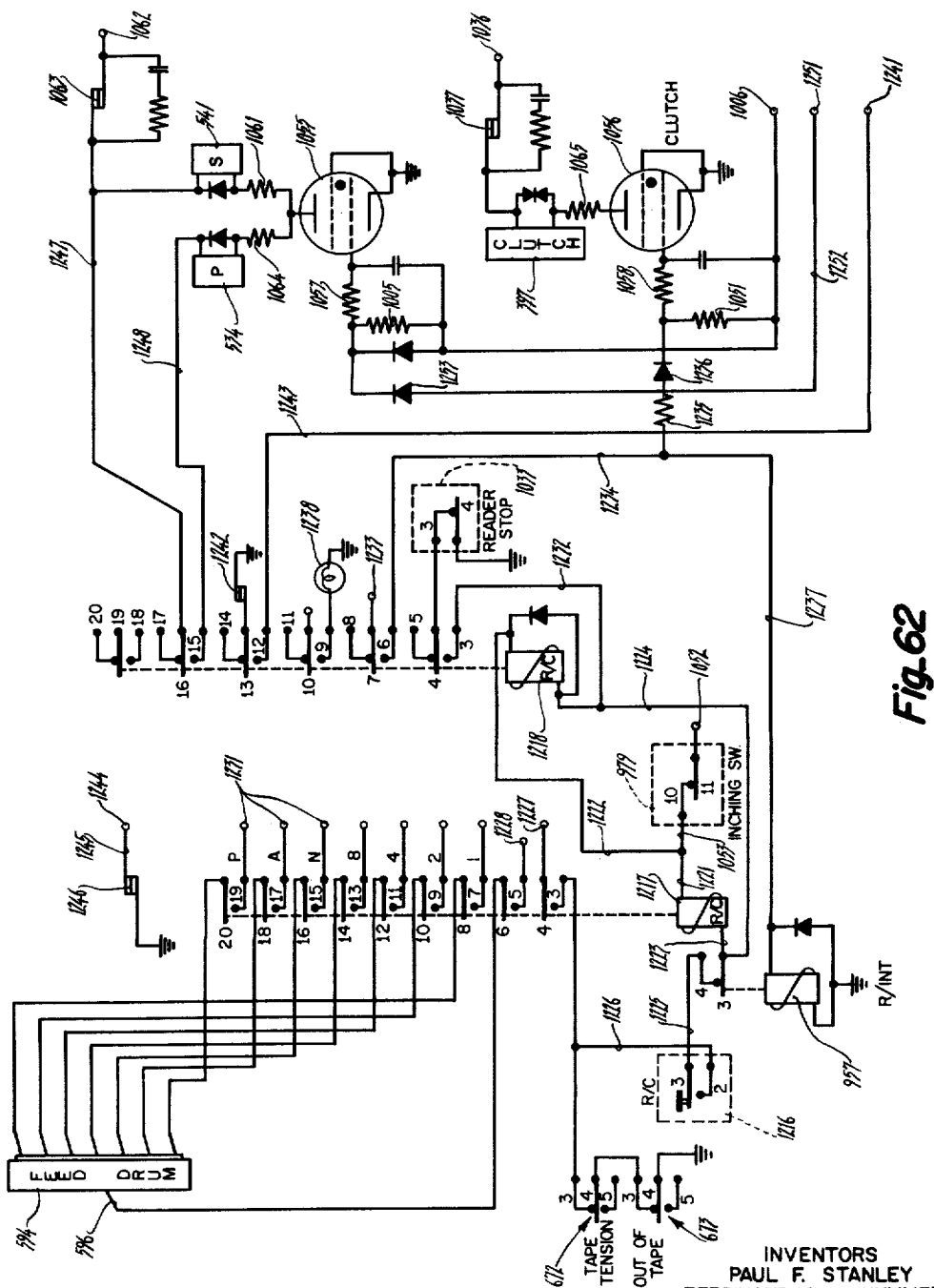

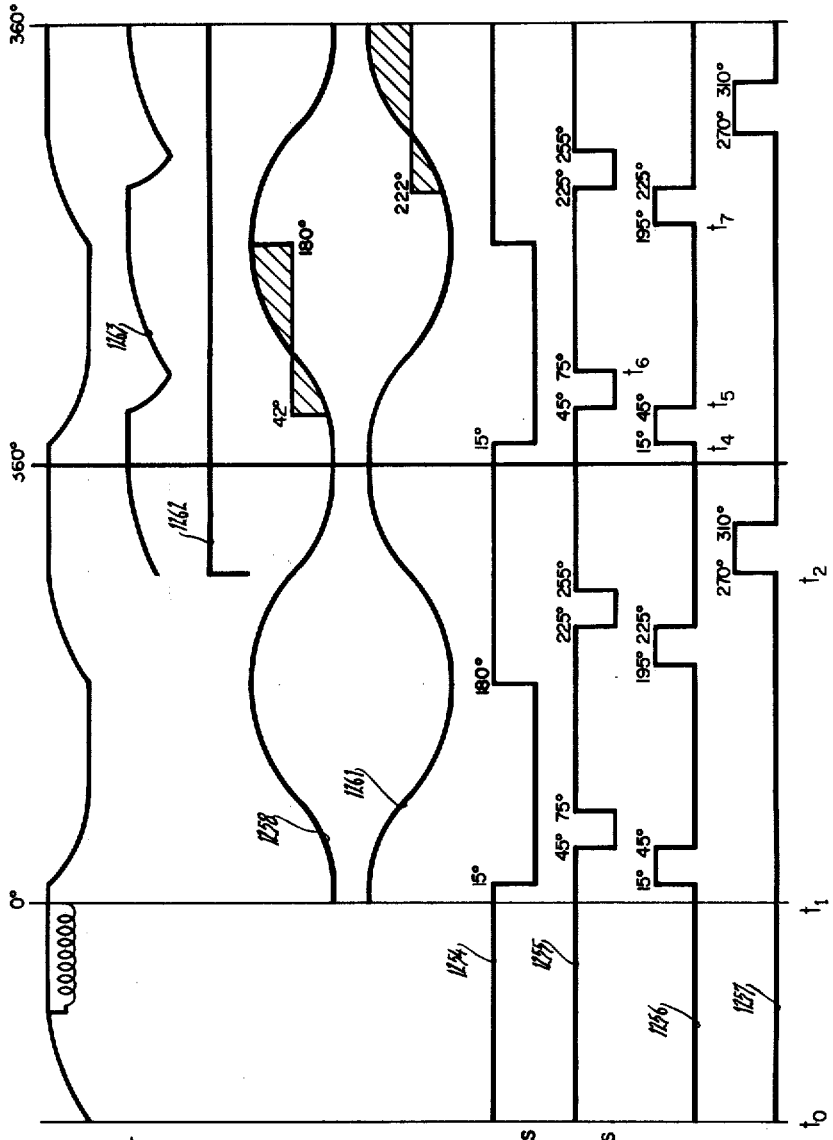

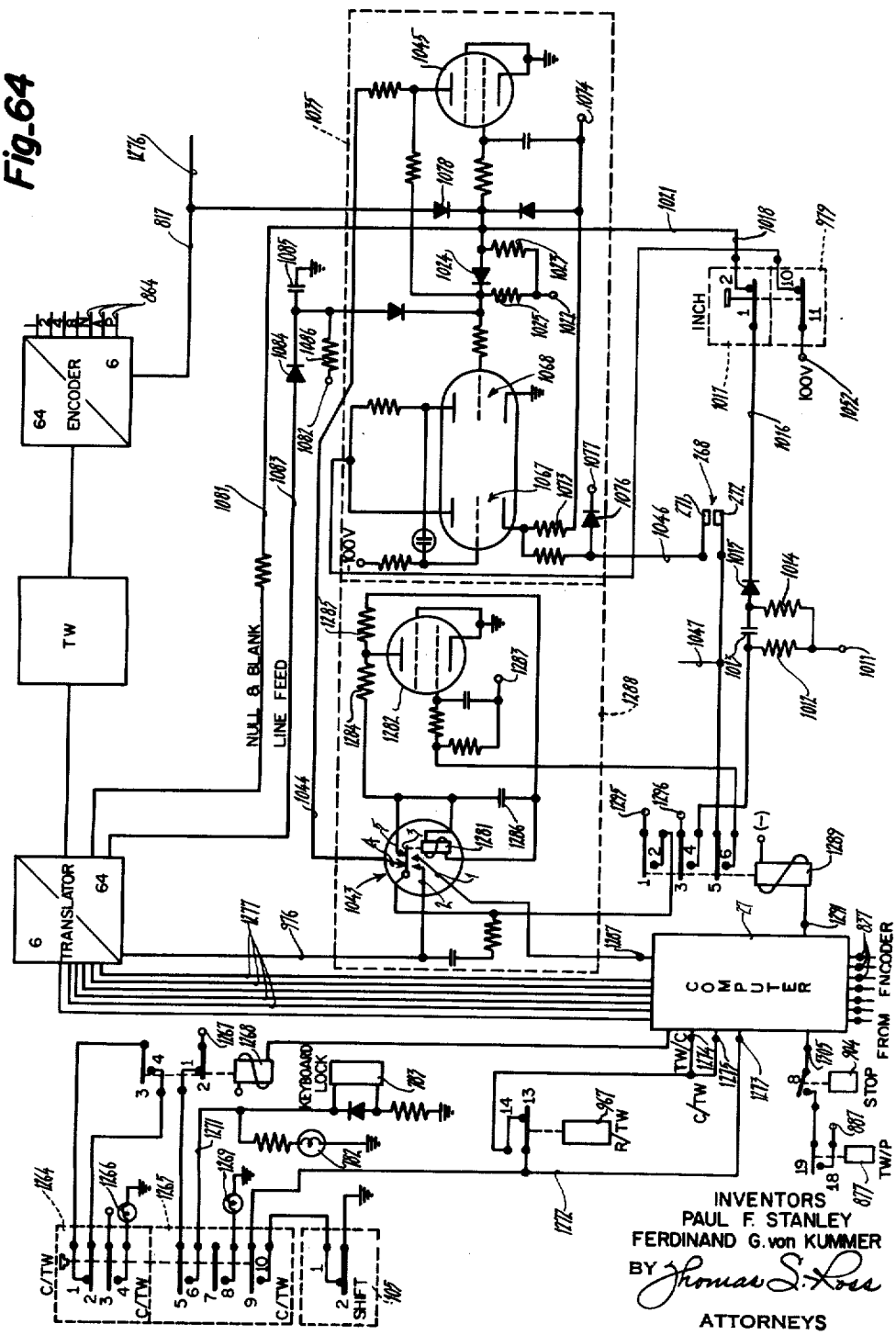

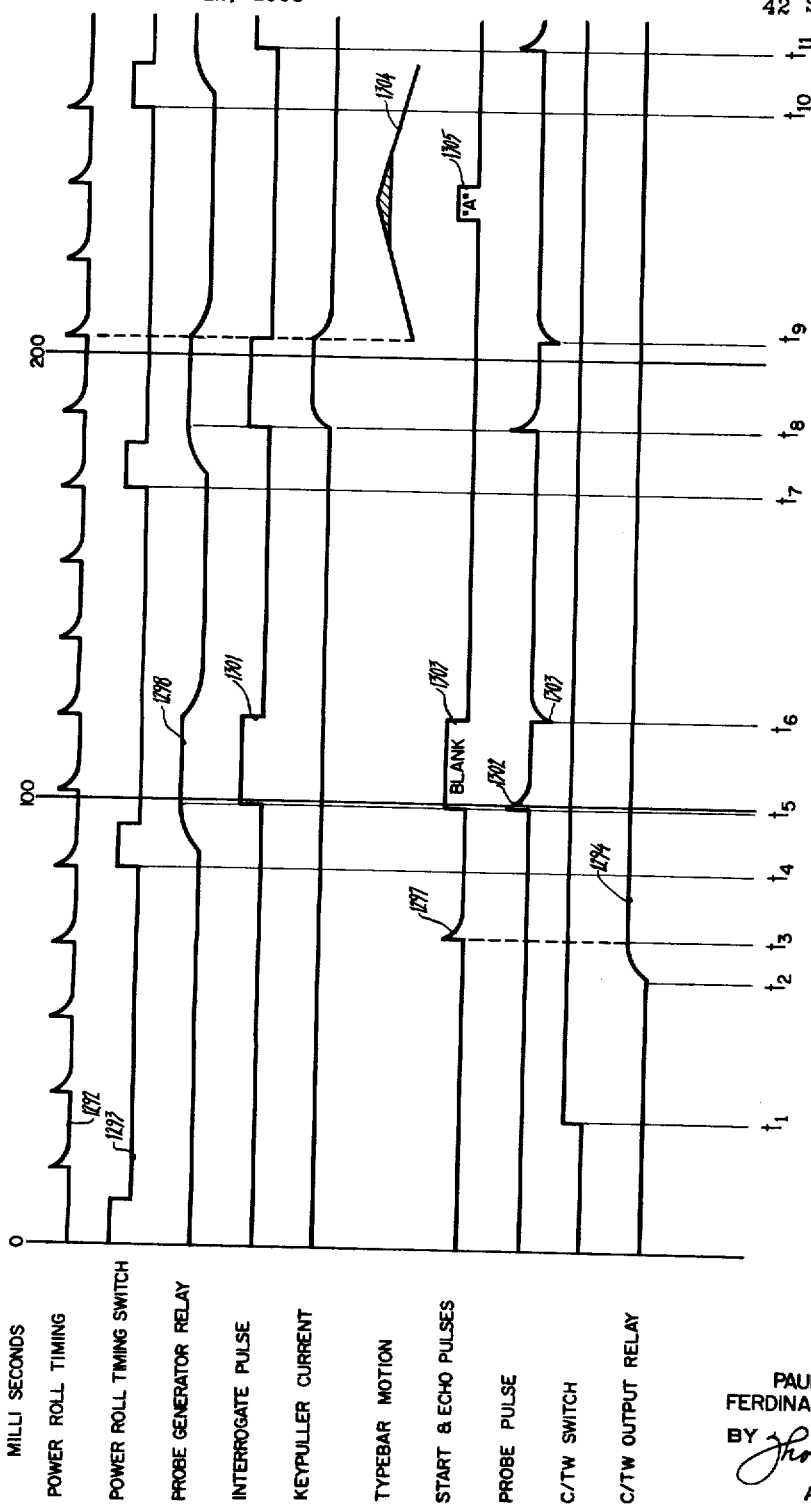

United States Patent Office 3,197,618
Patented July 27, 1965

3,197,618
DATA PROCESSING SYSTEM
Paul F. Stanley, West Hartford, and Ferdinand G. von Kummer, Bloomfield, Conn., assignors to Royal McBee Corporation, Port Chester, N.Y., a corporation of New York
Filed Dec. 12, 1958, Ser. No. 780,090
19 Claims. (Cl. 235—61.6)

This invention relates to data processing systems; more particularly it relates to an automatic electronic data processing system having a plurality of units associated with one another in a manner such that combinations of one or more of them may be selectively energized and controlled to perform a wide variety of data processing operations; and specifically it relates to an automatic electronic data processing system in which selected component units are operatively interconnected and controllable to perform a particular data processing operation through operator controlled switches.

Although many data processing systems are known and presently in use many are bulky, cumbersome and expensive; others are operative only with their own particular machine language and are therefore not compatible with conventional data processing machine language; others are deficient in that the functions which they can perform are limited; and still others are deficient in that they are not sufficiently fail safe.

In the present invention there is provided an integral data processing system comprising a plurality of units, namely a typewriter, an encoder, a punch unit, a decoder, a reader unit and a computer which are statically connected through electrical circuitry and which are operable in a wide variety of combinations to perform a variety of functions. The particular combinations of units that are to work together to perform a desired data processing operation are operatively connected through selective energization of said circuitry by an operator. As will be more apparent infra, each combination of units operatively connected to perform a desired data processing operation forms an electromechanical loop whereby a malfunction in any part of the loop stops the operation of the loop. Further the mechanism of the units are so constructed, arranged, and integrated with control circuitry that synchronization of operation between units having different rates of operation is achieved automatically whereby the processing of data may be accomplished expeditiously at very high rates of speed. A further feature of the invention is in the provision of a system of interlocks which prevent placing into operation a combination of units which is inconsistent with another combination of units previously selected, without first stopping the operation of said combination of units previously selected.

The common language medium which is utilized in the present system comprises punched paper tapes or cards and the system is compatible with punched tapes or cards wherein data is represented by 5, 6, 7 or 8 level codes. A further feature of the invention resides in the fact that tapes may be perforated at rates up to 30 characters per second in response to signals from a typewriter reader or computer. Also tapes may be read at rates up to 60 characters per second under the direction of a digital computer. Additionally the units of the invention are so arranged and connected that errors in punched tapes may be easily corrected.

Accordingly it is an object of the invention to provide a highly versatile data processing system.

Another object of the invention is the provision of a data processing system which is compatible with conventional communications coded records whether 5, 6, 7 or 8 level.

Another object is the provision of data processing system wherein the flow of data may be accomplished at rapid rates of speed.

Another object of the invention is to provide a punched tape data processing system which facilitates the correction of errors.

Another object of the invention is to provide a data processing system wherein automatic operation is halted in response to special codes to facilitate the insertion of additional data at any point in a form message.

Another object of the invention is the provision of a data processing system having a plurality of statically connected units selectively operable in predetermined combinations under the control of an operator.

A further object of the invention is the provision of an integral punch-reader unit operable alone to regenerate tapes, operable with a business machine connected to its input and/or output, or operable with a computer connected to its input and/or output.

A further object of the invention is the provision of an automatic data handling system wherein data in conventional form may be simultaneously printed, converted to coded form, and stored in a perforated record.

A further object of the invention is the provision of a system wherein record malfunctions are indicated simultaneously with the disabling of the system punching and sensing mechanisms in the event of record malfunctioning.

Another object of the invention is to provide a data processing system including mode interlocks whereby selection of component units operable in a particular combination to perform a selected operation automatically prevents the selection and operation of another combination of units to perform another operation inconsistent with the first selected operation while the first combination is operative.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 2 is a detailed plan view of the control panel of the instant apparatus;

FIG. 3 is a side elevational view in partial section showing a type action and related parts of the typewriter used in connection with the instant apparatus;

FIG. 4 is a detailed fragmentary view in side elevation showing a portion of the electrical signal output means associated with type actions of the instant typewriter;

FIG. 5 is a sectional front elevational view showing the ball lock unit associated with the normal complement of sub levers in the instant typewriter;

FIG. 6 is a side elevational view showing the pertinent portions of the back space linkage and associated switch in the typewriter;

FIG. 7 is a perspective view showing the pertinent portions of the automatic line lock assembly associated with carriage return and an automatic carriage return switch associated therewith;

FIG. 12 is a perspective view showing the construction of the line feed-carriage return key in association with the line feed key linkage of the typewriter;

FIG. 13 is a perspective view showing a portion of the power operated line feed linkage and associated switching means;

FIG. 14 is a side elevational view in partial section showing the pertinent power operated parts of the carriage return linkage and the switch associated therewith;

FIG. 15 is a horizontal sectional view taken along the section line 15—15 of FIG. 14;

FIG. 16 is a vertical sectional view taken along section line 16—16 of FIG. 3 showing switches associated with a line feed-carriage return key and with a special key;

FIG. 17 is a fragmentary top view showing the pertinent power operated parts of the power operated carriage tabulation linkage and the switch associated therewith;

FIG. 18 is a perspective view showing the pertinent parts of the space bar linkage and the switch associated therewith;

FIG. 19 is a side elevational view of the keyboard line lock mechanism of the instant typewriter;

Figure 38:
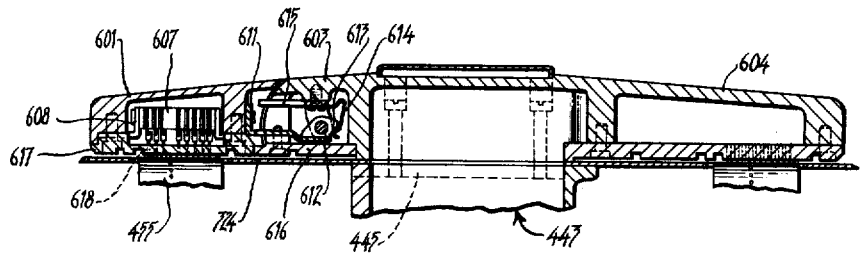
Figure 25:
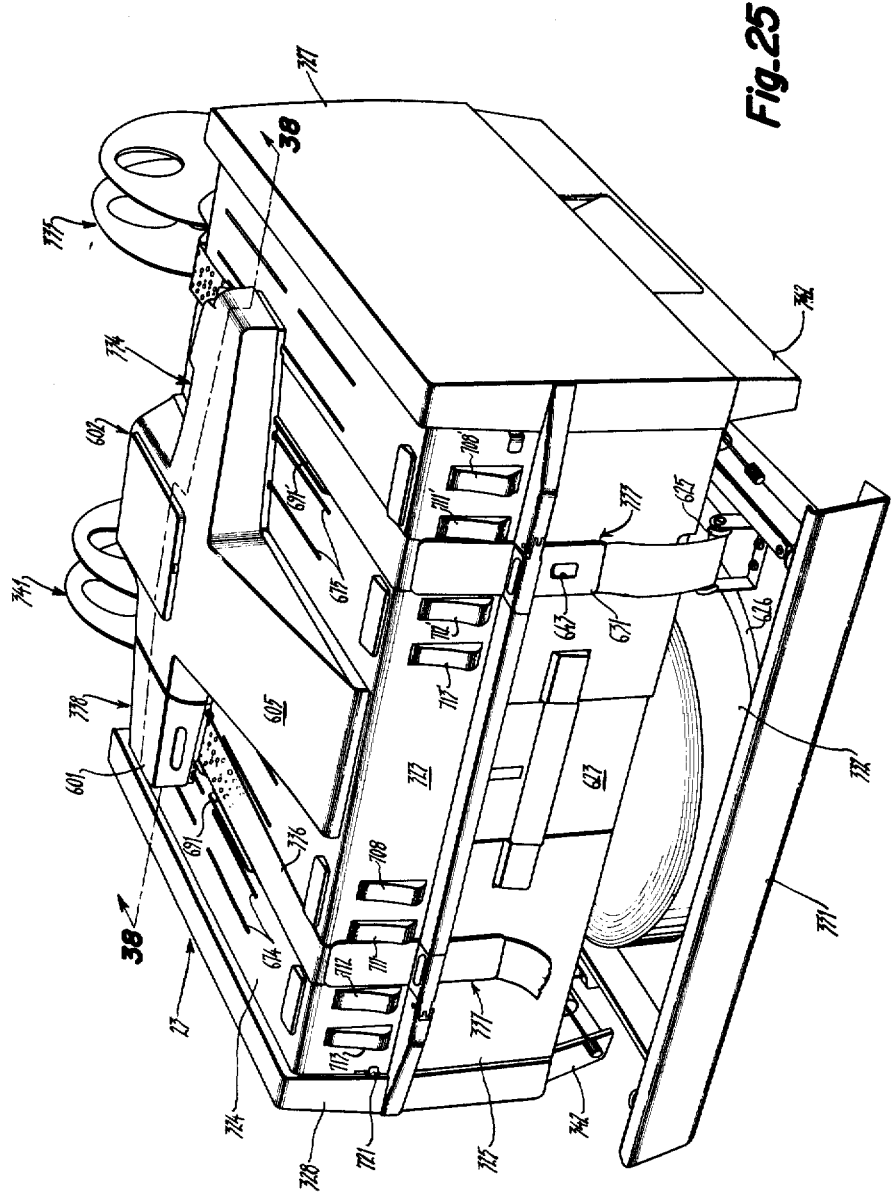
FIG. 25 is an overall perspective view of the reader-punch assembly.
Figure 26:
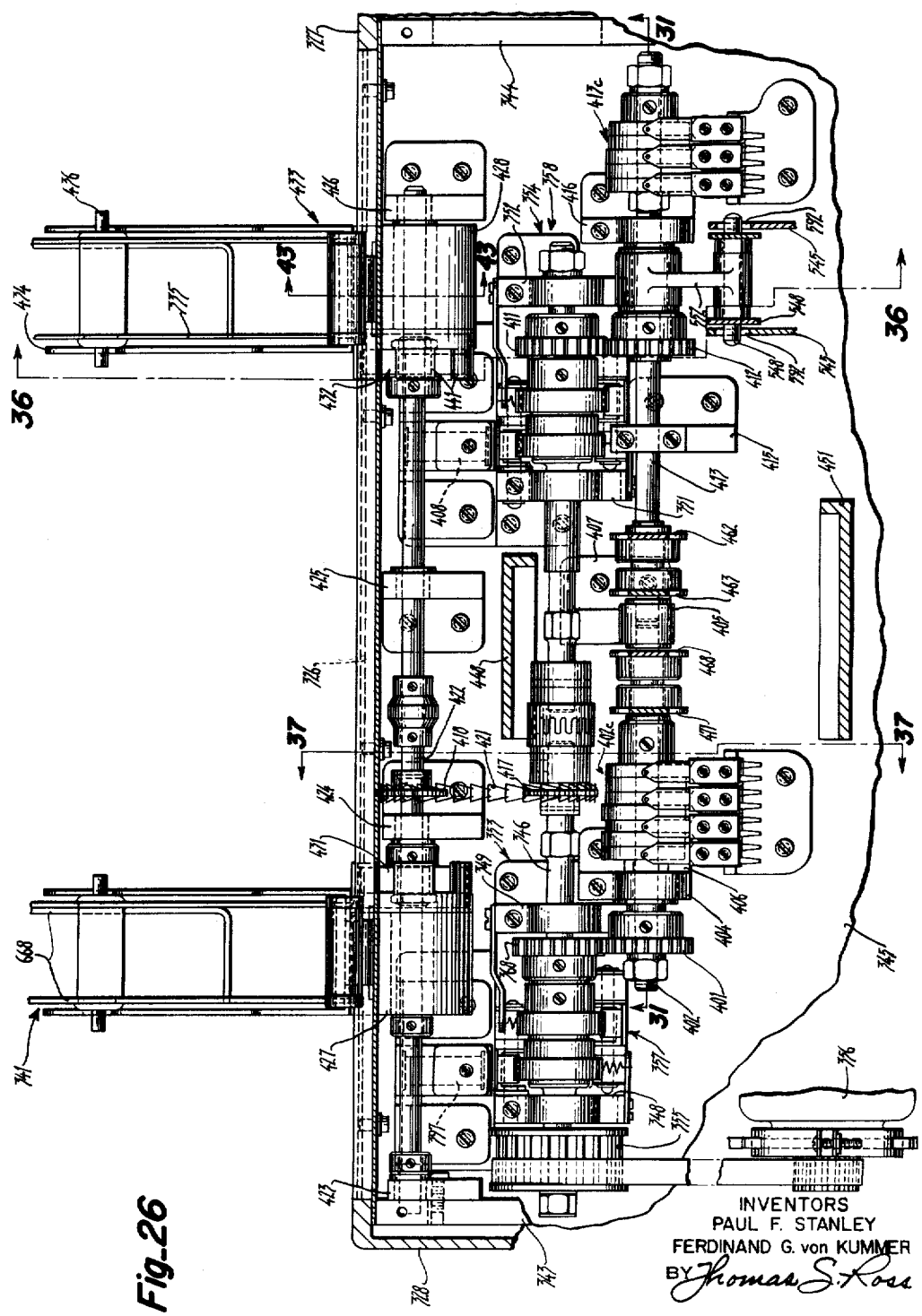
FIG. 26 is a plan view showing the principal drive connections for the reader-punch assembly.
Figure 27:
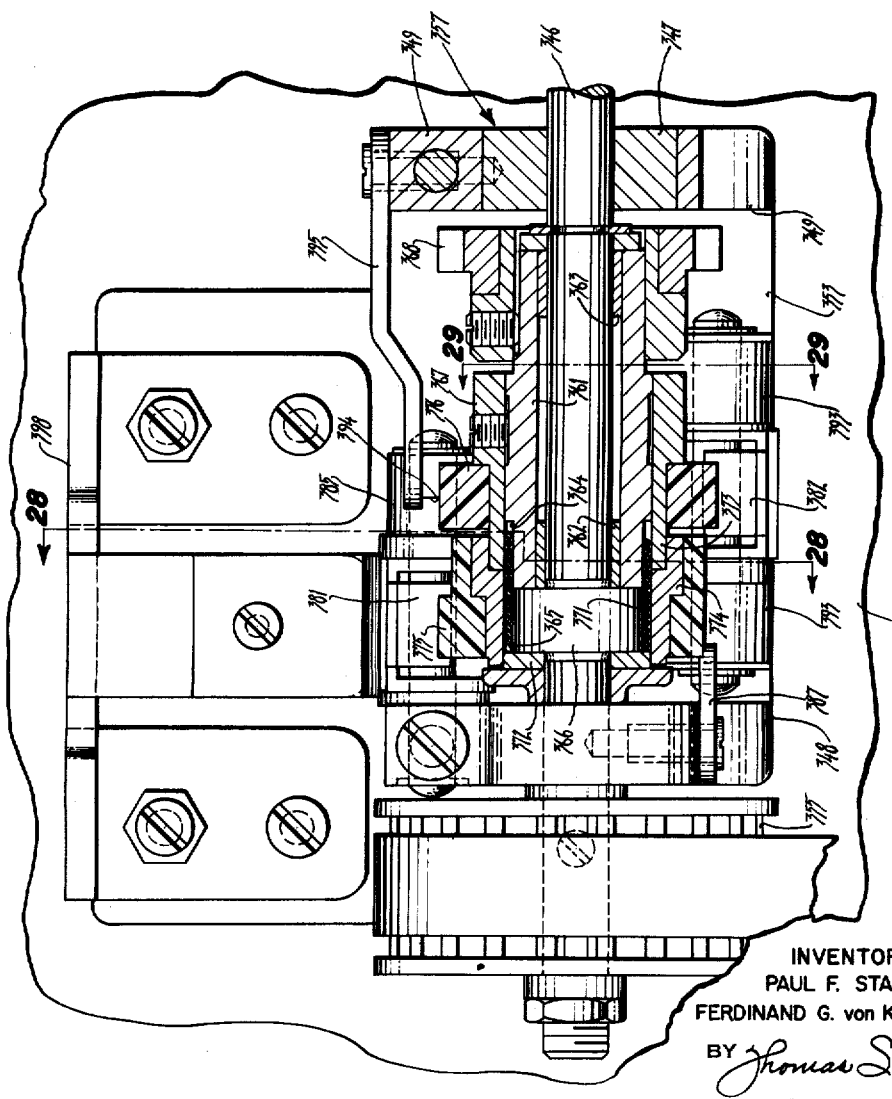
FIG. 27 is a partial axial sectional view showing the construction of one of the wrap spring clutches used in the drive connections of FIG. 26.
Figure 28:
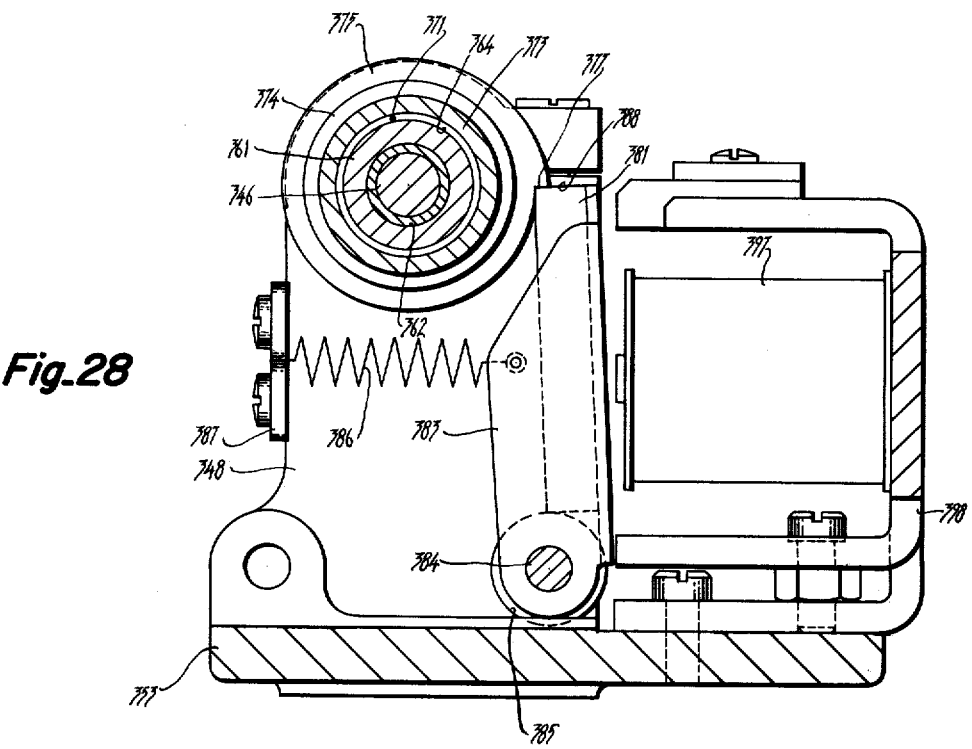
Figure 29:
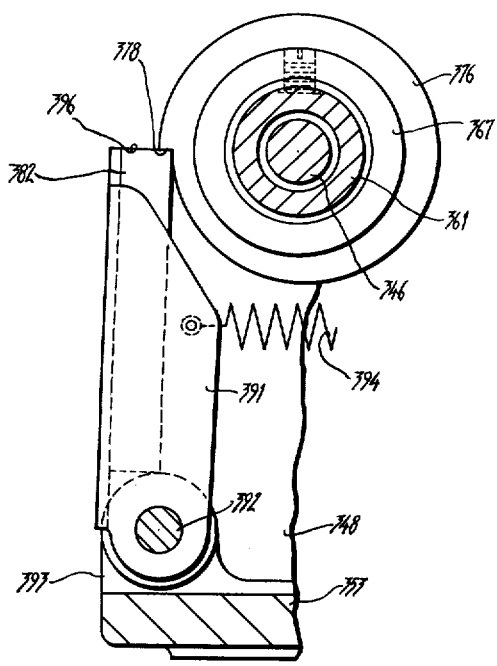
Figure 30:
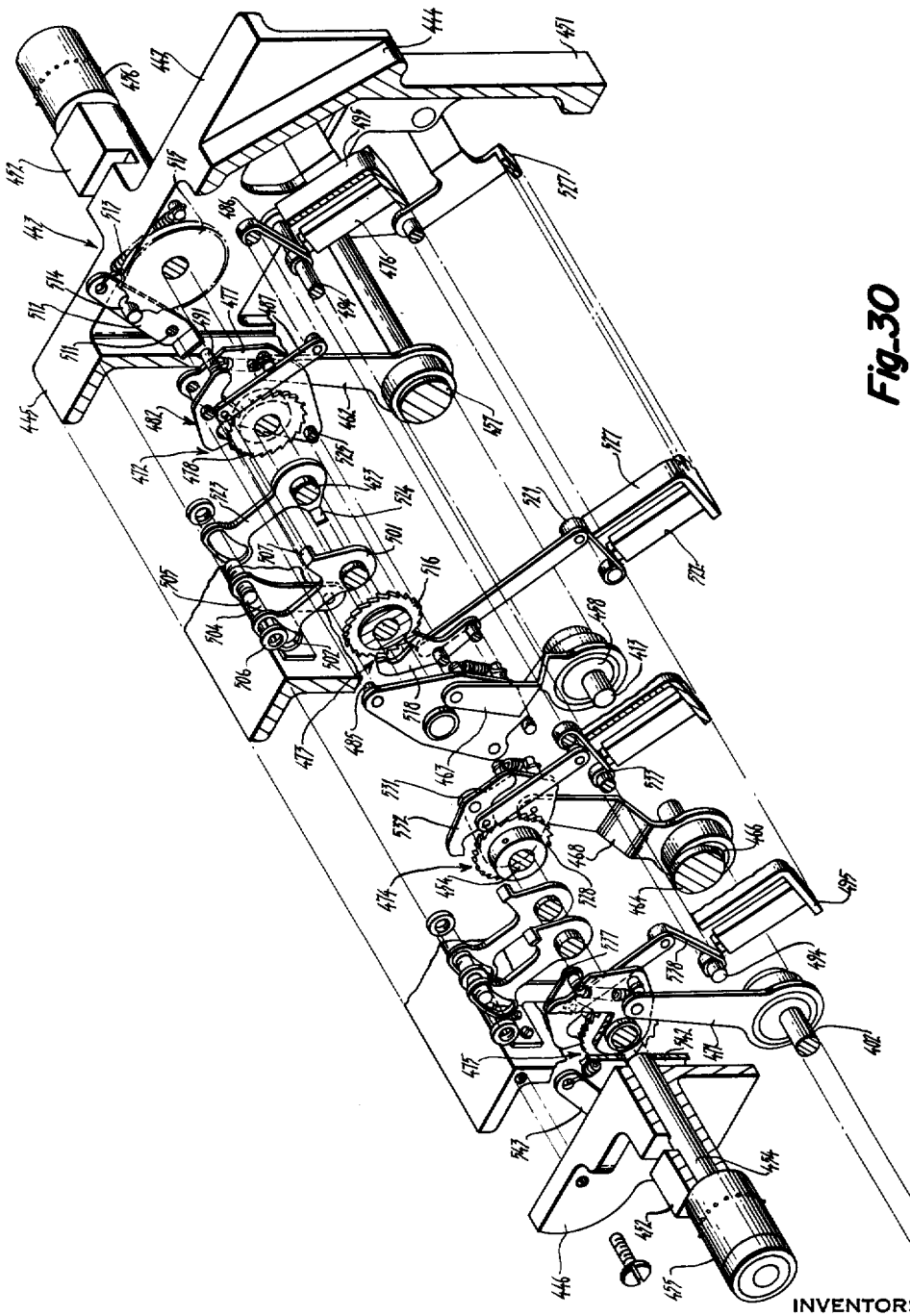
Figure 37:
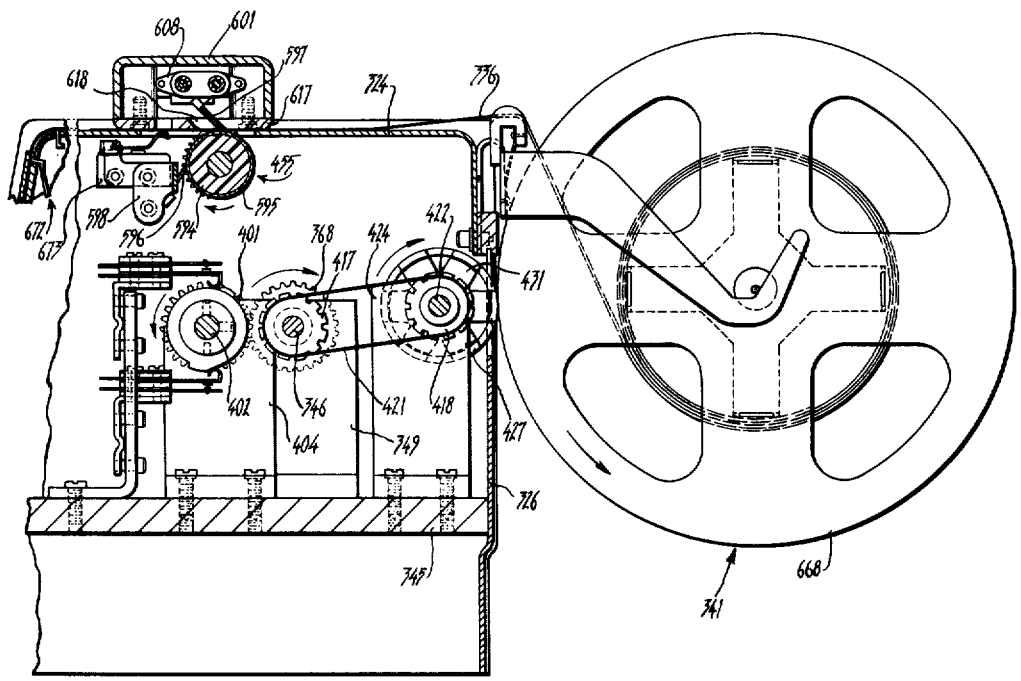
Figure 31:
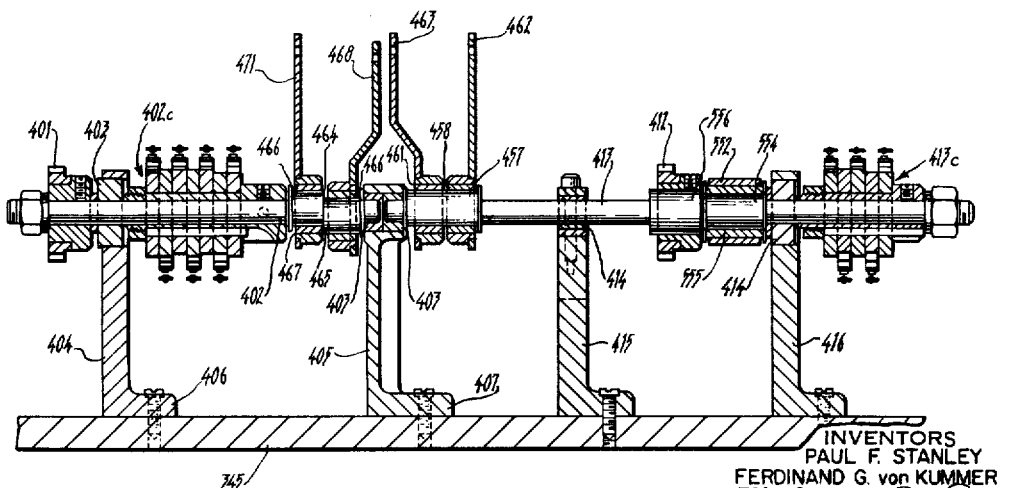
Figure 41:
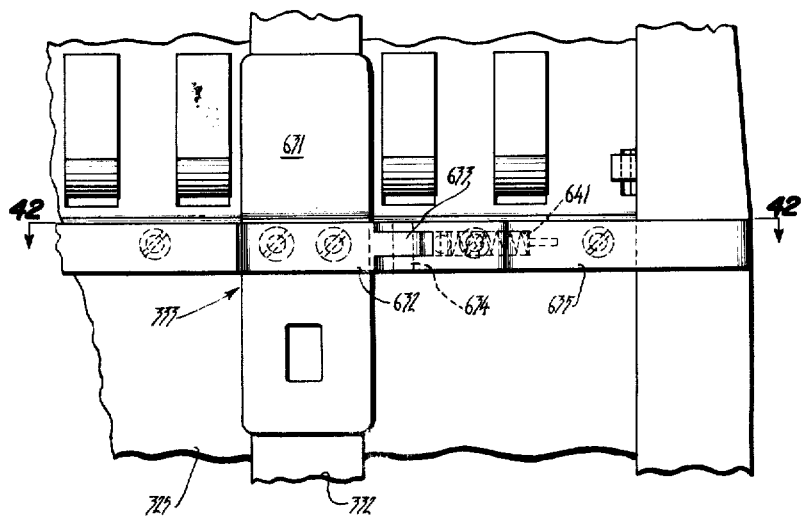
Figure 42:
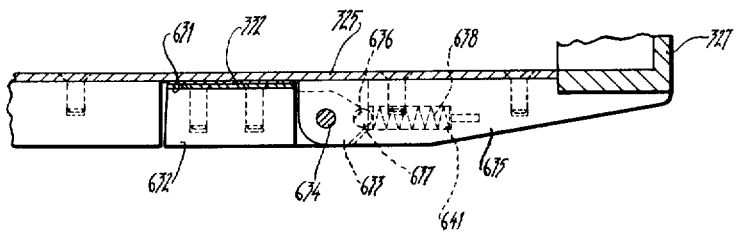
Figure 40:
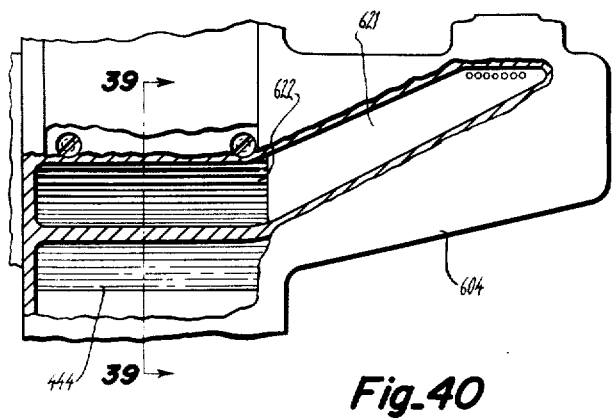
Figure 39:
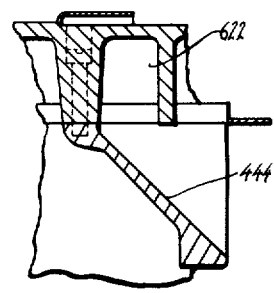
Figure 47:
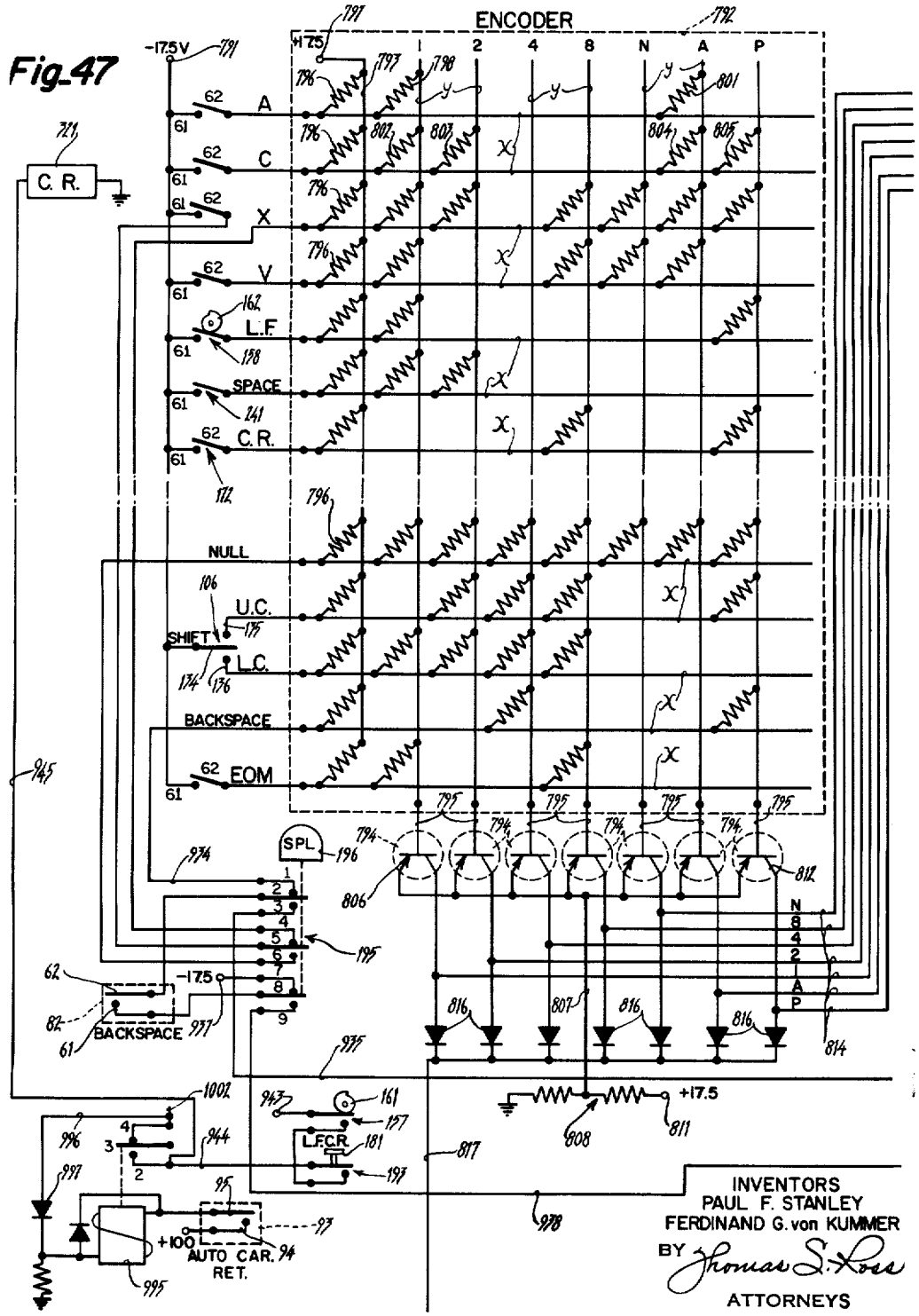
Figure 48:
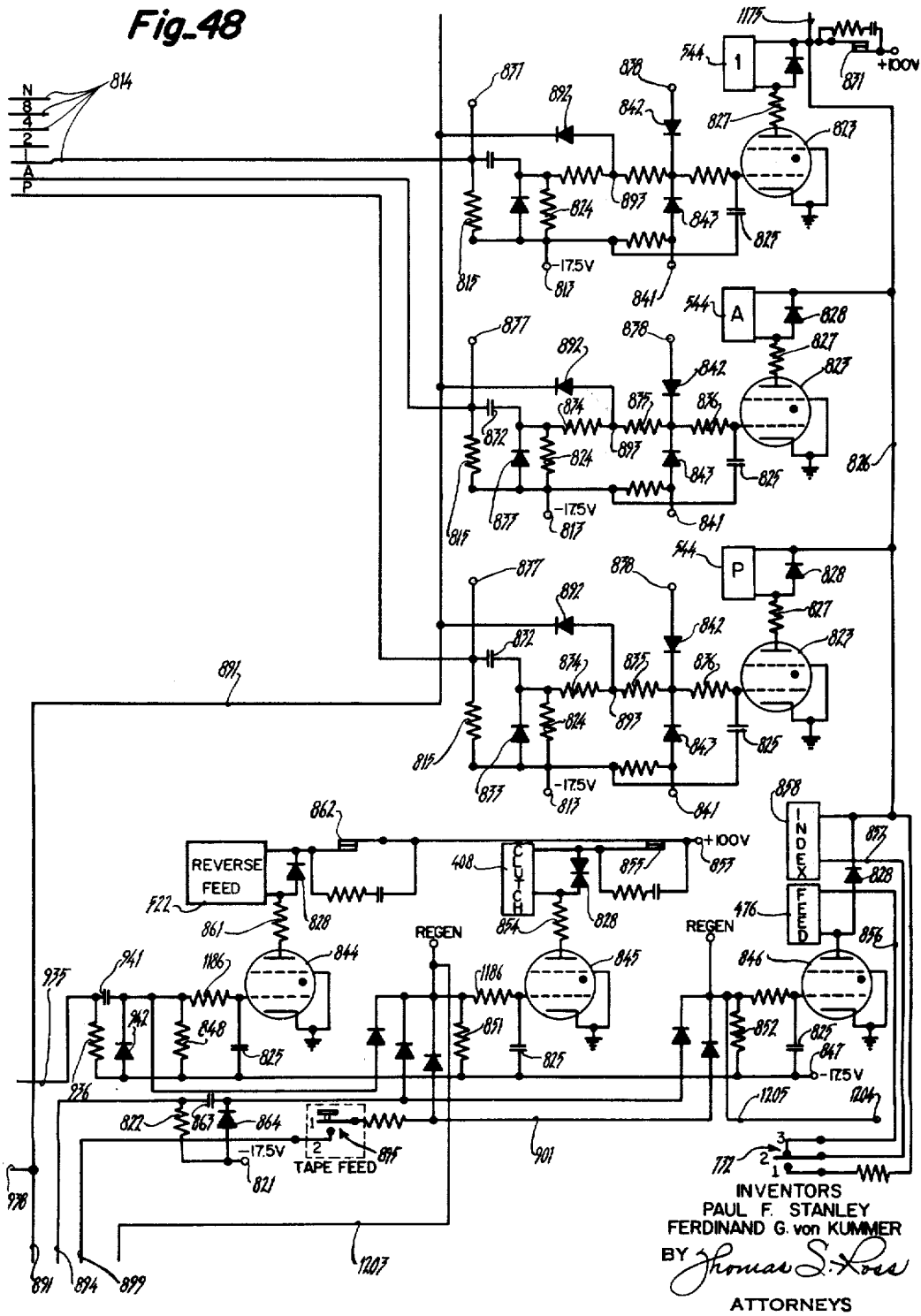
Figure 49:
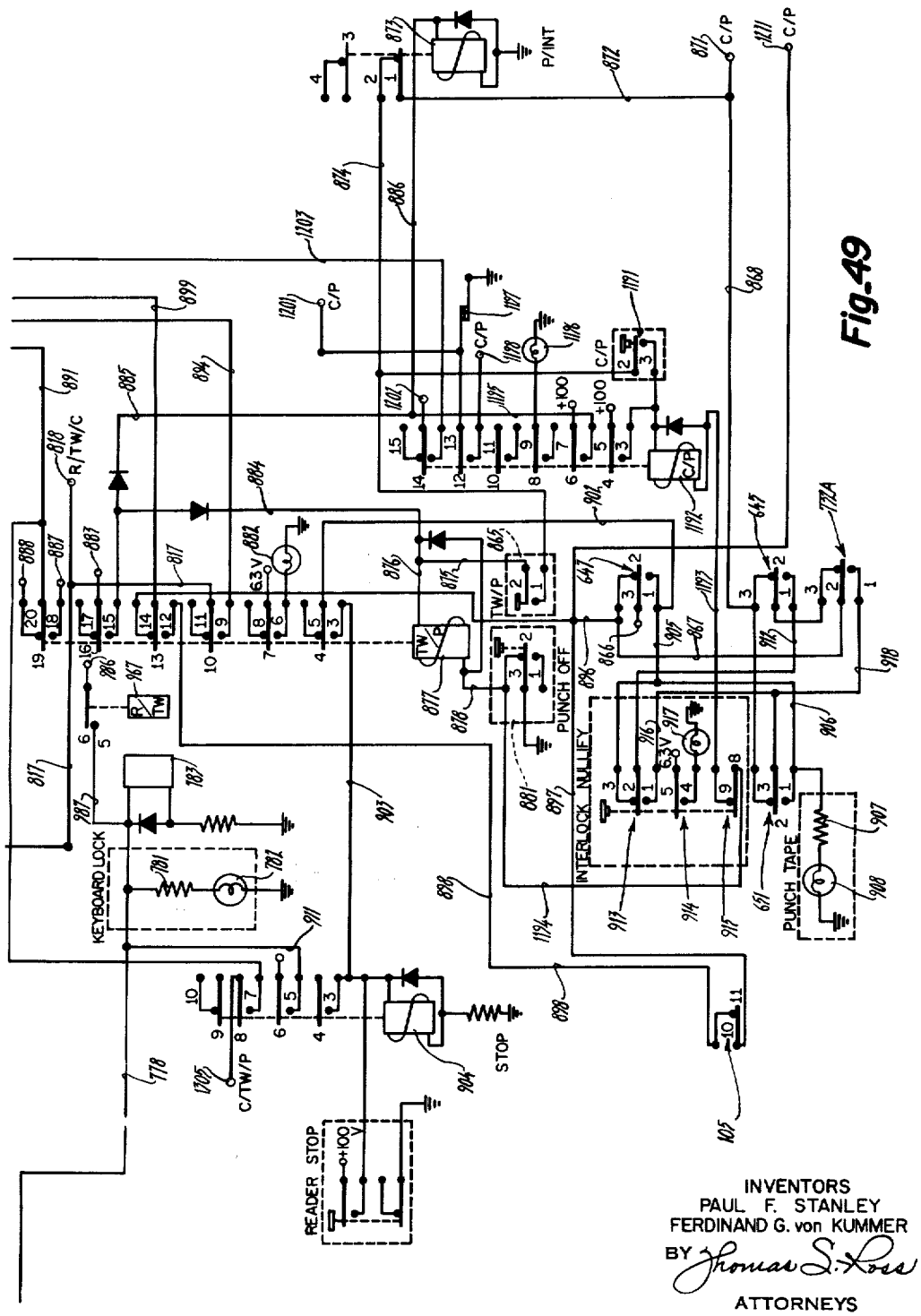
Figure 50:
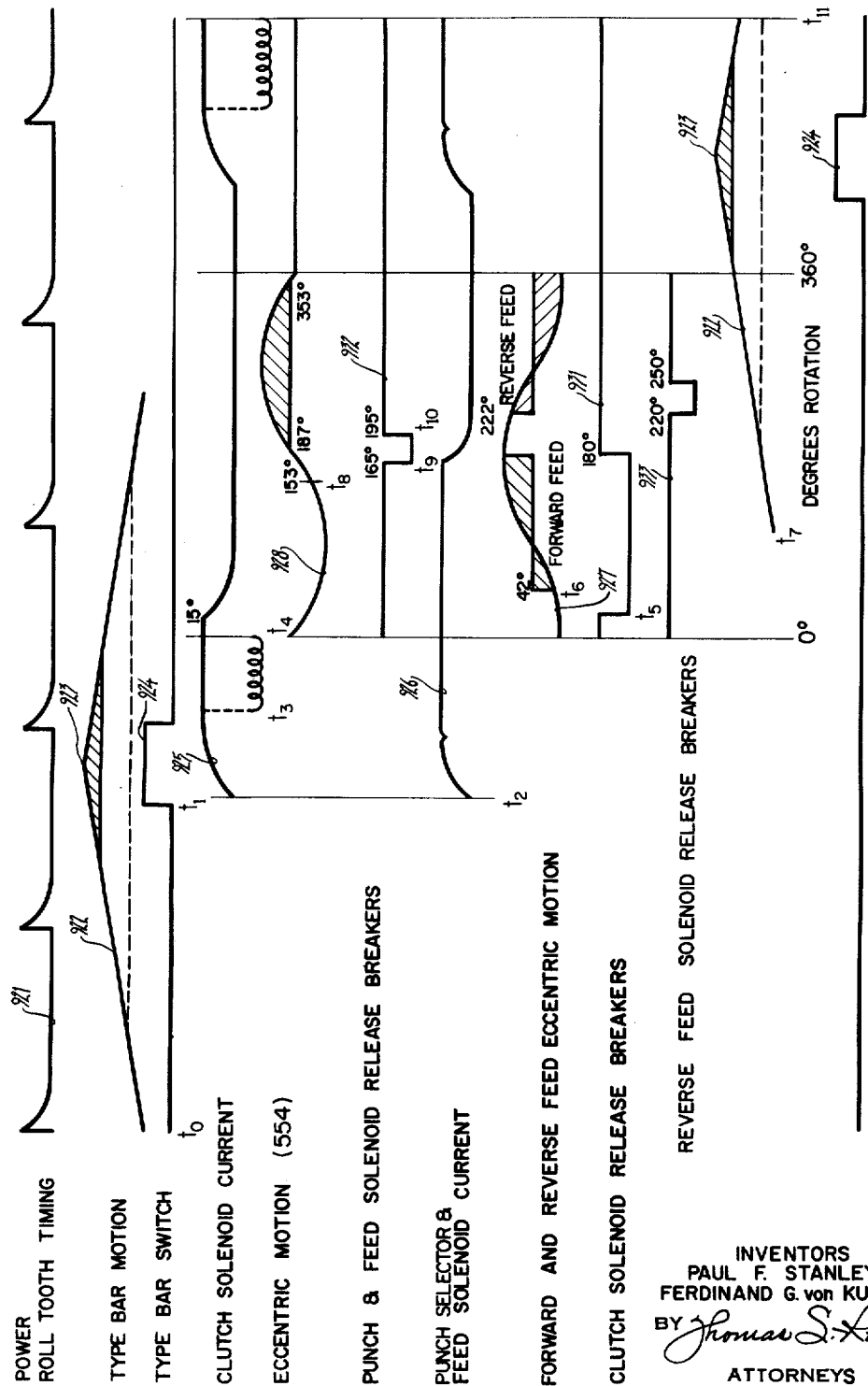
Figure 56:
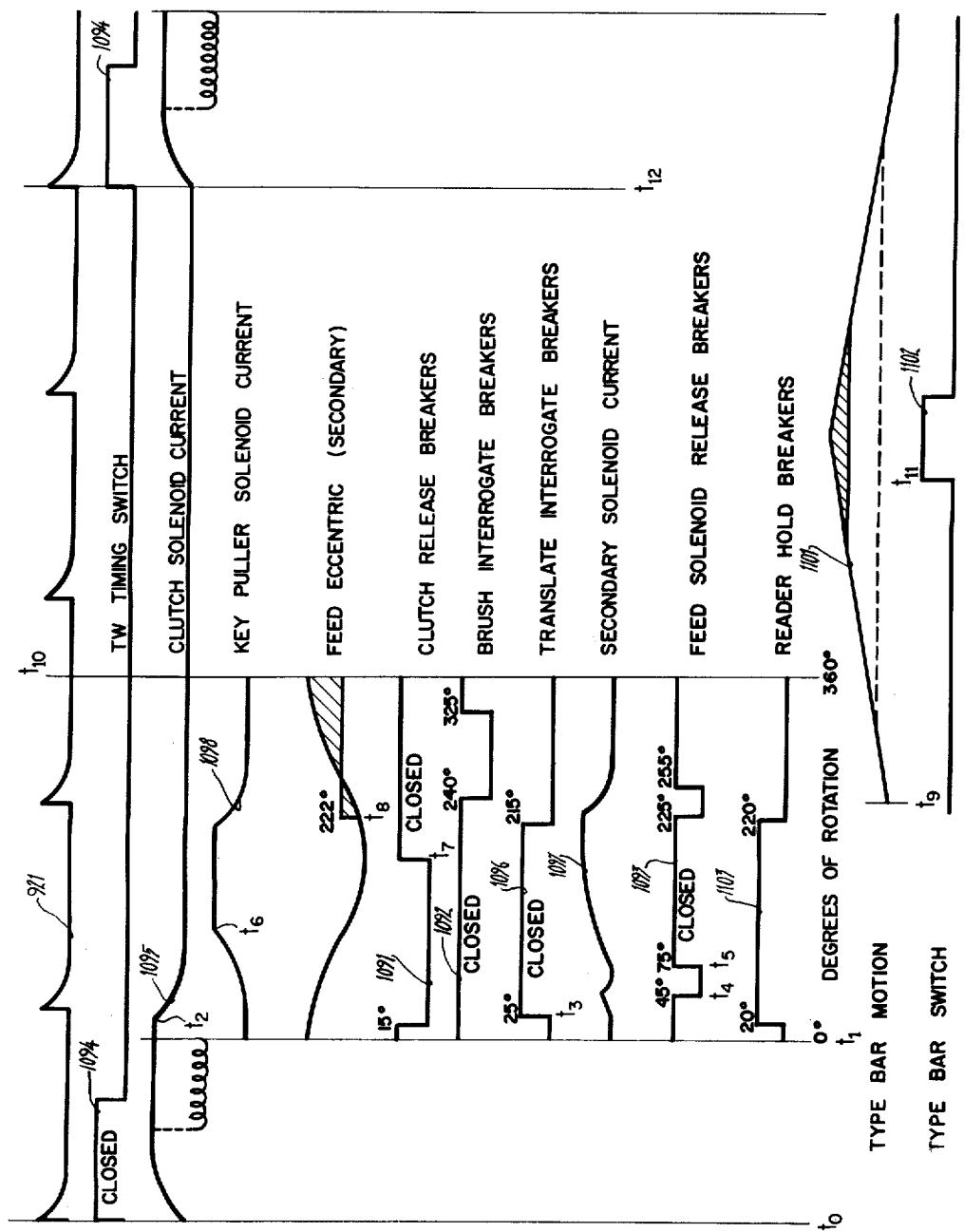
Figure 57:
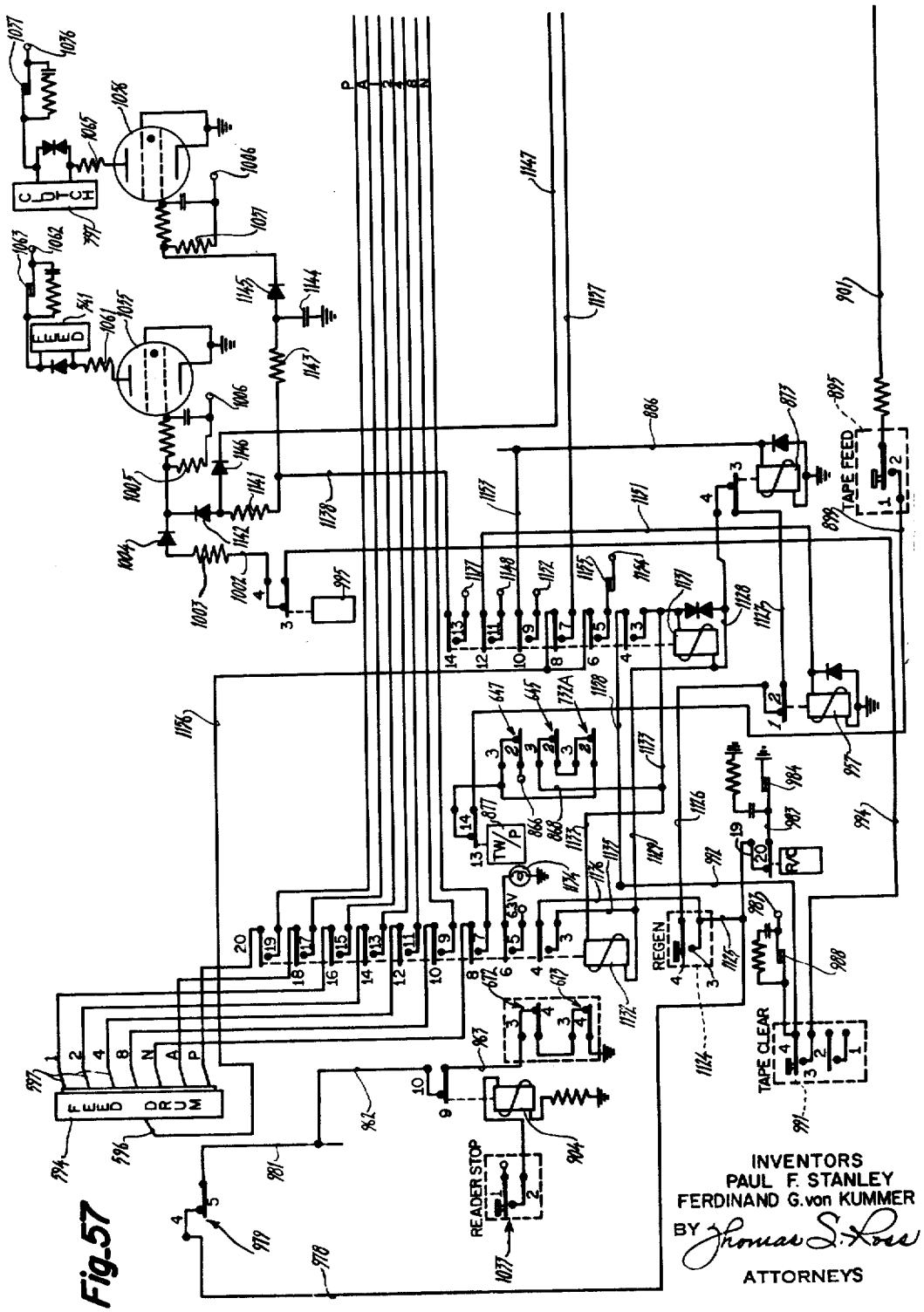
Figure 58:
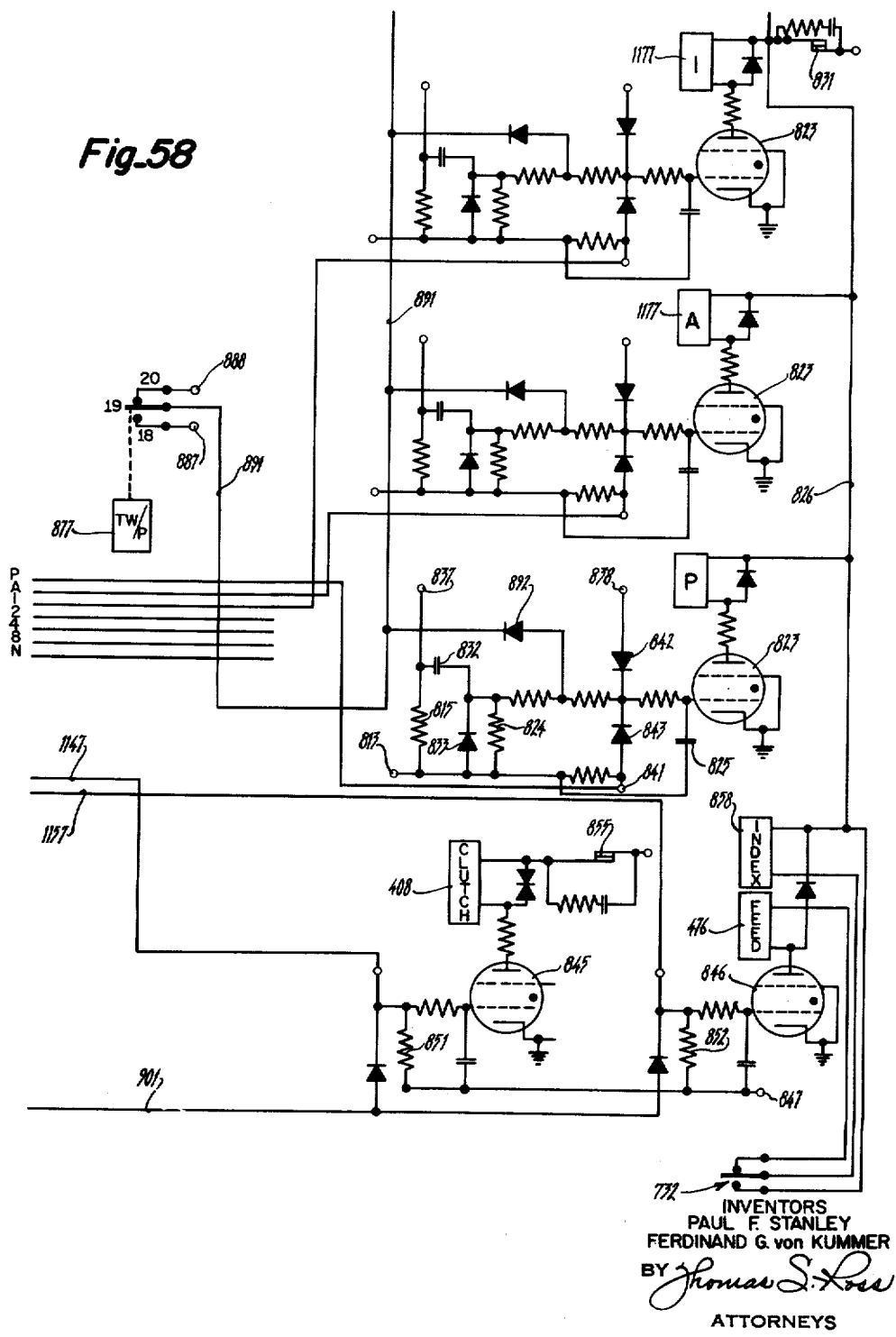
Figure 59:
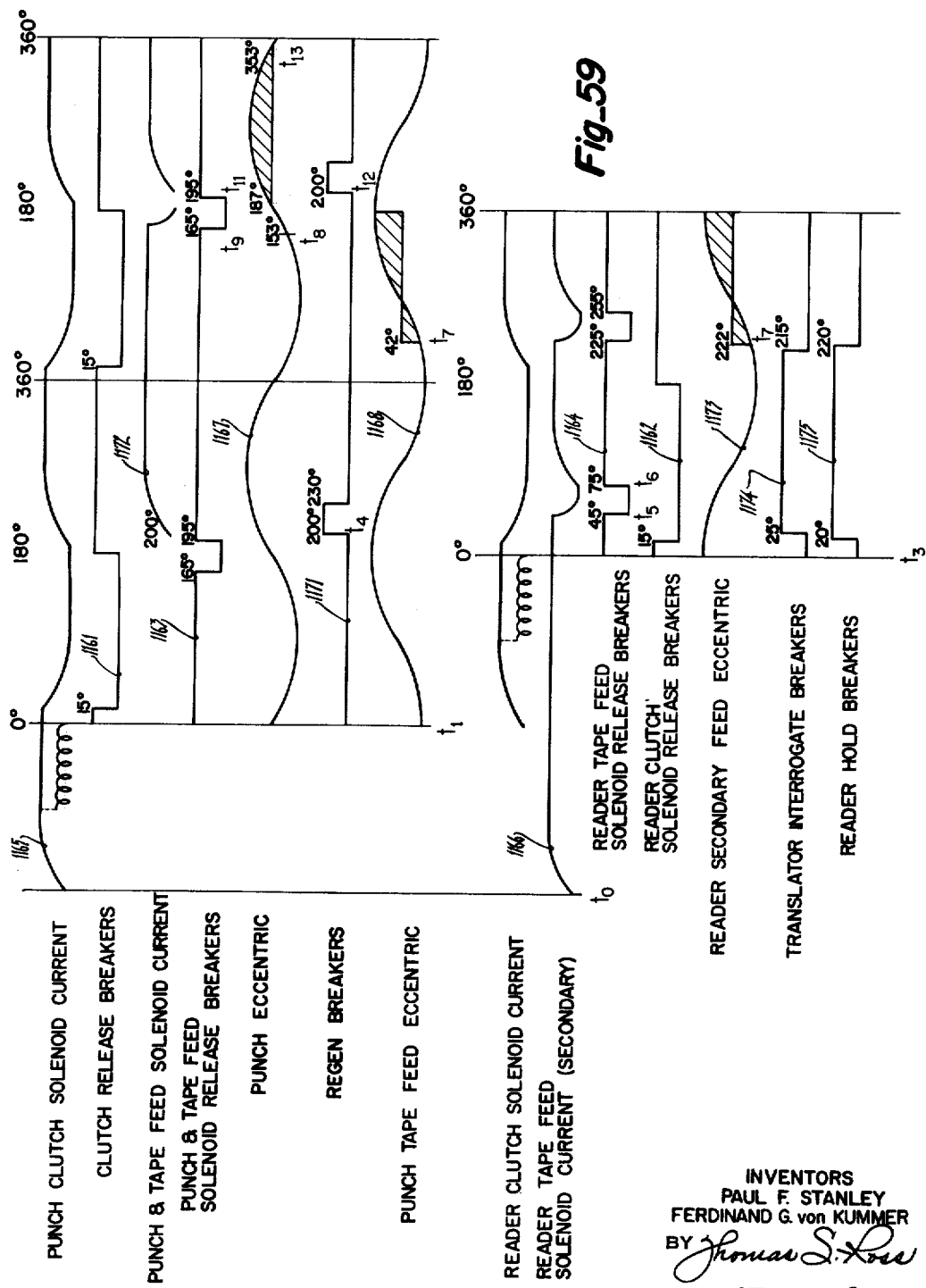
Figure 60:
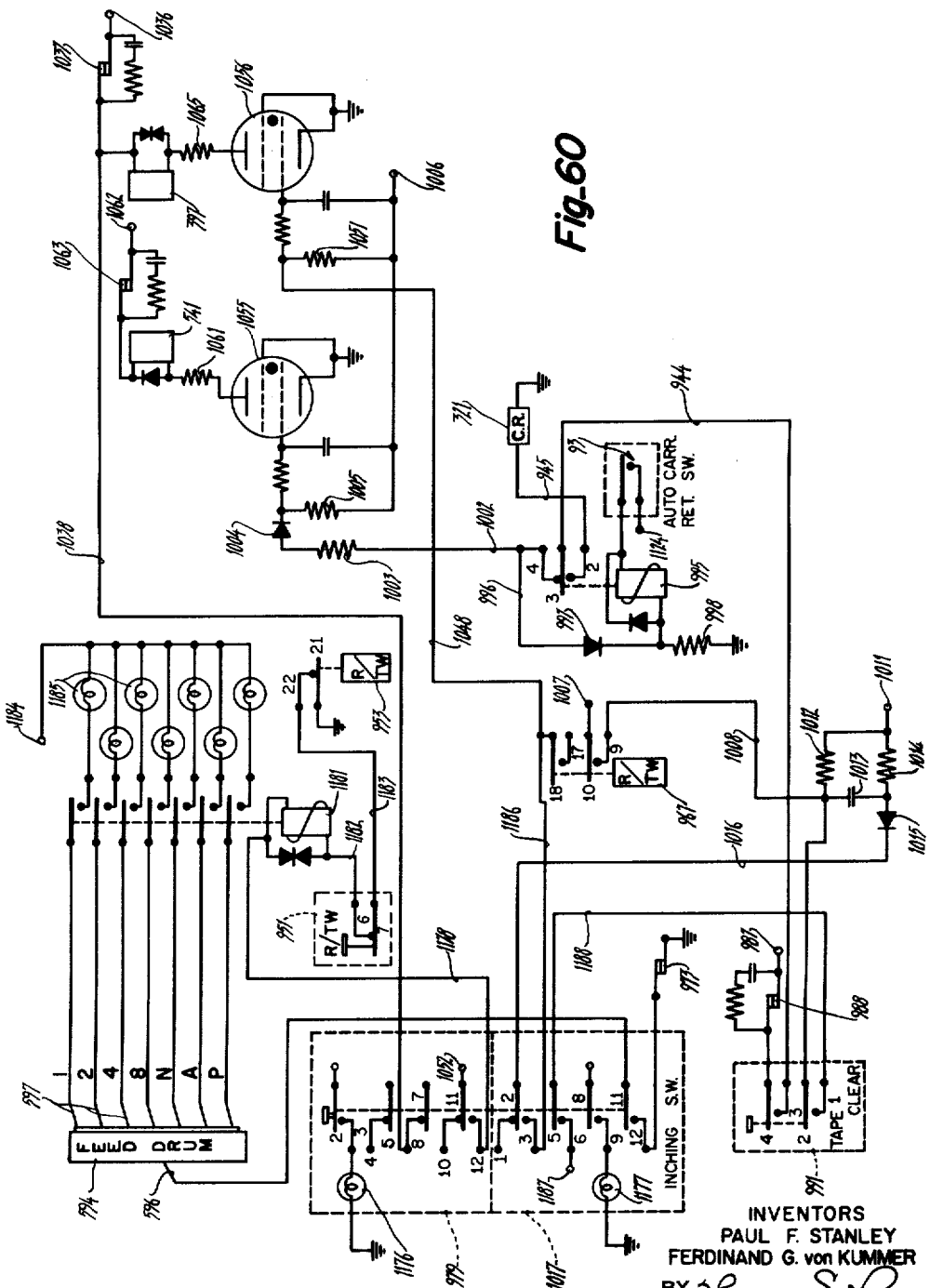
Figure 61:
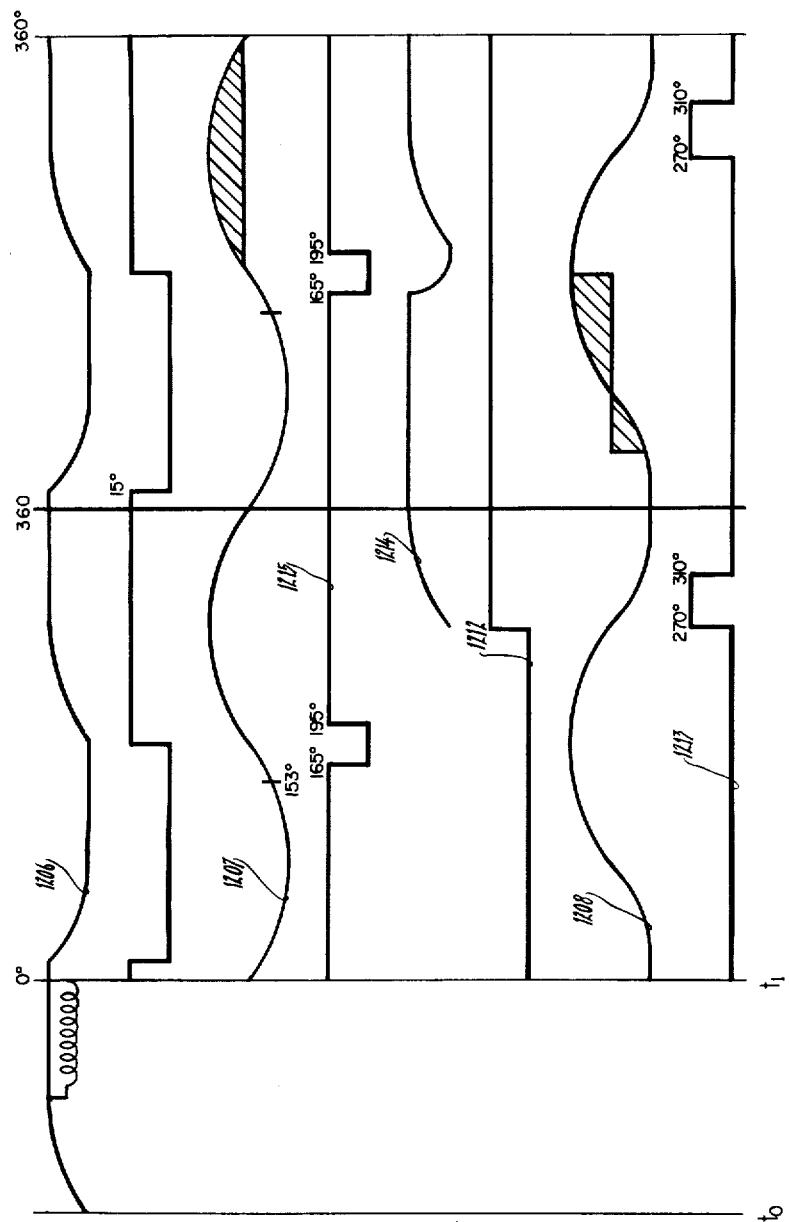

FIGS. 28 and 29 are sectional views respectively taken along section lines 28—28 and 29—29 of FIG. 27;

FIG. 30 is an exploded perspective view of the tape feed drive mechanisms for the reader-punch assembly;

FIG. 31 is an axial sectional view taken along lines 31—31 of FIG. 26 showing the reader and punch cam shifts and the tape feed drive arms associated therewith;

FIGS. 32 and 33 are each side elevational views in partial section showing respectively the forward and reverse feed mechanisms for driving the instant punch tape feed drum;

FIGS. 34 and 35 are each side elevational views in partial section showing reader primary and secondary tape feed mechanisms;

FIG. 36 is a sectional side elevational view taken through lines 36—36 of FIG. 26;

FIG. 37 is a sectional side elevational view through the tape reader unit showing the reader mechanisms and timing by cams on the reader cam shaft;

FIG. 38 is a partial vertical sectional view of the punch and reading stations taken along lines 38—38 of FIG. 25;

FIG. 39 is a sectional view taken along lines 39—39 of FIG. 40;

FIG. 40 is a fragmentary plan view with parts cut away of punch-reader station casting showing chad cavities;

FIG. 41 is a fragmentary front elevational view showing the front portion of the punch housing carrying record guide control button;

FIG. 42 is a sectional view taken along section line 42—42 of FIG. 41;

FIG. 43 is a vertical sectional view taken along section line 43—43 of FIG. 26 showing a reel full of tape switch;

FIG. 44 is an exploded perspective view showing the construction and operating mechanism for the record guide means of the reader-punch assembly;

FIG. 45 is a fragmentary side elevational view showing switch means associated with the punch record guides of FIG. 41;

FIG. 46 is a schematic diagram of power supply circuitry;

FIGS. 47–49 taken together are a schematic diagram of typewriter to punch (TW/P) and computer to punch (C/P) mode circuitry;

FIG. 50 is a TW/P mode timing diagram;

FIG. 51 is a record tape showing the code employed in the system;

FIGS. 52–55 taken together are a schematic diagram of reader to typewriter (R/TW) mode circuitry;

FIG. 56 is a R/TW mode timing diagram;

FIGS. 57 and 58 taken together are a schematic diagram of the regenerate mode circuitry;

FIG. 59 is a regenerate mode timing diagram;

FIG. 60 is a schematic diagram showing inch mode circuitry;

FIG. 61 is a C/P mode timing diagram;

FIG. 62 is a schematic diagram showing reader to computer (R/C) mode circuitry;

FIG. 63 is an R/C mode timing diagram;

FIG. 64 is a partially schematic block diagram showing computer to typewriter (C/TW) mode circuitry; and FIG. 65 is a C/TW mode timing diagram.

Figure 1:
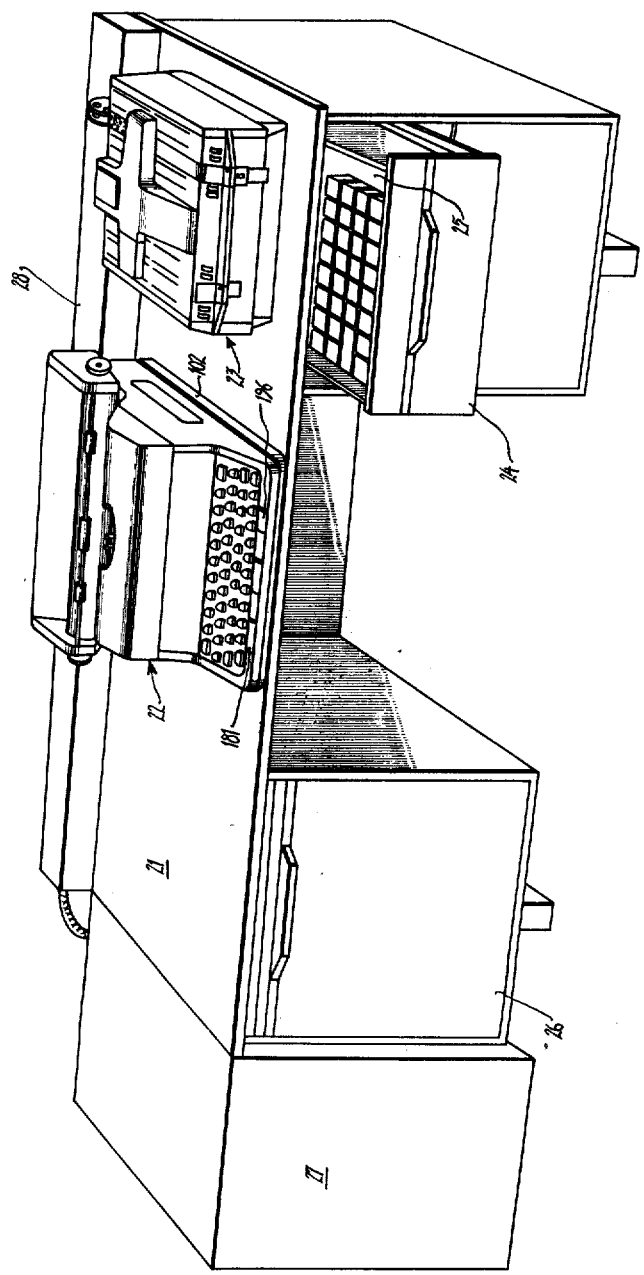
FIG. 1 is a perspective view showing the overall arrangement of the units comprising a data processing system.

Referring now to the drawings wherein like reference characters and numerals designate like or corresponding elements throughout the several views thereof and wherein preferred embodiments of the invention are disclosed, there is shown in FIG. 1 the overall appearance and arrangement of the instant data processing apparatus comprising a desk-like housing 21 which has operatively mounted thereon an electric typewriter 22 and a punch-reader unit 23. The housing 21 has a drawer 24 which when opened presents to the machine operator a control panel 25 having a plurality of selectively operable buttons adapted to control switching means. A second drawer 26 provided at the left side of housing 21 contains and provides easy access to the relay assemblies, electronic vacuum tubes and other electrical assemblies used in the instant apparatus. A business type digital computer 27 is operatively disposed adjacent the housing 21. For the purposes of illustration it may be assumed that the electric typewriter 22 used here is similar, except as to modifications hereinafter described, to that presently being produced and sold by the Royal McBee Corporation.

The control panel button operated switching means and the circuitry in drawer 26 statically connects the units with one another; interconnecting circuitry being housed in a raceway 28 mounted to the rear of the desk. In accordance with the invention the units may be operatively connected in various combinations by depression of particular ones of the buttons on the control panel 25.

Before proceeding with a detailed description of the invention the function of the buttons on the control panel will be briefly described.

Referring to FIG. 2, the control panel 25 is provided with four banks of translucent buttons designated reader, code, common, and punch. The buttons are translucent in order that lamps disposed thereunder will indicate to an operator the conditions of the system. As will hereinafter appear some of the buttons in the reader, common and punch banks are fixed; the others in said banks are depressible. All the buttons in the code bank are fixed.

Depression of the first button in the reader bank operates the plunger of a multicontact non-latching type switch adapted to condition circuitry between the reader and computer; operation of the reader being by computer direction. Depression of the second button in the reader bank operates the plunger of a multicontact non-latching type switch adapted to condition circuitry between the reader and typewriter whereby information will be typed character for character as it is read from a perforated record. Depression of the third button in the reader bank operates the plunger of a non-latching multicontact plunger type switch adapted to disable the reader circuitry whereby reader to computer, reader to typewriter or regen operation will stop. Depression of the fourth button in the reader bank designated "regenerate" operates the plunger of a multicontact non-latching type switch adapted to condition circuitry between reader and punch whereby data on an original tape may be reproduced on a new tape. Depression of the fifth button in the reader bang designated "inch" operates the plunger of a multicontact latching type switch adapted to change the static condition of the R/TW control circuitry so that in order to read successive columns of a perforated record the R/TW button must be repeatedly depressed. Depression of the sixth or reader tape feed clear button operates the plunger of a multicontact non-latching plunger type switch adapted, when the inching mode switch is depressed and latched, to advance the tape in the reader unit one column at a time upon repeated depressions thereof. Depression of the inch switch also conditions the indicators in the code bank by connecting them to the reader output whereby they will be operative to visually indicate the next character to be processed. The last button in the reader bank is fixed and has a reader tape malfunction indicator beneath it which is adapted to visually indicate conditions such as out of tape or related malfunctions.

Depression of the first button in the common bank operates the plunger of a multicontact latching-type switch adapted to condition circuitry between the computer and typewriter. This mode is controlled according to the way the computer is programmed whereby the system will operate from the typewriter to computer or vice versa. Depression of the second and third buttons in the common bank operates the plungers of end of message (EOM) and end of line (EOL) multicontact latching-type switches respectively which are adapted to condition circuitry whereby the reader will be disabled when a lower case void code (Δ), carriage return code, or an end of message code (*) is sensed and read. The fourth and fifth buttons on the common bank are fixed and beneath them are two indicator lamps adapted to indicate respectively that the keyboard lock solenoid is energized and to indicate that the system components are warmed up and ready to operate.

Depression of the first button in the punch bank operates a multicontact non-latching pulunger type switch adapted to set up circuitry between computer and punch; information being fed to the punch under computer direction. Depression of the second button in the punch bank operates the plunger of a multicontact non-latching type switch adapted to condition circuitry between typewriter and punch units so that every typewriter function causes a corresponding code representative of that function to be punched in a tape.

When the inch button is depressed and latched and the TW/P button is depressed thereby conditioning TW/P circuitry, information will be read, typed and punched one character at a time upon repeated depressions of the R/TW button.

Depression of the third button in the punch bank operates the plunger of a multicontact non-latching type switch adapted to disable the typewriter to punch circuitry whereby the typewriter may be used alone. Depression of the fourth button on the punch bank labelled tape feed operates the plunger of a non-latching type switch adapted to condition circuitry whereby the punch unit tape may be fed and punched with index holes a column at a time upon depression thereof. Depression of the fifth button in the punch bank labelled interlock nullify operates the plunger of a multicontact switch of the latching type adapted to reestablish circuits disabled by punch tape malfunctions as indicated by a lamp under the sixth or punchtape malfunction button. Finally the last button in the punch bank controls the plunger of a latching type main power switch adapted to connect power to all units. The plunger type switches employed are preferably as described in copending application Serial No. 649,098 now Patent 2,853,565; the non-latching type having no latch and the latching type preferably having a latch as disclosed in copending application Serial No. 714,406 now Patent 2,946,237.

Each of the various components of the instant data processing equipment will be first discussed in mechanical detail with reference to FIGS. 3–35, and thereafter a general and a detailed review of the various electrical interconnections between said components will be made with reference to the circuit and timing diagrams of FIGS. 46–65.

TYPEWRITER

The instant typewriter 22 and the supplemental structure added thereto is illustrated in FIGS. 3–24. It will be understood that unless otherwise stated the various parts shown are suitably supported on the typewriter frame. As noted above the basic typewriter hereinafter shown and described will be similar to the well known "Royal Electric." Generally speaking the construction of the "Royal Electric" is here modified to an extent whereby its key controlled linkages may be automatically electromechanically selected and whereby, when any of the keys or key linkages thereof are manually depressed or automatically selected, an electrical signal representative of the key depressed or the linkage selected will be initiated.

Referring to FIGS. 3–5 each typing action of the typewriter 22 is initiated by manual depression of a character key 31 which, through key controlled linkage comprising key lever 32, pivoted lever 33, trip pawl 34, and pawl latch 35, serves to release the spring biased pawl 36 for clockwise movement into engagement with the teeth 37 of a power roll 38. The rotation of power roll 38 causes the engaged pawl 36 to be displaced forwardly (to the left as seen in FIG. 3) and, through an actuator arm 41 on which it is mounted, rotate a bell crank 42 pivotally mounted on a universal cross shaft 43. The resultant counterclockwise rotation of the bell crank 42 will, through a link 44, swing an associated pivotally supported type bar 45 in a clockwise direction so that the type head 46 thereon is impelled against the operative surface of the typewriter platen. This printing or typing action is of a conventional nature and need not be further explained here.

In order to prevent the simultaneous actuation of two or more type bars there is provided a slotted ball retaining housing, generally designated by reference numeral 47, which extends transversely of the typewriter frame. The housing 47 in the embodiment illustrated is located immediately to the rear of the normal complement of the bell cranks 42 and is provided with a plurality of vertically disposed slots 48 most clearly shown in FIG. 4. The slots 48 are horizontally spaced so as to receive and guide associated projections 51 formed on bell cranks 42. Referring more particularly to FIG. 5, a longitudinal chamber 52 is provided in housing 47 which is perpendicular to and communicates with slots 48. A plurality of ball locking members 53 are movably disposed in chamber 52, so that during the operative stroke of the bell cranks 42 the projections 51 thereof will pass upwardly through associated slots 48 and will enter chamber 52 thereby laterally displacing the ball locking members 53 as most clearly illustrated in FIG. 5. The number and size of the members 53 used are such that at any time there is sufficient space between the ends 54 and 55 of chambers 52 for all of said ball locking members as well as one, and only one, bell crank projection 51. By reason of this limitation, only one type bar 45 at a time may be displaced to printing position.

As heretofore stated whenever a type action is initiated either manually or automatically an electrical output signal is initiated by switching means in a manner which will be explained with particular reference to FIGS. 3 and 4. As shown therein an electrical insulating block 56 which extends transversely of the machine, is secured by screws 57 to a rearwardly extending shoulder 58 of the housing 47. An electrically conductive contact plate 61 is attached by any suitable means to the lower surface of block 56 as to cooperate with a plurality of laterally spaced mutually insulated electrically conductive spring contacts 62 secured along the rearward edge of block 56 by means of an insulated clamp bar 63, a threaded bar 64, and screws 65 provided with insulating collars 66. An appropriate electrical lead 67 is affixed to contact plate 61 while leads 68 are connected to the respective rearward ends of spring contacts 62. As will hereinafter appear with respect to FIG. 47 lead 67 is adapted to be connected to a negative 17.5 volt source and leads 68 to an encoder. As shown in FIG. 3, the forward ends of spring contacts 62 are normally spaced from the lower surface of common contact plate 61. The spring contacts 62 are moved toward contact plate 61 by associated bell cranks. Referring to FIG. 4 each of the bell cranks 42 is formed with a curved rearward extension 71 having fastened thereto a block 72 of electrical insulating material. The various bell crank blocks 72 underlie and are normally spaced from their respective associated spring contacts 62.

In the operation of the machine when any one of the type bars 45 is rotatably actuated as above described, the block 72 on an associated bell crank will engage its associated spring contact 62 and move it into operative contact with the contact plate 61 as shown in FIG. 4, thereby initiating, in the associated lead 68, an electrical signal which corresponds to the character printed by the actuated type bar. The operative surface 73 of each block 72 is positioned so that contact between the spring contact 62 and contact 61 is established only after the associated bell crank projection 51 has entered the chamber 52 and has laterally displaced members 53 to their respective locking positions as shown in FIG. 5; thus no signal is initiated in leads 68 unless a full printing stroke of the type bar is effected. Due to the operation of the ball interlocking mechanism, it will be impossible to move more than one spring contact 62 into engagement with the contact plate 61 at any one time. Likewise, it will be impossible to print a given letter and at the same time initiate a disassociated electrical signal.

The manner in which the signals initiated in leads 68 are encoded and utilized to control the operation of various other components of the instant data processing apparatus such as the punch unit will be later explained in connection with the circuit diagrams of FIGS. 46–65.

In addition to initiating electrical signals representative of characters, the instant typewriter is adapted to initiate electrical signals representative of various typewriter functions such as backspace, automatic carriage return, carriage return, case shift, line feed, line feed-carriage return, tabulate and space. The signals representative of these functions are initiated by switches which are operable with the linkages associated with the aforementioned functions. Also switches are provided in association with a special key which is mounted on the lower front of the keyboard and operable in combination with the x and backspace keys as will hereinafter appear.

As noted supra the typewriter employed is similar to that presently being sold by Royal McBee Corporation, hence a detailed description of each of the above mentioned function control linkages need not be made here; rather only those portions of said linkages which are immediately associated with and operate the function control switches will be respectively shown and described.

BACKSPACE

The switching apparatus for initiating an electrical signal when the back space toggle assembly linkage of the typewriter is operated is shown in FIG. 6. The backspace toggle assembly comprising a link 74 which is articulately connected by means of a stud 75 to an arm 76 which is secured to a stud shaft 77. Articulately connected to the stud 75 is a curved lever 78, the upper end of which is adapted to be connected to and operate the terminal portion of the back space linkage of the typewriter. The structure thus far described is conventional in nature and need not be further particularized here. Rotatably adjustably secured to the stud shaft 77 is a cam 81, the periphery of which is adapted to operate a switch 82 comprising a movable contact arm 83 and a stationary contact arm 84. Switch 82 is operatively mounted on the typewriter frame by any suitable means such as a bracket 85. The normal condition of the parts is as shown in FIG. 6. In operation when the "back space" key of the typewriter is depressed, the power operated link 74 will rotate cam 81 in a counterclockwise direction which in turn will "close" the contacts 61 and 62 of switch 82 thereby as will hereinafter appear initiating a signal.

AUTOMATIC CARRIAGE RETURN

The switching apparatus for initiating a signal when the typewriter carriage reaches a predetermined left hand limit of movement as determined by the margin stop setting is shown in FIG. 7. This signal is utilized to automatically energize a carriage return key puller solenoid as will be discussed infra. The conventional structure shown in FIG. 7 comprises part of the line lock linkage which includes a bail 86 pivotally mounted on two axially aligned vertical studs 87 and 88 which are secured to a U-shaped bracket 91 that is affixed to the typewriter frame. Articulately connected to the upper arm of the bail 86 is a wire link 92 which is actuated in the usual manner from the center stop assembly of the machine. To this standard construction is added a switch 93 comprising a stationary contact arm 94 and a movable contact arm 95. Switch 93 is fixedly mounted on the typewriter frame by means of a bracket 96. The bail 86 is provided with a lateral extension 97 which is adapted to engage and displace the movable contact arm 95 of switch 93 whereby in the normal position of the parts shown the switch 93 is maintained in an "opened" condition. When the typewriter carriage reaches a predetermined left hand limit of travel as determined by the margin stop setting, the center stop assembly will be operated so as to pivotally actuate the bail 86 in a counterclockwise direction as seen in FIG. 7 thereby to permit the contacts of switch 93 to move to a closed position.

CASE SHIFT MECHANISM

Figure 8:
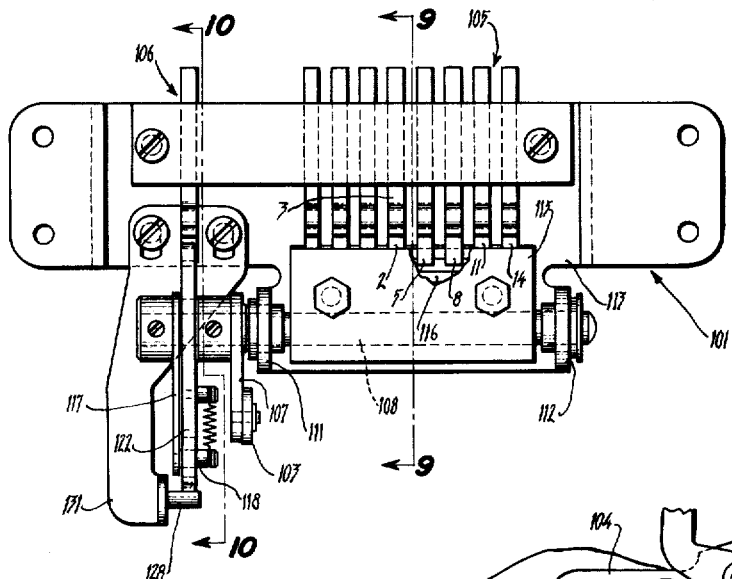
FIG. 8 is a bottom view of the case shift switch assembly.
Figure 9:
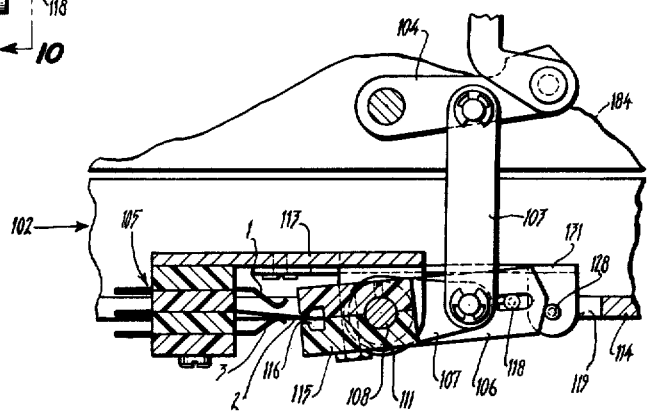
FIG. 9 is a vertical sectional view taken along section line 9—9 of FIG. 8.
Figure 24:
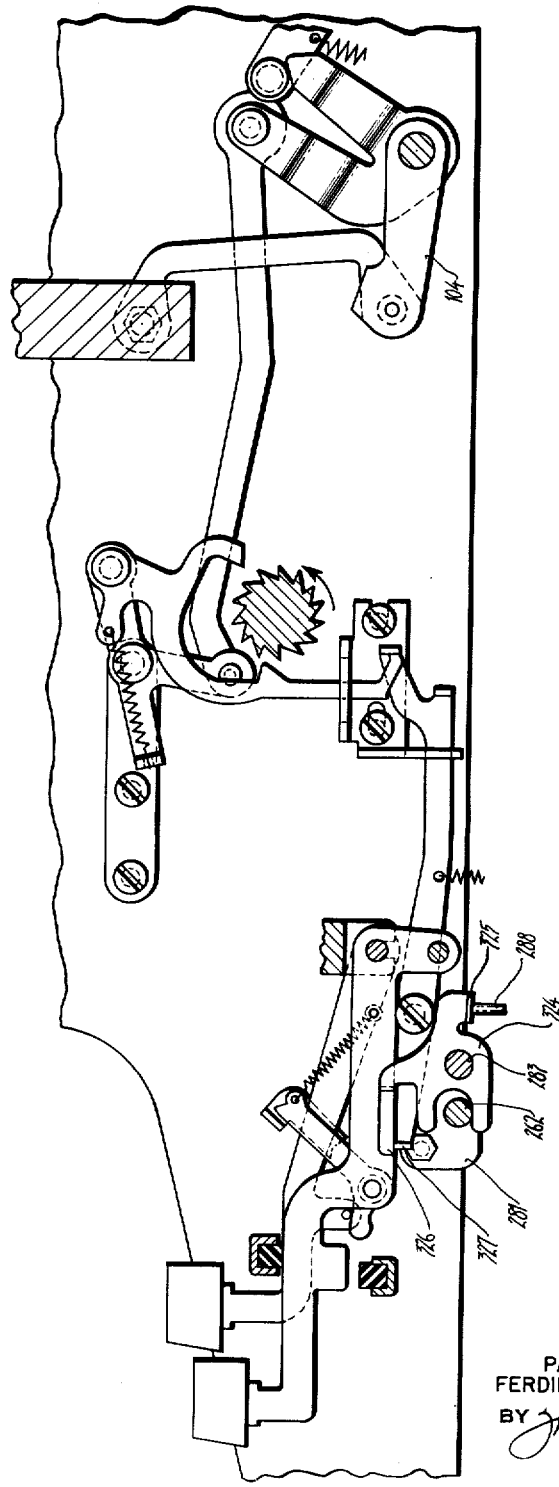
FIG. 24 is a side elevation of the case shift mechanism showing the mechanism through which it is automatically operated.

The depression of the case shift key of the typewriter serves to operate a group of several circuit conditioning switches and a shift signal switch associated with the encoder. These switches and their associated operating linkages are shown in FIGS. 8–11. FIG. 8 shows a bottom view of the switch assembly generally designated by reference numeral 101 which is adapted to be mounted immediately below and linked to the case shift arm assembly of the typewriter 22 on a sub base 102 adapted to support the typewriter and other elements as will hereinafter be described. Referring to FIG. 9 the conventional case shift arm assembly, which is more clearly shown in FIG. 24, is modified by the addition thereto of a link 103 which is connected to one of the rock arms 104 in the case shift arm assembly; the lower case position of the parts being shown in FIGS. 9 and 24.

The case shift switch assembly 101 is comprised of a group of eight form C circuit conditioning switches generally designated by reference numeral 105 and of a shift signal switch generally designated by reference numeral 106, FIG. 8. In order to operate the several switches the link 103 is articulately connected at its other end to an arm 107 which is secured to a shaft 108. The shaft 108 is rotatably mounted in downwardly extending ears 111 and 112 of a bracket 113 which is secured in any suitable manner to the bottom 114 of the sub base 102. The lower portions of the switch assembly extend downwardly through an aperture 119, in the sub base bottom as seen in FIG. 9. Rotatably secured to the shaft 108 is a composite block 115 having an elongated dovetail type slot 116 formed along the rearward edge thereof. Secured in laterally spaced relation on the rearward portion of bracket 113 are the eight single-pole double-throw form C type switches 105; only 5 of which are employed as will hereinafter appear. The movable contacts 2, 5, 8, 11 and 14 of which extend into the dovetail slot 116 in block 115.

In the normal lower case position of the case shift linkage as shown in FIG. 9, the block 115 will be held in its counterclockwise position so as to hold all of the movable contacts in the positions shown in operative engagement with their respective lower stationary contacts 3, 6, 9, 12 and 15. When the shaft 108 is rotated in a clockwise direction, as seen in FIG. 9, by operation of the case shift linkage to upper case position the block 115 will cause all of the movable contacts to be flexed upwardly into operative contact with the respective upper stationary contacts 1, 4, 7, 10 and 13. The movable contacts will remain in engagement with the upper stationary contacts as long as the typewriter segment remains in upper case position. Restoration of the typewriter segment to its normal lower case position will restore the switches 185 to their respective normal conditions as illustrated in FIG. 9.

Figure 10:
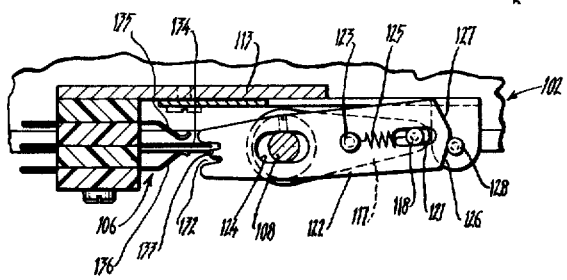
FIG. 10 is a vertical sectional view taken along section line 10—10 of FIG. 8.

The construction and support for shift signal switch 106 is identical to that just described for the eight circuit conditioning switches 105, however the means for actuating switch 106 is different. Referring to FIG. 8, an arm 117 is secured to the left end of shaft 108. Fixed to the outer end of arm 117 is a stud 118 which extends into a radially disposed slot 121 formed in a lever 122 of dielectric material. The lever 122 is provided with a fixed stud 123 and a slot 124, the walls of the latter slidably engaging shaft 108. A spring 125 operatively connects studs 118 and 123 thereby to radially bias the lever 122 outwardly, or to the right as seen in FIG. 10, so that tapered camming surfaces 126 and 127 formed on the outer edges of lever 122 engage a stationary stud 128 fixed on a bracket extension 131 which is adjustably secured to bracket 113. The rearward end of lever 122 is provided with a notch 132 having a centrally disposed projection or tip 133 which is adapted to engage and flex the movable contact 134 of switch 106 comprising upper and lower stationary contacts 135 and 136 respectively.

Figure 11:
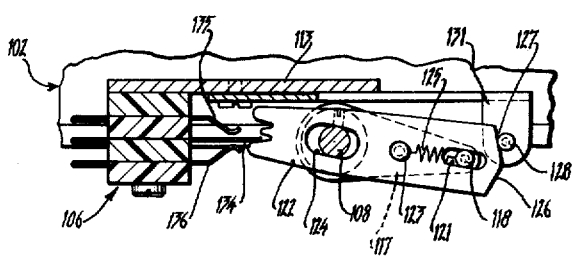
FIG. 11 is an active view of the parts shown in FIG. 10.

The operation of the switch actuating linkage just described serves to momentarily move the movable contact 134 into engagement with the upper or lower stationary contact each time that the case shift linkage of the typewriter is operated. During the typing of lower case characters the normal position of shaft 108 and the arm 117 will retain the lever 122 in its counterclockwise position as shown in FIG. 10, whereby the movable contact 134 is disposed in the upper portion of the notch 132 thereby allowing contact 134 to be neutrally positioned between the upper and lower stationary contacts 135 and 136. When the typewriter segment is lowered so as to permit typing of upper case characters, the shaft 108 through arm 117 and stud 118, will cause lever 122 to rotate in a clockwise direction and to be simultaneously radially inwardly displaced by reason of the relative motion between the downwardly moving camming surface 126 and the stationary stud 128. During this rotational and translatory motion of lever 122 the projection 133 will displace the movable contact 134 upwardly into operative engagement with the upper stationary contact 135. During the latter portion of the clockwise motion of lever 122 the camming surface 127 will slidably engage stationary stud 128 thereby permitting a radially outward translatory motion of lever 122 which thereby allows projection 133 to move to the right, as seen in FIGS. 10 and 11, and finally out from under the elevated movable contact arm 134. Under these conditions the outer end of the contact arm 134 will be free to drop into the lower portion of notch 132, as shown in FIG. 11, and in so doing it will move out of engagement with stationary contact 135 and will again be disposed in a central or neutral position between stationary contacts 135 and 136. Thus the movable contact 134 operatively engages stationary contact 135 only for a momentary period during the downward shifting of the typewriter segment.

When the typewriter segment is being restored to its normal upper position for the typing of lower case characters the counterclockwise driven shaft 108 will cause the movable contact 134 to be displaced downwardly into momentary engagement with the lower stationary contact 136 in a reverse manner to that just described for the momentary contact with the upper stationary contact arm 135; the movable contact 134 again being neutrally positioned when the typewriter segment has been fully restored to its normal lower case position.

LINE FEED MECHANISM

The apparatus for initiating an output signal during a line feed operation of the typewriter platen is shown in FIG. 13. Here a laterally disposed frame plate 137 is secured by any suitable means to a portion 138 of the typewriter frame. Fixedly mounted on the frame plate are a pair of laterally spaced upstanding brackets 141 and 142 which rotatably support a cross shaft 143. The general location in the typewriter of the frame plate 137 and the brackets 141 and 142 may be seen in FIG. 3. An arm 144, rotatably secured to the left end of cross shaft 143, is articulately connected to an actuating link 145 which is operated in the usual manner from the power roll of the typewriter. A lever 146 is also rotatably secured to cross shaft 143 and is provided with a headed stud 147 which is adapted to slidably engage the walls defining a slot 148 formed in an arm 151. Arm 151 is pivotally mounted on the typewriter frame by a stud 152 and is rotatably biased in a clockwise direction by means of a spring 153. An upwardly extending link 154 is articulately connected to the arm 151 and is connected to an actuating member 155 which operates the line feed ratchet mechanism in a conventional manner. Secured to the bracket 141 is an angled support member 156 which operatively supports two form A type switches generally designated by reference numerals 157 and 158. The movable contact arms of switches 157 and 158 are formed so as to cooperate with the peripheral surfaces of cams 161 and 162 secured for rotation with cross shaft 143.

When the usual "line feed" key of the typewriter is depressed the actuating link 145 will be power operated thereby rotating cross shaft 143 and downwardly displacing operating member 155. During this period the switches 157 and 158 will be operated by the cams 161 and 162; the relative times of "closing" thereof being predetermined by the relative rotative orientation of the cams on the cross shaft 143 for reasons which will hereinafter appear. The switch 158 is utilized to initiate an output signal each time the typewriter "line feed" key is depressed, while the switch 157 is utilized in cooperation with a switch associated with the carriage return-line feed key whereby a signal adapted to energize the carriage return key puller solenoid will be initiated as will be described more fully infra.

CARRIAGE RETURN

The instant typewriter has a zero line space control setting and the machine is normally in this condition so that depression of the carriage return key does not automatically operate the line space mechanism as is conventional. FIGS. 14 and 15 illustrate the electrical switching apparatus which is operated in response to the actuation of the carriage return linkage of the typewriter upon depression of the carriage return key. The conventional portion of the apparatus shown comprises a support plate 163 secured to a portion 164 of the TW frame toward the rear of the typewriter and which supports a bracket 165. Rotatably mounted in bracket 165 is a shaft 166 having an actuating arm 167 fixed to the upper end thereof. Pivotally connected to the outer end of arm 167 is an actuating link 168 which is power operated by the power roll of the typewriter. A second arm 171, also fixed to shaft 166, is connected at its outer end to and adapted to operate the carriage return clutch. To this conventional structure is added a form A type switch 172 which is also mounted on the frame portion 164 by a suitable means such as support brackets 173 and 174. The lower extension of shaft 166 has a cam 175 secured thereto, the peripheral camming surface 176 of which is adapted to engage and operatively displace the movable contact arm 177 toward the stationary contact arm 178. The normal position of the parts is as shown in FIGS. 14 and 15.

In operation when the carriage return linkage is operated the shaft 166 will be rotatably displaced in a counterclockwise direction so that the camming surface 176 will cause movable contact arm 177 to move into electrical contact with the stationary contact arm 178. The switch 172 will remain in a closed state until the shaft 166 is restored to its normal position after the completion of the carriage return movement.

LINE FEED-CARRIAGE RETURN

With the line space control set at zero, the line feed-carriage return key is depressed whereby a line space and a carriage return operation of the typewriter are effected sequentially. When the instant system is in the typewriter to punch mode signals representative of each of these two operations must be serially initiated and encoded in that the record punch mechanism can accommodate only one group of code signals at a time. It is therefore necessary to provide a means to insure that the "carriage return" and "line space" coded signals are never initiated at the same time but rather serially. This is accomplished by the separate switching means described supra in connection with FIGS. 13–15.

As heretofore stated the line feed control lever mounted at one side of the typewriter carriage is set on "zero" so that no line feed occurs by reason of the carriage return linkage being operated. Under these conditions the conventional line feed and carriage return linkages will be entirely independent of each other and will be respectively effected only by the selective depression of either the standard "carriage return" or "line feed" keys of the typewriter. In order to relieve the typist from the necessity of consciously waiting for a predetermined time period between the successive operation of the line feed and the carriage return a special "line feed-carriage return" key 181, as seen in FIGS. 1, 12 and 16, is provided on the lower left front side of the typewriter keyboard. Depression of this single key will first produce a line feed operation and after a suitable time delay will then automatically initiate a carriage return movement whereby encoder switches associated therewith will be serially actuated.

Referring more particularly to FIG. 12 the line feed-carriage return key linkage comprises a key lever 182 which is fixedly secured on shaft 183. Fixedly secured to the ends of shaft 183 are two arms 184 and 185 whose outer ends are respectively rotatably mounted on a cross shaft 186. A lever 187 is also fixed to shaft 183 and is provided with a bent-off ear 188 which normally overlies the upper edge of the standard "line feed" key lever 191. The outer or forward end of the key lever 182 is provided with a bent over portion 192 which is adapted to engage and move the contacts of a switch 193 together. A spring 194 rotatably biases the above described key linkage to its clockwise position as seen in FIG. 12.

When the line feed carriage return key 181 is depressed, switch 193 will close and the standard line feed key lever 191 will be depressed thereby initiating a line feed operation of the typewriter. Near the completion of this operation the cam operated switch 157 of the line feed linkage shown in FIG. 13 will close and since it is serially connected in circuit with switch 193 as seen in FIG. 47 an electrical circuit will be completed to the carriage return key puller solenoid, which will cause the actuation of the carriage return linkage of the typewriter. Actuation of the carriage return linkage will then cause an output signal to be initiated by carriage return switch 172 shown in FIGS. 14 and 15. The details of this electrical circuitry will be more fully discussed later in connection with the circuit diagrams. By means of the above described apparatus a carriage return operation and a line feed operation may be sequentially produced by the depression of only a single key; the predetermined time delay between said operations being primarily determined by the relative rotative orientation of the two cams 161 and 162 of FIG. 13. This time delay is such that the record punch perforates a line feed code in one cycle and a carriage return code in the subsequent cycle.

SPECIAL SWITCH

The operating and support means for the form A type line feed-carriage return key operated switch 193 shown in FIGS. 1, 12 and 16, is substantially the same as that for each of three form C type switches of a special switch assembly, generally designated by reference numeral 195, which will now be described.

The special switch assembly 195 is operated by a key 196 which is disposed at the lower right side of the typewriter keyboard. Key 196 has a stem which is provided with a vertical slot 198 and a fixed stud 199 which respectively cooperate with a fixed stud 201 and a vertical slot 202 provided on a support bracket 203. Bracket 203 is fixedly secured by screws 204 to the rearwardly extending shoulder 205 formed on the inner side of a front typewriter frame portion 206 (FIG. 3). A tension spring 207 operatively secured between the fixed stud 201 and a bent off ear 208 at the lower end of the special key stem 197 serves to normally yieldably retain the key 196 in its upper position. The right hand edge of the key stem is provided with a camming shoulder 211. A bracket 212 secured to a bottom portion of the typewriter sub base 102, fixedly mounts the special switch assembly 195 which comprises three "single-pole double-throw" form C switches 213, 214 and 215 comprising stationary and moveable contacts 1-2-3, 4-5-6, 7-8-9 shown in normal positions (FIGS. 16 and 47). The upper ends of the movable contact arms 2, 5 and 8 support axially aligned spacer blocks 216. Secured to the left end of the switch assembly 195 is a flexible arm 217 the upper portion of which is operatively disposed between the left most spacer block 216 and the camming shoulder 211 of the key stem 197. It will be apparent that when the special key 196 is depressed the downwardly moving camming shoulder 211 will cause the flexible arm 217 and the spacer blocks 216 to be yieldably displaced to the right thereby bringing the movable contacts 2, 5 and 8 into engagement with the right stationary contacts 3, 6 and 9. When the key 196 is released it is restored to its normal upper position by the action of tension spring 207 and the movable contacts will move back to the normal positions shown in FIG. 16. As is obvious in order to retain the special switch assembly 195 in a "closed" position the key 196 must be held depressed.

TABULATION

FIG. 17 illustrates the apparatus and switch associated with the encoder for initiating an electrical signal when the "tab" linkage of the typewriter is actuated upon depression of the tab key. Here a conventional actuator link 221 driven from the power roll is pivotally connected by means of a stud 222 to the outer end of a lever arm 223 which operates the usual "tab" stop actuating and latching device. The stud 222 is provided with an axial extension 224 which is adapted to engage and displace the moveble contact 62 of a tab switch 225 which is operatively secured to an upper right and rear corner portion of the typewriter frame by means of a suitable bracket 226. The normal condition of the parts is an shown in FIG. 17. When the "tab" key of the typewriter is depressed the link 221 will be power driven in a forward direction (downwardly as seen in FIG. 17) and held in a forward position until the tabulational movement of the carriage has been completed. During this conventional action the movable contact 62 of switch 225 through its arm will be free to move into and will remain in operative contact with the stationary contact 61 of switch 225 until the carriage has stopped.

SPACED

FIG. 18 illustrates the switching apparatus for initiating an electrical output signal when the space bar linkage of the instant typewriter is operated.

Here the conventional structure includes a link 227 connected through an arm 228 and a spring 231 to the lower arm 232 of a bail 233 which is pivotally mounted on a bracket 234 by means of vertically disposed and axially aligned studs 235. Screws 236 secure the bracket 234 to the escapement housing 237 of the typewriter. The upper arm 238 of bail 233 operates the carriage escapement mechanism in a well known manner. The instant switching apparatus comprises a form A type switch 241 which is fixed to a portion 242 of the typewriter frame by means of a bracket 243. The laterally extending and normally spaced contacts 61 and 62 of switch 241 are adapted to be moved into mutual engagement by the outer end 244 of an arm 245 that is fixed by any suitable means to the upper arm 238 of bail 233. It will be apparent that each time the space bar linkage is operated the arm 245 will be displaced in a clockwise direction as seen in FIG. 18 so as to "close" the contacts 61 and 62 of switch 241.

KEYBOARD LINE LOCK

The keyboard line lock of the instant typewriter is operated as is conventional by the typewriter on-off switch linkage and linkages responsive to tab and carriage return movement. The line lock is also adapted to be automatically operated by the mechanism shown in FIG. 19 wherein is shown an angled sheet metal bail 246 pivotally mounted as by studs 247 to the sides of the typewriter frame immediately below the forward ends of the typewriter key levers. The bail 246 is adapted to be swung into and out of a locking position immediately beneath shoulders 248 formed on the lower edge of each of the key levers when the typewriter is turned off and on respectively by a link 251 associated with the typewriter on-off linkage. As shown in FIG. 19 the link 251 is associated with a member 252 secured to one end of bail 246 as by riveting. Turning the typewriter off will cause links 251 and member 252 to rock bail 246 into locking engagement with shoulders 248. The other end of bail 246 is bent forwardly and formed with a rearwardly extending slotted arm 253. A spring 254 is provided to return bail 246 to an inoperative non locking position. A link 255 is secured in a slot in bail arm 253 whereby when the carriage is being returned the bail will be moved to locking position; the slot being provided as is understood to allow bail 246 to move without affecting link 255 when the typewriter is turned off. The bail arm 253 is articulately connected as by a stud 256 to a slotted intermediate link 257 which in turn is connected through a stud 258 slidably mounted in its slot to an actuating lever 261. As shown in FIG. 19 lever 261 is pivotally mounted on a cross shaft 262 and is provided on its rearward end with a bent off ear 263 which overlies an actuator pin 264 associated as will hereinafter appear with a line lock solenoid connected in circuit as shown infra. Lever 261 is normally biased by means of a spring 265 to the position illustrated whereby the bail 246 will be in its non locking position. As is evident when the actuator pin 264 is moved upwardly the bail 246 will be moved clockwise into locking position beneath shoulders 248 thereby preventing depressing of any of the key levers.

READER/TYPEWRITER TIMING

Figure 20:
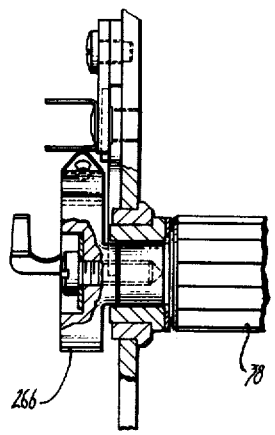
FIG. 20 is a fragmentary plan view in partial section showing one end of the typewriter power roll carrying a timing cam and associated switch.
Figure 21:
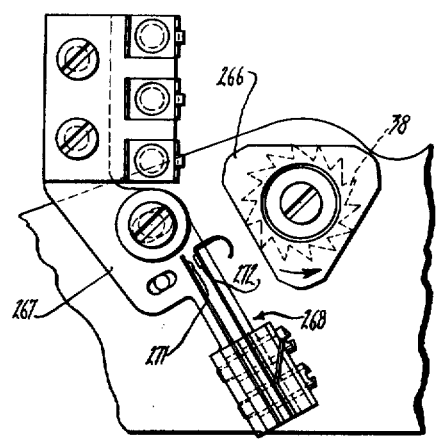
FIG. 21 is a side elevational view of the parts shown in FIG 20.
Figure 22:
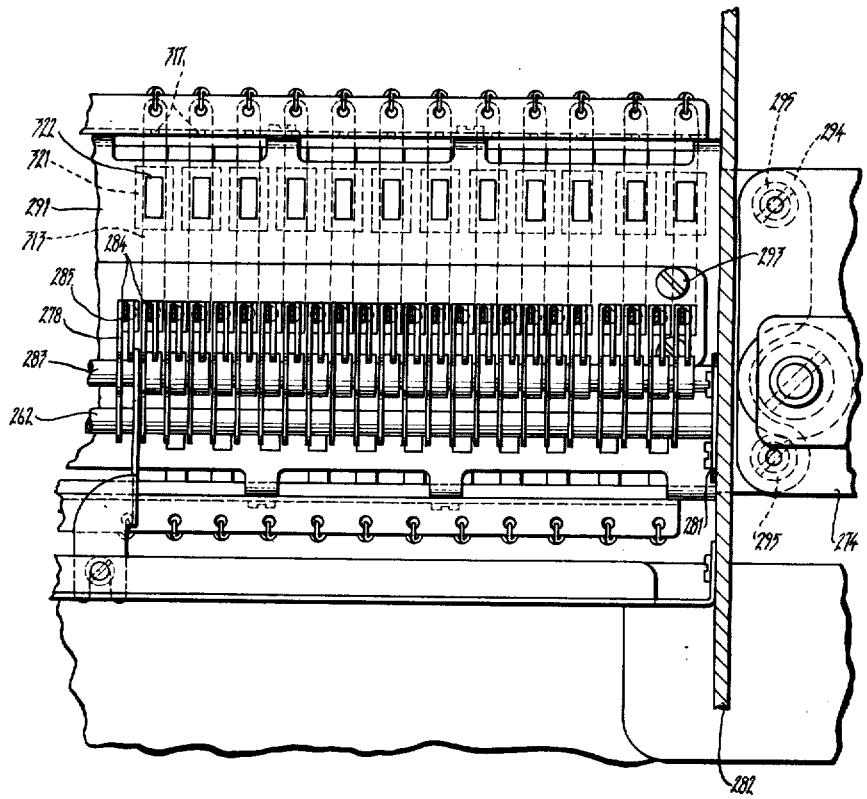
FIGS. 22 and 23 are fragmentary plan and side elevational sectional views, respectively showing the construction of electro-mechanically operated means for automatically actuating the key controlled linkages of the instant typewriter.
Figure 23:
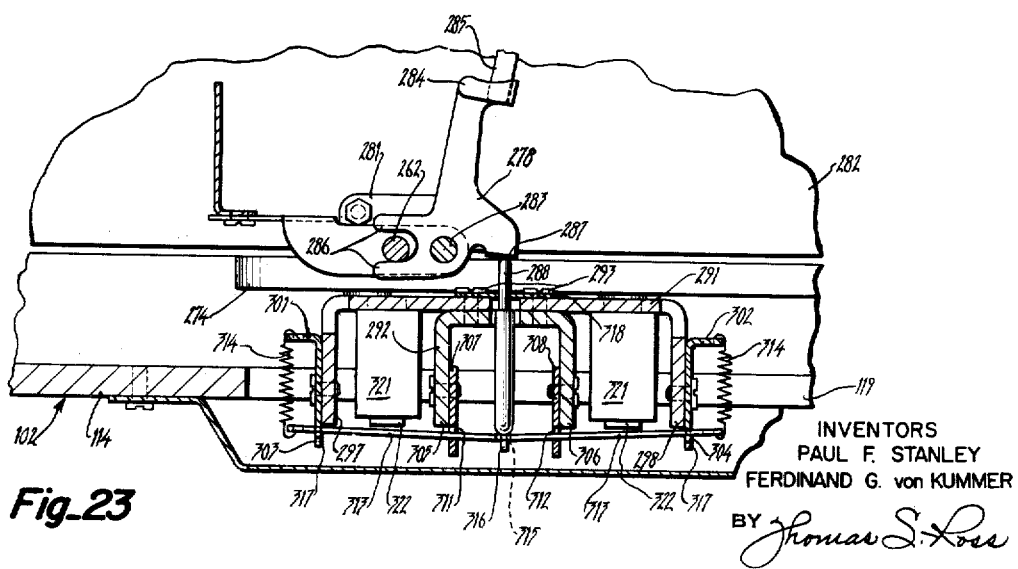

Referring to FIGS. 20 and 21 the typewriter is further provided with a timing cam 266 which is adapted to open and close an electrical circuit in timed relation to the rotation of the power roll for reasons which will hereinafter appear. The timing cam is secured for rotation with the serrated power roll 38 which is shown rotatably mounted in the sides of the typewriter frame. As shown in FIG. 21 the timing cam has three lobes and is secured to the outer end of the power roll preferably by means of a screw. A bracket 267, adjustably secured to the side of the typewriter frame adjacent the cam, fixedly supports a form A type switch 268 having a stationary contact 271 and a movable contact 272. The operative position of switch 268 is such that as cam 266 is rotated by the driven power roll 38, each of the three lobes of cam 266 will bring the contacts thereof together.

AUTOMATIC TYPEWRITER OPERATION

The electromechanical mechanisms which effect automatic operation of the typewriter will be explained with reference to FIGS. 3, 16, 22, 23 and 24. Referring again to FIG. 3 there is more clearly shown the sub base 102 which as heretofore stated supports the typewriter and other elements, namely switch assemblies and the electromechanical mechanisms. As shown in FIGS. 3 and 16 the sub base is formed with upstanding sides 273. Integral with the sides 273 extending from front to back are inwardly extending shelves 274 and bosses 275; the latter being shown in FIG. 16. The bosses are provided whereby conventional typewriter frame footings 276 may be secured thereto as by screws. The sub base is in turn provided with feet 277 which are adapted to rest on the top of the desk like housing 21.

When the typewriter is to be automatically operated, the key levers thereof will be locked to prevent manual depression thereof. Locking of the keyboard will be effected upon energization of line lock electromechanical mechanism which will effect the upward movement of actuating pin 264 (FIG. 19) thereby causing bail 246 to engage key lever shoulders 248. With the key levers locked, the pivoted levers 33, one of which is associated with each of the typewriter key levers with the exception of the case shift key lever, are adapted to be actuable by associated levers 278. As shown most clearly in FIG. 23 a pair of brackets 281 are secured on opposite sides of the typewriter frame 282. The brackets support a pair of mutually adjacent parallel cross shafts comprising the shaft 262 and a shaft 283. The levers 278 are pivotally mounted on shaft 283. All of the levers 278 have a bent over U-shaped upper end 284 which is adapted to operatively engage a downwardly depending extension 285 of an associated pivoted lever 33. All of the levers 278 are also formed with two forwardly extending projections 286 which straddle cross shaft 262 thereby defining the rotational limits of movement of levers 278. The rearward portion of each lever is provided with a bent over ear 287 which is disposed immediately above an actuating pin 288. The electromechanical means for vertically moving the actuating pin 264 and pins 288 are mounted in the spaces formed by a pair of symmetrically nested elongated U-shaped brackets 291 and 292 which are mutually secured together by means of screws 293. The ends 294 (FIG. 22) of the base portion of the larger U-shaped bracket extend beneath the shelves 274 integral with the sides of the sub base and are secured thereto as by screws 295. The legs of the U-shaped brackets extend downwardly through the aperture 119 formed in the bottom 114 of the sub base 102. The outer surfaces of legs 297 and 298 of the outer bracket 291 respectively fixedly support a pair of angle members 301 and 302 respectively; the lower edges of which are formed with a plurality of laterally spaced open ended slots 303 and 304. The inner surfaces of legs 305 and 306 of the inner bracket 292 respectively fixedly support a pair of plates 307 and 308. The lower portions of the plates 307 and 308 are formed with a plurality of laterally spaced cutouts 311 and 312 respectively which are generally aligned with associated slots 303 and 304 respectively. Associated pairs of aligned slots 303 and cutouts 311 are laterally staggered from associated pairs of slots 304 and cutouts 312. In each pair of slots and cutouts there is movably mounted an armature 313 whose outer end is connected by a spring 314 to the associated angle member 301 or 302. Here the rotational limits of movement of the rotatably biased armatures 313 are determined by the upper and lower ends of cutouts 311 and 312. The inner end of each armature 313 is provided with an aperture 315 which is adapted to receive the reduced axial extension 316 formed on the lower end of an associated pin 288. Any suitable means, such as depending bracket projections 317 intermediate each slot 303 and 304 adapted to cooperate with an aperture in an associated armature 313 may be provided so as to eliminate any undesired longitudinal displacement of armatures. As is apparent the upper ends of pins 288 extend through suitable guide apertures formed in brackets 291 and 292 and in a plate 318 which is secured to U-shaped bracket 291 preferably by screws. A plurality of key puller solenoids 321 are operatively mounted on bracket 291 each solenoid pole piece 322 being disposed immediately above an associated rotatably biased armature 313. It will be apparent that by selectively energizing the solenoids 321 the respective upwardly attracted armatures 313 and pins 288 will cause associated levers 278 to rotate in a counterclockwise direction thereby actuating an associated pivoted lever 33. When the solenoids 321 are deenergized the counterclockwise biased levers 33 will, as seen in FIG. 3, through extensions 285 return the levers 278 to their normal clockwise position, while springs 314 will return the armatures 313 to their normal positions as shown in FIG. 3.

As heretofore stated the case shift linkage does not have a lever such as 33 but rather a lever 324 such as is shown in FIG. 24 which illustrates a conventional case shift action. Here the lever 324 adapted to automatically operate the case shift mechanism is mounted on the cross shaft 283 as were levers 278. Lever 324 is provided with a bent off ear 325 adapted for association with an actuating pin 288. Lever 324 is also provided with an offset portion 326 adapted to cooperate with a bent off ear 327 of the case shift actuating lever whereby movement of lever 324 will cause the case shift pawl to engage the power roll and effect a shift of the segment from the lower case position shown to an upper case position.

PUNCH-READER UNIT

Referring now to FIG. 25 the punch-reader unit 23 has a frame type housing generally designated by reference numeral 323 which comprises an inverted U-shaped cover 324, a front panel 325, a corresponding rear panel 326 (FIG. 26) and right and left side panels 327 and 328. The left hand section of unit 23 houses the reader mechanism while the right hand section thereof houses the punch mechanism. A tape supply drawer 331 provided in the lower front of the unit 23 contains a rotatably supported roll of tape 332 which is adapted to be fed upwardly through guide means generally designated by reference numeral 333, through a tape punch station generally designated by reference numeral 334 and onto a driven take-up reel 335. A punched tape 336 which is to be read is adapted to be fed through a guide means generally designated by reference numeral 337, through a read station generally designated by reference numeral 338 and onto a driven take-up reel 341. The lower edges 342 of the right and left side panels 327 and 328 engage the top of the desk like housing and support the reader-punch unit 23.

Referring to FIG. 26, which illustrates a partially sectioned plan view of the drive mechanism for the punch-reader unit 23, most portions of the housing 323 having been cut away for the sake of clarity, there is shown a pair of vertically disposed support members 343 and 344 secured to the left and right side edges of a base plate 345. Support members 343, 344 and base plate 345 are adapted to support the housing and other elements as will hereinafter appear. The drive mechanism comprises a main drive shaft 346 which is rotatably mounted in bushings 347 (FIG. 27) fixedly retained in upstanding legs 348 and 349 and 351 and 352 of reader and punch clutch support castings generally designated by reference numerals 353 and 354 respectively which are suitably secured to the base plate 345. The shaft 346 is adapted to be continuously driven by means of a pulley 355 connected to one of its ends which is belt driven by a motor 356.

The continuously driven main shaft 346 constitutes a common input or drive for a reader and a punch wrap spring clutch generally designated by reference numerals 357 and 358. When engaged the reader clutch 357 serves to drive the various hereinafter to be described movable parts of the reader, while the punch clutch 358 when engaged serves to drive the various hereinafter to be described movable parts of the punch. The construction and operation of the reader and punch clutches 357 and 358 are the same and hence a detailed description of the reader clutch will suffice. Referring therefor to FIGS. 27–29 there is shown a driven member 361 rotatably mounted on the main shaft 346 by means of bushings 362 and 363 so that an outer cylindrical surface 364 is coextensive with the outer cylindrical surface 365 of a flanged portion 366 of main shaft 346. A sleeve 367 and an output gear 368 are secured for rotation with driven member 361. Wrapped about surfaces 364 and 365 is a helical coupling spring 371. Rotatably mounted on shaft 346 is a disk 372 which, in combination with an axial extension 373 of sleeve 367 rotatably supports a sleeve 374. The left end of the coupling spring 371 is secured by any suitable means to sleeve 374 while the right end thereof is secured to driven member 361. A clutch control disk 375 of noise dampening material, preferably nylon, is secured for rotation with sleeve 374 while a similar clutch control disk 376 is secured for rotation with sleeve 367. As shown in FIGS. 28, 29 the control disks are formed with peripheral shoulders 377 and 378.

The spring 371 has a normal diametral dimension such that, when mounted as shown in FIG. 27, it is radially expanded to a slight extent thereby to normally radially and circumferentially grip cylindrical surfaces 364 and 365 of the driven sleeve 361 and the flanged main shaft 346. In that the hand of the helical spring is in the direction of rotation of shaft 346, rotation thereof will serve to tighten the grip of the spring 371 on cylindrical surfaces 364 and 365. Spring 371 is retained in a disengaged condition by relatively rotatably displacing the reader clutch control disks 375 and 376 in opposite directions so as to "unwind" the spring 371 whereby it radially expands and moves out of operative engagement with cylindrical surfaces 364 and 365. The disks 375 and 376 are held so as to maintain the clutch disengaged by a clutch latching armature 381 and a latch member 382 (FIGS. 28 and 29). As shown in FIG. 28, armature 381 is secured to an arm 383 which is pivotally counted on a stud shaft 384 operatively supported in ears 385 formed on the clutch support casting 353. A spring 386, operatively secured between the arm 383 and a spring mounting bracket 387 fixed to the upstanding leg 348 of clutch support casting 353, serves to rotatably bias armature 381 in a counterclockwise direction so that the upper end 388 thereof remains in detenting engagement with the shoulder 377 on clutch control disk 375 thereby preventing it from rotating in a clockwise direction (FIG. 28). The latch member 382 (FIG. 29) which prevents the control disk 376 from rotating in a counterclockwise direction is secured to an arm 391 which is pivotally mounted on a shaft 392 operatively supported in ears 393 formed on the clutch support casting 353. A spring 394 operatively connected between arm 391 and a bracket 395 (FIG. 27), which is fixed to leg 349 of the clutch support casting 353, serves to rotatably bias latch member 382 in a clockwise direction (FIG. 29), so that the upper end 396 of latch member 382 remains in detenting engagement with the radial shoulder 378 formed on the periphery of disk 376.

In order to engage the reader wrap spring clutch of FIGS. 27–29 armature 381 is displaced in a clockwise direction against the action of spring 386 upon energization of a reader clutch solenoid 397 with which it is associated and which is fixedly mounted by a bracket 398 to the clutch support casting. As long as the solenoid 397 is energized armature 381 will remain out of operative engagement from the shoulder 377 on control disk 375 thereby rendering the spring 371 free to radially contract and thereby operatively couple the main shaft 346 with the driven member 361. In this engaged condition of clutch 357 the various parts thereof such as the main drive shaft 346, driven member 361, sleeves 367 and 374 and control disks 375 and 376 will rotate together in a clockwise direction (FIG. 28 and 29) and latch member 382 will idly ratchet over control disk shoulder 378. When it is desired to disengage the reader clutch 357 the solenoid 397 will be deenergized thereby permitting its armature 381 to be moved into the path of and to operatively engage shoulder 377, thereby to arrest the rotational movement of the control disk 375 and the left end (FIG. 27) of the spring 371. The rotational inertia of the driven parts will cause the driven member 361 and its associated sleeve 367 to continue their rotary motion for a short period of time after the deenergization of solenoid 397, and such will cause the right hand end of spring 371 to rotate relative to the now stationary left end of the spring 371. This relative rotation will cause the coils of the wrap spring to radially expand so as to move out of coupling engagement with cylindrical surfaces 364 and 365 and into braking engagement with the respective inner cylindrical surfaces of the sleeves 367 and 374. In this disengaged condition of clutch 357, armature 381 and latch member 382 will retain the wrap spring 371 in its radially expanded condition. Referring again to FIG. 26 the output gear 368 of clutch 357 is adapted to mesh with a gear 401 secured to a reader cam shaft 402 which is rotatably mounted in bushings 403 (FIG. 31) fixedly retained in upright brackets 404 and 405 whose base portions 406 and 407 are secured to the base plate 345.

The punch wrap spring clutch 358 operatively connected to and driven by the right end portion of the main shaft 346 as heretofore stated is constructed and operated in a manner similar to that just described for the reader clutch 357; punch clutch 358 being associated with a punch clutch solenoid 408 and an output gear 411 corresponding to the reader clutch solenoid 397 and output gear 368. The output gear 411 of punch clutch 358 is adapted to mesh with a gear 412 secured to a punch cam shaft 413 which is suitably journalled in the bushing 403 (FIG. 31) of bracket 405 and bushings 414 in upright brackets 415 and 416.

PUNCH-READER TIMING

In order that punching reading and feeding may occur in timed relation there are provided on the reader and punch cam shafts a plurality of timing cams generally designated by reference numeral 402c and 413c, adapted to close associated circuit breakers at times related to predetermined rotational positions of the punch and reader cam shafts. As shown in FIGS. 26 and 31, the reader cam shaft carries seven timing cams and associated circuit breakers and the punch cam shaft five timing cams and associated circuit breakers. The five circuit breakers associated with the punch cam shaft which are suitably mounted by brackets supported by base 345, will hereinafter be referred to as a clutch solenoid release breaker, a data punch and tape feed solenoid release breaker, a reverse tape feed solenoid release breaker, a regenerate timing breaker, and a computer to punch timing breaker. The seven circuit breakers associated with the reader cam shaft will hereinafter be referred to as reader clutch solenoid release breaker, a brush interrogate breaker, a translator interrogate breaker, a reader relay hold breaker, a reader tape feed solenoid release breaker, a reader to computer sense breaker, and a reader to computer ready breaker. As will hereinafter appear from the timing diagrams the punch and reader cam shafts make one revolution in 33⅓ milliseconds i.e. they are driven at 30 revolutions/second by the main drive shaft.

Referring again to FIG. 26 and particularly to FIG. 37, the main drive shaft 346 also has a sprocket wheel 417 secured for rotation therewith which is adapted to rotatably drive a sprocket wheel 418 through an interconnecting chain 421. The sprocket wheel 418 is secured to a punch and reader tape reel drive shaft 422 which is journalled in four upright brackets 423, 424, 425 and 426, the base portions of which are secured by any suitable means to the base plate 345. Rotatably mounted on shaft 422 are a reader and a punch tape reel drive drum 427 and 428 respectively, which are adapted to be yieldably rotatably driven by a pair of spoked magnetic coupling members 431 and 432 that are secured for rotation with shaft 422. The details of the construction and operation of the drums 427 and 428 and the respective magnetic coupling members 431 and 432 are the same; hence only one will be described in detail.

Referring to FIGS. 26 and 36 the means for supporting the punch take-up reel 335 comprises a U-shaped bracket 433, having a pair of rearwardly extending parallel arms 434. Bracket 433 is detachably secured to the upper rear of the housing cover 324 by any suitable means. The outer ends of arms 434 are formed so as to have angularly disposed camming surfaces 435 (FIG. 36) which are adapted to be engaged by axially extending reduced ends 436 of the tape reel spool center shaft 437. Under these conditions the reel 335 will normally tend to move downwardly and to the right as seen in FIG. 36, so that its periphery frictionally engages the outer cylindrical surfaces of the tape reel drive drum 428 which extends through an aperture 438 formed in the rear panel 326 of housing 323. As seen in FIGS. 26 and 36 the punch reel drum 428 is provided with a plurality of axially extending and circumferentially spaced projections 441 whose inner cylindrical surfaces are radially spaced a very small distance from the outer peripheral surfaces of magnetized radial spokes 442 of the magnetic coupling member 432. The projections 441 and the magnetized spokes 442 comprise a slip-type magnetic clutch which operatively magnetically couples the shaft 422 with drum 428. The drum 428 will be driven by shaft 346 through the chain 421, shaft 422, and the magnetic member 432 and it will yieldably drive the punch tape take-up reel 335 only to the extent permitted by the record thereby causing a constant winding tension to be applied to the tape as it feeds through the tape punch head and onto reel 335. The supporting and driving means for the reader take-up reel 341 (FIG. 37) is similar to that just described for punch take-up reel 335 and hence need not be further explained.

TAPE FEED MECHANISMS

The mechanisms for intermittently feeding record tapes or cards through the reader and punch will be described with reference to FIGS. 30 and 31. Referring to FIG. 30 there is shown a cast support member, generally designated by reference numeral 443. The cast support member comprises a generally rectangular upper portion having a downwardly inclined front side 444 and upstanding flanged rear, left and right sides 445, 446 and 447 respectively. The cast support member is supported by and above the base plate 345 by upstanding leg 448 and 451 (FIG. 26) integral with the rear and front sides of the rectangular upper portion. Lateral extensions 452 integral with the left and right sides 446 and 447 respectively rotatably support axially aligned shafts 453 and 454 on which are respectively secured a reader and a punch tape feed drum 455 and 456 respectively.

As heretofore described with reference to FIG. 26 the main drive shaft 346 drives the reader cam shaft 402 and the punch cam shaft 413 through clutches 357 and 358 respectively. As seen in FIGS. 30 and 31 the punch cam shaft 413 is formed with an eccentric circular flange 457 disposed within bushings 458 in circular cutouts 461 in the lower ends of forward and reverse tape feed drive arms 462 and 463 respectively whereby rotation of cam shaft 413 will cyclically move arms 461 and 462 up and down. The reader cam shaft 402 is formed with two eccentric circular flanges 464 and 465 which are respectively disposed in bushings 466 in circular cutouts 467 in the lower ends of a primary reader tape feed drive arm 468 and a secondary reader tape feed drive arm 471. It is to be noted in FIG. 31 that eccentric flanges 464 and 465 are eccentrically disposed 180° apart whereby as the reader cam shaft 402 rotates the primary and secondary drive arms 468 and 471 are respectively cyclically driven up and down 180° out of phase; the primary drive arm 468 initially being in the down position and the secondary drive arm 471 in the up position of their respective cycles as shown in FIGS. 30, 34 and 35.

The cyclic up and down movement of the forward and reverse drive arms 462 and 463 respectively, serve to rotatably drive the punch feed drum 456 in a forward or reverse direction through two ratchet mechanisms generally designated by reference numerals 472 and 473 as will hereinafter appear with reference to FIGS. 32 and 33. The cyclic up and down movement of the primary and secondary arms serve to rotatably drive the reader feed drum 455 at either of two forward speeds through one or both of a pair of ratchet mechanisms, generally designated by reference numerals 474 and 475 as will hereinafter appear with reference to FIGS. 34 and 35.

Referring now to FIG. 32 the forward punch tape feed ratchet mechanism 472, which is operable under the control of the tape feed drive arm 462 and a forward tape feed solenoid 476, comprises an actuator 477 which is pivotally connected on the punch feed drum shaft 453 which has secured thereto a ratchet wheel 478. The upper end of the forward tape feed drive arm 462 is pivotally connected to the actuator 477 by a stud 481. A forward tape feed pawl 482 rotatably mounted intermediate its tail end 483 and its toothed ratchet engaging end 484 to the actuator 477 as by a cross shaft 485 is coupled to the free end of an armature 486 associated with solenoid 476 by a link 487. A pawl biasing spring 488 is connected between a stud 491 on the tail end of the pawl and a cooperating stud 492 on the actuator 477. The clockwise limit of rotation of the pawl 482 is determined by the engagement of stud 491 with an upper edge 493 of actuator 477. The armature 486 is pivotally supported by a horizontal shaft 494 fixedly supported between the right and left sides of cast support member 443. The solenoid 476 is supported by a frame 495 having extensions 496 and 497, whereby it may be suitably mounted in a position such that the pole piece 498 thereof is located adjacent the arcuately movable armature 486.

Pivotally mounted on the punch feed drum shaft 453 is a stop lever 501 having an arcuate slot 502 formed in the outer end thereof. A bracket 503 is secured to an adjacent portion of the rear side 445 of the cast support member 443 and is provided with a vertically disposed rib 504 which fixedly supports a threaded stud 505 adapted to pass through slot 502 so that the stop lever 501 may be adjustably clamped to the bracket 503 by means of a nut 506. Stop lever 501 is further provided with a bent over ear 507 which overlies the upper teeth of the ratchet wheel 478 and lies in the arcuate path of travel of a depending lug 508 of pawl 482.

Referring again to FIG. 30 there is shown a shaft 511 fixedly secured to and supported by rib 504 at one end and adapted to rotatably support a bail 512. Bail 512 biased in a clockwise direction by means of a spring 513. The clockwise limit of movement of bail 512 is determined by the engagement of a detent stud 514 fixed to the intermediate portion of bail 512, with the scalloped periphery of a detent wheel 515 fixed to the shaft 453. It will be apparent that the yieldably biased bail and the detent wheel cooperate to provide a plurality of predetermined rotationally indexed positions for the shaft 453 and feed drum 456.

The operation of the forward feed mechanism is as follows. With the punch cam shaft 413 at rest the drive arm 462 is in its down position, the armature 486 is adjacent the pole piece 498, and the toothed ratchet engaging end 484 of the pawl 482 is biased out of engagement from the ratchet wheel 478. Rotation of cam shaft 413 will cause the drive arm 462 to go through an up-down cycle; the up position corresponding to 180° rotation of cam shaft 413. The upward movement of the drive arm 462 rotates the actuator 477 counterclockwise. Since the pawl 482 rotatably mounted on the actuator is linked to the armature 486, which will be restrained if the solenoid 476 is energized, it will rotate relative to the actuator and when the drive arm reaches a position corresponding to 42° rotation of cam shaft 413 it engages the ratchet wheel. Continued rotation of cam shaft 413 to 180° (the position shown in FIG. 32) rotates the actuator further counterclockwise whereby the pawl 482 will lock with and move the ratchet wheel one tooth, thereby advancing the feed drum 456 one increment. As is apparent after the pawl locks with the ratchet wheel and while the pawl is rotating the ratchet wheel no further relative motion of the pawl and actuator can occur. Hence during the interval corresponding to 90°–180° rotation of cam shaft 413 the armature 486 will be forcibly withdrawn from the solenoid pole piece 498 until the solenoid is deenergized; the latter occurring at a time corresponding to 165° rotation of cam shaft 413 as will hereinafter appear. In that the instant punching apparatus is capable of speeds up to 30 cycles per second it will be apparent that the ratchet wheel 478 and the tape feed drum shaft 453 will be very rapidly rotated in the 42°–180° interval and therefore could have sufficient inertia to carry past an extra tooth in the detent wheel 478. In the 180° position shown in FIG. 32 the toothed end of the pawl after having indexed the ratchet wheel 478 will positively arrest the rotational movement thereof and the parts secured thereto since its counterclockwise rotation is prevented by the lug 508 and the ear 507. Thus the pawl 482 serves to brake as well as to actuate ratchet wheel 478. After 180° rotation of cam shaft 413 the actuator begins a clockwise rotation as the drive arm 462 moves down whereby the pawl 482 becomes disengaged from the ratchet wheel and is returned to normal by its biasing spring 488; the shaft 453 being retained by the detent wheel. As is apparent over travel of the pawl in a return direction is prevented by the stud 491 and the surface 493 of the actuator.

If the solenoid 476 is not energized when the cam shaft 413 starts rotating, the pawl 482 will not rotate relative to the actuator during the upward movement of the drive arm 462; spring 488 holding it in its normal position relative to the actuator. At 180° rotation of cam shaft 413 however the lug 508 on the pawl will engage the ear 507 on the stop lever 501 whereby it will rotate the pawl relative to the actuator causing its toothed end 484 to engage the ratchet wheel 478 (the position illustrated in FIG. 32). In that this occurs at 180° rotation of cam shaft 413, there will be no rotational indexing of the punch feed drum.

The ratchet feed mechanism 473 shown in FIG. 33 is provided as heretofore stated for intermittently driving the punch tape feed drum 456 in a reverse or clockwise rotational direction. This mechanism is similar in nature to that described with reference to FIG. 32 and comprises a reverse feed ratchet wheel 516 secured to shaft 453, an actuator 517, a pawl 518 mounted thereon, and an armature 521 associated with a solenoid 522 linked to the pawl. In FIG. 33 however the pawl 518 is mounted on the actuator 517 below the shaft 453 and a stop lever 523, similar to stop lever 501 is provided with a bent off ear 524 180° displaced from the ear on stop lever 501. In that the eccentric flange 457 of cam shaft 413 also drives the reverse feed drive arm 463 the forward and reverse feed actuators 477 and 517 respectively are interconnected by cross shafts 485 and 525 as seen in FIG. 30. The reverse feed pawl 518 will therefor be operative to drive ratchet mechanism 473 during the clockwise movement of its associated actuator 517 rather than during its counterclockwise movement as is the case with the forward feed ratchet mechanism 472.

The operation of the reverse feed mechanism 473 is as follows. With the cam shaft 413 at rest, the reverse feed drive arm 463 is in its down position; the armature 521 is away from the pole piece of solenoid 522 and the pawl 518 is biased out of engagement with the reverse feed ratchet wheel 516. Rotation of cam shaft 413 will cause drive arm 463 to go through an up-down cycle; the up position corresponding to 180° rotation of cam shaft 413 the upward movement of drive arm 463 will move the actuator 517 counterclockwise to the position shown in FIG. 33 at which time the armature 521 will have moved to a zero air gap position adjacent the pole piece of solenoid 522. If the solenoid is energized the armature 521 will be restrained, and as the actuator moves clockwise due to the downward movement of drive arm, the pawl 518 linked to the armature 521 will be pivoted into engagement with the ratchet wheel 516 at a shaft position corresponding to 222° thereby locking with and rotating the ratchet wheel over the remainder of the cycle. As before a lug 526 on pawl 518 will brake the ratchet. A seen most clearly in FIG. 30 the solenoid 522 and rotatably mounted armature are mounted on a support frame 527 which is also secured to the right side 447 of the cast support member 443.

FIGS. 34 and 35 shows the primary and secondary tape feed ratchet mechanism 474 and 475 associated with the reader feed drum shaft 454 which is adapted to be intermittently rotated in a counterclockwise direction at a first or a second predetermined rate by one or both of said ratchet mechanisms. The respective ratchet mechanisms 474 and 475 are similar in construction and operation to the ratchet mechanisms described with reference to FIG. 32. Primary ratchet mechanism 474 comprising a ratchet wheel 528, and an actuator 531 which carries a pawl 532 which is linked to an armature 533 of a solenoid 534. Secondary ratchet mechanism 475 likewise comprises a ratchet wheel 535 and an actuator 536 which carries a pawl 537 which is linked to an armature 538 of a solenoid 541. It is to be noted in FIG. 30 that the primary and secondary solenoids 534 and 541 and associated armatures 533 and 538 are mounted in the same support frame 495 and on the same support shaft 494 as the forward punch tape feed solenoid and armature. As heretofore stated the ratchet mechanisms 474 and 475 are driven by a primary drive arm 468 and a secondary drive arm 471 which are cyclically operated up and down but 180° out of phase by eccentric flanges 464 and 465 respectively formed on the reader cam shaft 402.

The operation is as follows. With the cam shaft 402 at rest, the primary drive arm 468 is in its down position as shown in FIG. 34, its associated armature 533 is in a zero air gap position with respect the pole piece of its associated solenoid 534 and the pawl 532 is out of engagement from ratchet wheel 528.

Also with the cam shaft 402 at rest the secondary drive arm 471 is in its up position as shown in FIG. 35, its associated armature 538 is away from the pole piece of solenoid 541 and the pawl 537 is in engagement with ratchet wheel 535. As is apparent if the primary solenoid 534 is energized when the cam shaft 402 begins a cycle the ratchet wheel 528 will be driven by pawl 532 over an interval corresponding to 42°–180° rotation of cam shaft.

During the 0–180° rotation of cam shaft 402 the secondary drive arm 471 moves to a down position thereby causing its asociated armature 538 to move to a zero air gap position at 180°. If the secondary solenoid 541 is energized at this time the movement of the secondary drive arm 471 back to its normal up position will cause pawl 537 to move ratchet wheel 535 one tooth over an interval corresponding to 222°–360° rotation of cam shaft 402. Both primary and secondary solenoids are connected in circuit as will hereinafter appear only when the system is in a reader to computer mode. In other modes only the secondary solenoid will be in circuit. As seen in FIG. 30 the reader feed drum shaft 454 is also provided with a detent wheel 542, bail 543, etc. which cooperate to yieldably hold shaft 454 in a plurality of rotatably indexed positions similar to that described for the punch unit detent wheel 515.

PUNCHING MECHANISM

Referring more particularly to FIG. 36 the punching mechanisms of the tape punch unit are shown in vertical section. The construction and operation of the punching mechanism may be similar to that shown and described in copending application Serial No. 681,354, now Patent No. 2,997,231, and comprises a plurality of punch selecting solenoids generally designated by reference numerals 544 including a feed punch solenoid which are compactly spaced and suitably mounted on and between two horizontally spaced vertical mounting plates 545. The array of solenoids are all provided with armatures 546 pivotally mounted on bars 547 secured to and between the vertical mounting plates 545. A powering means which cooperates with the solenoids 544 whereby punches are selected and powered comprises a pair of spaced generally Y-shaped actuator arms, generally designated by reference numeral 548 which are fulcrumed at their lower ends on a common shaft 551 secured to and between the vertical mounting plates 545. The actuator arms 548 are adapted to be cyclically driven between predetermined arcuate limits by a punch drive arm 552 rotatably coupled to a horizontal bar 553 secured to the actuator arms 548. The punch drive arm 552 is caused to oscillate laterally forward and back through the home position shown in FIG. 36 by a circular flange 554 eccentrically formed on the punch cam shaft 413. The flange 554 is disposed within a bushing 555 in a circular cutout 556 in one end of the drive arm 552. The upper portions of the actuator arms 548 are bifurcated thereby forming angularly disposed branches 557 and 558 respectively. The actuator arms mount between them a collared pawl stop bar 561, a bell crank limit bar 562 connected to and between the rearwardly disposed branches 557 of the actuator arms, and a pawl carrier bar 563 connected to and between the forwardly disposed branches 558 of the actuator arms. A plurality of pawls 564 having upper and lower arms 565 and 566 respectively, are rotatably mounted on the pawl carrier bar 563. The upper arms 565 of the pawls are rotatably connected to the ends of links 567, whose other ends are rotatably connected to the free ends of the armatures 546. The upper edges of the lower arms 566 of the pawls are each provided with detents 568 and the lower edges thereof are each provided with an ear 571. Pawl return springs 572 are connected between the ears 571 on the pawls and to a spaced anchor rod 573 secured to and extending between the spaced actuator arms.

A plurality of bell cranks 574 are rotatably mounted on a fulcrum bar 575 extending between the two spaced vertical mounting plates 545. The axis of the fulcrum bar 575 is vertically above and substantially coincident with the axis of the actuator arm fulcrum shaft 551. Each of the bell cranks 574 has a laterally extending arm 576 and a downwardly extending arm 577, alternate laterally extending arms 576 of the bell cranks are each provided with a hole 578 and adjacent alternate laterally extending arms are provided with ears 581 whereby bell crank return springs 582 connected to the holes and ears and to spring anchor rods 583 secured to and between the horizontally spaced vertical mounting plates 545 will not interfere with one another. A bar 584 secured between mounting plates 545 serves to limit the counterclockwise rotation of the bell cranks. Cylindrical punches 585 provided with undercut portions are mounted on each of the laterally extending arms 576 of the bell cranks, with the punches 585 vertically disposed in and guided by aligned holes in a guide block 586 secured between mounting plates 545. Included in the aligned array of punches is an index or feed punch whereby, as is understood in the art, a tape passing between the guide block and a die block 587 will be perforated with coded data and feed holes. The downwardly extending arms 577 of the bell cranks are each provided on their lower edges with a detent 588 complementary to the detents 568 in the pawls 564. The laterally extending bell crank arms 577 are normally biased against the stop bar 584 by the bell crank return springs 582. The pawls 564 are also biased away from the bell cranks in a counterclockwise direction by the pawl return springs 572; the pawl stop bar 561 secured to and between the spaced actuator arms serving to limit the counterclockwise movement thereof. As is apparent with the pawls 564 so biased, the armatures 546 of the solenoids 544 are held biased away from their associated pole pieces 591 because of the links 567 connected between pawls and armatures.

As is apparent the vertical mounting plates 545 are spaced for compactness and are therefore provided with cutouts 592 whereby movement of the punch selecting and powering mechanism may move freely therebetween. As seen in FIG. 36, the guide block 586 is disposed in an opening 593 formed in the cover 324 of the housing 323 with its upper surface coextensive with the surface of cover 324.

The operation of the punch unit mechanism will be particularly described in connection with the operation of the TW/P mode infra.

TAPE READER UNIT

Referring to FIG. 37 the reader feed drum 455 comprises a body portion 594 made from a plastic insulating material, preferably nylon to which is secured an outer tubular conductive jacket 595. Associated with the drum 455 is a common brush 596 adapted to ride the conductive surface of the drum and data readout brushes 597 adapted to ride on a perforated tape to be read. The perforated tape 336 to be read will be fed beneath the data readout brushes by the feed mechanisms heretofore described, sprocket pins on the drum surface moving the perforated tapes along as is understood in the art. As is also understood in the art whenever any one or more of the data readout brushes encounters a punched hole in the tape a circuit will be completed through the conductive drum surface and the common brush 596. As seen in FIG. 37 the reader common brush 596 is mounted in an electrically insulated bracket 598 which is secured to the left side 446 (not shown) of the cast support member 443. The data readout brushes are mounted in a movable section 601 (FIG. 25) of a casting generally designated by reference numeral 602 (FIG. 25). Casting 602 is formed in the shape of a cross having lateral arms 603 and 604 and a forwardly extending arm 605 (FIG. 25).

Referring to FIG. 38 the central portion of the casting is secured to the rear side 445 of the cast support member 443 and to the top of inclined front side 444 (FIG. 39) of the cast support member as by screws. As shown in FIG. 38 the movable section 601 carries a data readout mounting block 607 which is secured thereto by a bracket 608. The movable section 601 is pivotally secured to the lateral arm 603 by a bracket 611 which is fixedly secured to the lateral arm 603 and pivotally mounted on a stud 612 supported by lateral arm 603. A camming edge 613 on the bracket adjacent pivot stud 612 cooperates with the free end of a flexible spring 614 which is also secured to the lateral arm 603. Also fixedly secured to the lateral arm 603 is a horizontal stop bar 615 and a plate 616 which is in parallel spaced relation with respect to the upper surface of housing cover 324. A plate 617 is also secured to the underside of movable section 601 with one end thereof abutting an end of plate 616. Plate 617 is provided with a hole 618 whereby the data readout brush ends may extend therethrough to ride the tape driven by the tape feed drum 455.

The underside of lateral arm 604 has secured thereto the punch die block which is spaced from the surface of housing cover 324 with the holes therein aligned with the holes in the punch guide block. As most clearly seen in FIGS. 39 and 40 the lateral arm 604 is formed with a forwardly extending lateral cavity 621 which is coextensive with a cavity 622 in the forwardly extending arm 605. Cavity 622 is disposed above the inclined front side 444 of the cast support member 443 whereby as is understood in the art chad will flow through cavities 621 and 622, down the incline and into a chad removal draw 623 (FIG. 25).

TAPE CONTROLLED AND TAPE CONTROLLING APPARATUS

Punch unit tape

Referring again to FIG. 36 the punch unit tape supply drawer 331 is slidably suspended between the side panels 327 and 328 of the punch reader unit housing 323 in any suitable manner. As seen in FIG. 36 a bracket 624 mounted on the inside of the drawer rotatably supports a tape guide roller 625. A tape supply reel 626 (FIG. 25) is horizontally disposed and rotatably supported in drawer 331 by any suitable means; the tape 332 thereon being progressively unwound and passed around a vertical guide post 627 and then rotated through 90 degrees about its longitudinal axis as it is moved towards and under guide roller 625. From roller 625 tape 332 passes through a gap 628 between the lower edge of the front panel 325 and the top front edge of drawer 331 and thence upwardly along the outer surface of front panel 325 through the tape guide means 333.

Referring to FIGS. 41 and 42, the guide means 333 comprises a plate 631 to which is secured a block 632 which is provided with a tongue 633 that is pivotally mounted by a pin 634 to a rib 635 secured to the front panel 325 by any suitable means such as screws. The tongue 633 is provided with a groove 636 that is adapted to be engaged by a ball detent 637 which is yieldably biased by a spring 638 seated in a hole 641 in the rib. From the foregoing it will be apparent that the guide plate 631 may be moved to and yieldably held in either an open or a closed position. In the latter position plate 631 will be held in overlying frictional contact with the tape 332 that is passing upwardly along the front panel 325.

Referring again to FIG. 36, while passing through guide means 333, the tape 332 will pass between two aligned apertures 642 and 643 respectively, which are formed in the guide plate 631 and front panel 325. In passing therebetween the tape maintains a spring biased movable contact arm 644 of a form C type "preliminary out of tape" switch 645 in one of its two positions. As soon as the last bit of tape 332 has passed between apertures 642 and 643, the contact arm 644 will be free to move outwardly to the other of its two positions. The circuitry affected by this action will be hereinafter described. Switch 645 is fixedly secured to the base plate 345 by a bracket 646. A form C type "punch tape tension" switch 647 comprising a movable contact arm 648 is fixedly secured to the housing cover 324 by a bracket. The end 649 of the contact arm 648 normally extends through an aperture 650 formed at the upper front corner of the housing cover 324. The tension normally exerted on the tape 332 in order to pull it through guide means 333 is not sufficient to move switch contact arm 648 from the one of its two positions shown. If the tension on tape 332 becomes excessive however the movable switch contact arm 648 will move inwardly to the other of its two positions and effect circuit changes as will hereinafter appear.

A "final out of tape" form C type switch 651 comprising a movable contact arm 652 is secured in a cavity 653 of the lateral arm 604 of casting 602 by a bracket 654. The end 655 of the movable contact arm 652 overlies an aperture 656 formed in the housing cover 324. Here, as long as there is any tape 332 passing beneath the movable contact arm, switch 651 will be maintained in one of its two positions. As soon as the last bit of tape passes over aperture 656 the movable contact arm will move to the other of its two positions and affect circuitry hereinafter to be described.

As further seen in FIG. 36 the rear side of lateral arm 604 of casting 602 is provided with a pair of laterally spaced depending brackets 656 (only one of which is shown) adapted to pivotally support a tape deflector plate 657. In its counterclockwise position an arcuate portion 658 of plate 657 cooperates with a portion of the periphery of the punch feed drum 456 so as to insure that the tape 332 in passing through the punch unit is always maintained in operative engagement with the feed drum 456. One of the side edges of the plate 657 is provided with a pair of mutually adjacent detent grooves 659 which are adapted to be selectively engaged by a conventional type spring biased ball detent 661 operatively mounted in lateral arm 604. The tape deflector plate 657 may thus be moved to and yieldably held in both a clockwise and a counterclockwise position.

Referring to FIG. 43 switching means are provided for interrupting the operation of the reader-punch unit when either of the tape take-up reels 335 or 341 have predetermined maximum desired amounts of tape wound thereon. As seen in FIG. 43 a form C type switch 662 having a movable contact arm 663 is fixed to a bracket 664 mounted on the reader punch base 345. The movable contact arm 663 is pivotally mounted on bracket 664 by means of a stud 665 and extends upwardly and through an aperture 666 formed in the rear housing panel 326. An arcuate portion 667 of arm 663 extends between the axially spaced side disks 668 of the take-up reels so that when a predetermined amount of tape has been wound on the reel, arm 663 will be pivoted in a clockwise direction thereby operating the movable contact thereof from its normal position. The counterclockwise limit of movement of arm 663 is determined by the bent off ear 671 formed on the switch supporting bracket 664.

*Reader unit tape*

Referring again to FIG. 37 the tape reader unit is provided with a tape tension switch 672, a "final out of tape" switch 673 and a full reel switch (not shown) which are respectively similar to those just described for the tape punch unit.

RECORD GUIDE MECHANISM

As heretofore stated the instant reader punch assembly 23 may be used to punch or read record tapes or cards. Referring to the general illustration in FIG. 25 it will be noted that the housing cover 324 has two sets 674, 675, of five elongated slots formed therein which are respectively associated with the record reader and punch stations. Elongated guide members are adapted to be operatively disposed in each slot which as will hereinafter appear, are capable of being moved to an elevated or operative position or to a retracted or inoperative position.

Referring therefore to FIG. 44 which shows the reader unit record guide mechanism, there is shown a pair of spaced rearwardly extending brackets 676 and 677 which are suitably secured to the underside of the housing cover 324 and which rotatably support a cross shaft 678. Mounted on shaft 678 are five radially extending lever arms 681, 682, 683, 684 and 685; the four arms 681, 682, 684 and 685 being rotatably mounted thereon while lever arm 683 is secured thereto by a set screw 686. The outer ends of said five arms 681–685 are respectively pivotally connected to the forward ends of record guide members 687, 688, 691, 692 and 693. The rearward ends of the guide members are respectively pivotally connected to the outer ends of radially extending lever arms 694, 695, 696, 697 and 698 which are mounted on a cross shaft 701; lever arms 695, 696 and 697 being rotatably mounted thereon while lever arms 694 and 698 are secured thereto by set screws 702 and 703 respectively. Shaft 701 is rotatably mounted by a pair of spaced forwardly extending brackets 704 and 705 suitably secured to the housing cover 324. The lever arms 694–698 are respectively biased in a counterclockwise direction, as seen in FIG. 44, by means of springs 706 which are anchored to a cross shaft 707 also mounted in brackets 704 and 705. In this way all of the guide members 687–693 are normally biased to their retracted or inoperative positions wherein the respective upper edges thereof are disposed below the surface of housing cover 324.

The means for selectively elevating the reader record guides to their respective operative positions comprises a manually operated tape guide control button 708 and three manually operable card guide control buttons 711, 712 and 713 which are pivotally mounted on a cross shaft 714 supported by brackets 676 and 677. The push buttons 708, 711, 712 and 713 extend through suitable apertures formed in the forward portion of the housing cover 324, so as to be accessible to an operator.

A bail 715 adapted to retain selected guide members in elevated or operative positions is pivotally mounted on the brackets 676 and 677 by studs 716 and 717. The bail is biased in a clockwise direction by a spring 718 which is anchored to a bent-off ear 719 of bracket 676. A bail release lever 721 is rotatably mounted on cross shaft 714 and has a rear bent off ear 722 which extends through a suitable slot in bracket 677 and underlies the left hand arm portion of bail 715. Lever 721 is biased clockwise by a spring 723. The forward or outer end of the release lever 721 extends thru a suitable aperture in the forward side of the housing cover 324 so as to be readily accessible to an operator. It will be apparent that the bail 715 may be rotatably actuated in a counterclockwise direction by manually depressing release lever 721.

As seen in FIG. 44 the lower edge of tape guide control button 708 has secured thereto a finger 724 which extends rearwardly so as to underlie the outer end of a lever arm 725 rotatably secured to the cross shaft 678 by a set screw 726. When the tape guide push button 708 is depressed the finger 724 will cause lever arm 725 and shaft 678 to rotate in a clockwise direction. In that lever arm 683 is the only one of the five lever arms 681–685 which is secured for rotation with shaft 678 the clockwise motion of shaft 678 will cause arm 683 to swing the tape guide member 691 upwardly and rearwardly to an elevated position against the action of the spring 706 associated therewith, so that the upper edge of guide member 691 extends through its associated slot in the housing cover 324 as shown in FIG. 25. During the upward movement of guide member 691 an upper forward bevelled edge 727 thereof will engage the rearward edge 728 of bail 715 and will rotate the latter in a counterclockwise direction against the action of spring 718 until bail edge 728 clears the bevelled edge 727 of guide member 691 whereby springs 718 will urge bail 715 into a notch 731 in the guide member 691 formed just forwardly of bevelled edge 727. After this occurs the tape guide member 691 will remain held in this elevated or operative position against the action of its associated spring 706 and push button 708 will also remain depressed. The other guide members 687, 688, 692 and 693 are also provided with bevelled edges 727 and bail engaging notches 731.

The tape guide member 691 may be restored to its normal inoperative position by depressing the release lever or one of the card guide control buttons. Depressing release lever 721 will lift the rear edge 728 of the bail 715 out of detenting engagement with notch 731 whereby spring 706 may urge guide member 691 to its retracted position as shown in FIG. 44.

When the card guide control 711 or 712 is depressed a rearward edge 732 thereof will directly engage an extension 733 provided on the forward end of card guide member 688 or 692 and will thereby displace the particular one selected to its operative position releasing the bail from the notch 731 of a previously selected guide member. After the previously selected guide is restored the bail will lock and hold the guide member 688 or 692 in a manner similar to that just described for guide member 691. Restoration of guide member 688 or 692 may be accomplished in the same manner as that just described for guide member 691.

Depression of push button 713 will serve to displace not only guide member 693 to its operative position but also will similarly elevate guide member 687 in that both of the rearwardly mounted lever arms 698 and 694 respectively of guide members 693 and 687 are secured for rotation with common shaft 701.

As is apparent therefore by selectively displacing the various guide members 687–693 to the respective elevated positions, a separate and appropriate guide means may be provided for various size records to be fed into the read station 338 of the assembly 23.

It will be understood that the punch as well as the reader portion of assembly 23 is provided with a set of record guides and operating linkages which are similar to that shown and described in connection with FIG. 44. In addition the record guide means associated with the punch unit has associated therewith a pair of identical form C card switches, generally designated by reference numerals 732 and 732a in FIG. 45 which are operated together by a bent over portion 733 of a movable contact arm 734 which is rotatably secured to the right hand end of a shaft 678′ which corresponds to shaft 678 of FIG. 44. The switches are secured to a bracket 676′ which corresponds to the bracket 676 of FIG. 44. It will be apparent that when the control or punch tape guide member 691′ which corresponds to tape guide member 691 is elevated and retracted the accompanying rotation of the shaft 678 will cause arm 734 to operate the movable contacts of switch 732 from one to another of their two positions.

The manner in which the units described above are electrically interconnected and rendered operative to effect the hereinbefore described modes of operation through switch means associated with the control panel buttons will now be described with reference to FIGS. 46–65.

*Main power circuit*

Referring to FIG. 46 there is shown a power supply circuit which is adapted to supply proper operating potentials, to various points in the system. The power supply comprises a transformer 751 having primary windings 752 and 753 and secondary windings 754 and 755. The primary windings are adapted to be energized upon closure of a switch 756 connected in alternating current power lines 757. The switch 756 is adapted to be operated to a closed position and latched upon depression of the main power button on the control panel whereby power is connected across the primary windings. As is understood the primary-secondary turns ratios will be in accordance with the system operating potentials required.

As seen in FIG. 46 secondary winding 755 has four output terminals 1, 2, 3, and 4. Terminals 1 and 4 are connected across the input terminals of a full wave bridge rectifier comprising four rectifiers 758 whose output terminals are connected to a resistor-capacitor filter generally designated by reference numeral 761. Similarly terminals 2 and 3 are connected across the input terminals of a full wave bridge rectifier 762 whose output terminals are connected to a resistor-capacitor filter 763. After rectification and filtering positive and negative 100 volt direct current system operating potentials are obtained at terminals 764 and 765 respectively, and positive and negative 17.5 volt system operating potentials are obtained at terminals 766 and 767 respectively.

The alternating current flowing in secondary winding 754 is adapted to light an indicator lamp 768 which is disposed beneath the main power button, heat the filaments 771 of electron discharge elements employed in the system and to heat the heater element 772 of a thermal time delay relay 773 comprising a stationary contact 774 and a movable contact 775.

Initially current will flow from the 100 volt terminal 764 via a conductor 776, the normally closed contacts 2 and 3 of a relay 777, a conductor 778 and to ground (FIG. 49) via a current limiting resistor 781 and an indicator lamp 782 which is located beneath the keyboard lock button on the control panel and via a keyboard line lock solenoid 783. Energization of solenoid 783 operates mechanism (FIG. 19) in the typewriter adapted as heretofore described to prevent depression of the typewriter keys until the electronic components of the system have reached operating temperatures. After a time sufficient for the electronic components to reach operating temperatures the heater element 772 of the time delay relay 773 is sufficiently heated whereby its contacts 774 and 775 close. Closure of contacts 774 and 775 causes current to flow from 100 volt terminal 764 to ground via conductor 784, delay relay contacts 774 and 775, and relay 777. This energizes relay 777 which operates its contact stack comprising movable contact 2 and associated stationary contacts 1 and 3 and movable contact 5 and associated stationary contacts 4 and 6. As is apparent the opening of contacts 2 and 3 breaks the keyboard line lock solenoid circuit. Closure of contacts 2 and 1 causes current to flow from 100 volt terminal 764 via conductor 776, relay contacts 2 and 1, a conductor 785, a current limiting resistor 786, and an indicator lamp 787 disposed beneath the ready button on the control panel, to ground. Closure of contacts 5 and 4 of relay 777 connects ground to the center tap of secondary 755 thereby effectively shorting out a resistor 788 designed to dissipate the initial surge of current in secondary winding 755.

The A.C. power lines 757 are also connected to the punch and reader unit motor 356 and to the typewriter motor circuits. The typewriter motor circuit will, however, remain open until the typewriter "on" switch is operated. With the main power switch 756 latched, the system is ready to be placed in the various modes of operation. To turn the system off the main power button is depressed and released to thereby unlatch main power switch 756 and open the main power circuit.

Typewriter to punch mode (TW/P)

Referring to FIGS. 47–50 and particularly to FIG. 47, there are schematically shown exemplary ones of the typewriter mounted switches associated with the hereinfore described key controlled mechanisms which effect the printing of characters, numerals, punctuation, special symbols, and machine controls such as carriage return, tabulation, line feed etc. Each switch, as heretofore stated with reference to FIG. 4, with the exception of the shift switch comprises a movable contact 62 and a stationary contact 61; the switch 106 associated with the shift key controlled mechanisms as heretofore stated comprises a movable contact 134 associated with two stationary contacts 135 and 136.

The stationary contact 61 of each of the switches with the exception of the shift switch is connected to a common negative 17.5 volt terminal 791 and the movable contacts 62 of the switches are connected by leads to a plurality of encoder input conductors generally designated by reference character $x$. As seen in FIG. 47 the movable contact of the shift signal switch is connected to terminal 791 and its stationary contacts are connected to upper and lower case conductors of the encoder. The special key 196 on the typewriter is adapted to operate the three form C switches 213, 214 and 215, heretofore described with reference to FIG. 16, which are associated with the "X" key and the backspace key for reasons which will hereinafter appear. Depression of the special key 196 operates the three form C switches directly.

The encoder comprises a printed circuit board 792 having the plurality of input conductors $x$ deposited in parallel relationship on one side thereof and a plurality of output conductors generally designated by reference character $y$ along with a conductor 793 and a conductor designated P for parity, or check, deposited in parallel relation on the other side of the board; and all preferably at right angles to the input conductors $x$. All the $x$ and $y$ conductors are deposited on the board in accordance with well known printed circuit techniques; interconnections to and between printed circuit conductors being effected by rivets or the like. The numerical relationship between the $x$ and $y$ conductors is in accordance with the equation $x=2^y$. The $y$ conductors then represent binary levels 1, 2, 4, 8, 16 and 32; the latter two levels being designated N and A on the drawings for numeric and alpha.

Each of the $y$ conductors representing the successive binary levels, 1, 2, 4, 8, N and A and the P conductor, is connected to a non-linear element, preferably a PNP transistor 794 by a lead line 795.

Each of the $x$ conductors is connected respectively through a resistor 796 to the conductor 793 which is connected to a positive 17.5 volt terminal 797, whereby all the $x$ conductors will be tied to a stable reference point. Each $x$ conductor is also selectively connected to one or more of the $y$ conductors through linear passive elements in the form of resistors in accordance with the binary coding arrangement illustrated in FIG. 51. For example, the $x$ conductor associated with the letter "A" switch is connected to the 1 and alpha $y$ conductors by resistors 798 and 801; the $x$ conductor associated with the letter "C" switch is connected to the 1, 2 and alpha $y$ conductors by resistors 802, 803 and 804 and also to the P for parity or check level printed conductor by resistor 805, etc.

In the coding arrangement employed by the system, the characters, numerals, machine functions, etc. will be represented by different hole combinations in the six levels 1, 2, 4, 8, N, and A of a record as shown in FIG. 51, where the absence of a hole represents a non conductive and the presence of a hole a conductive transistor. The seventh or P for parity level has no significance in representing data and acts only as a safety feature when the system is employed with a computer. If the code representation of a piece of data has an odd number of holes or bits the encoder will automatically provide a parity bit to make the number of bits come out even, except for null which is recognized in the computer as such. Hence when the computer senses an odd number of holes other than null in a punched tape it will recognize it as a punching error and stop operation.

Referring more particularly to FIG. 51 there is shown the six plus one code employed in the instant invention which is designed for compatibility with contemporary communication and data processing practice. As shown the code is basically a six level code where the first thirteen letters of the alphabet are represented by numbers 1–13 in binary notation with a bit in the A level to indicate a letter in the first half of the alphabet. The last 13 letters are represented by numbers from 1–13 in binary notation also, but with bits in the N and A levels to indicate a letter in the second half of the alphabet. Numbers are represented in binary-excess-three notation because it offers adavntages with computer usage. In computations it generates "carry" signals corresponding to decimal carries; it simplifies complementing of a coded number for subtraction routines and provides a code for zero that is different from the code for blank. As shown in FIG. 51 a bit in any of the first four levels plus a bit in the numeric level represents a number. The code designations for special symbols and punctuation are irregular and may appear with an alpha or a numeric bit, or both. The absence of both an alpha and numeric bit indicates a control function such as line feed, carriage return, etc.

As is understood up to 64 hole combinations are possible with a six level code. As will be observed from FIG. 51 each of the six code levels is employed thirty-two times in different hole combinations. In accordance with the invention therefor the number of resistors selectively connected to each of the $y$ conductors representing a binary level is equal to one half the number of pieces of data capable of being eneoded by a predetermined level code. In other words each level conductor is connected to $2^{y-1}$ resistors and in the six level encoder illustrated in FIG. 47, each of the 1, 2, 4, 8, N and A $y$ conductors will be connected via thirty-two resistors to thirty-two of the $x$ conductors associated with different business machine key controlled switches; the particular thirty-two being in accordance with the code illustrated in FIG. 51.

As shown in FIG. 47 each lead line 795 is connected to the common base electrode of its associated PNP transistor 794. The emitter electrode 806 of each transistor is connected to a common conductor 807 which is connected to a voltage divider network 808 across a positive 17.5 volt current supply source 811. The collector 812 of each transistor is connected to a negative 17.5 volt terminal 813 (FIG. 48) via encoder output conductors 814, representing binary levels 1, 2, 4, 8, N, A and P, and associated lead resistors 815. Each collector 812 is also connected by an associated diode 816 to a common output conductor 817 which is connected to a computer terminal 818 (FIG. 49) and which is connected to a negative 17.5 volt terminal 821 (FIG. 48), as will hereinafter appear, by a load resistor 822.

The values of resistors 796 and the resistors forming the voltage dividing network 808 are such that transistor emitter-base reverse bias obtains to aid in eliminating noise signal effects in transistor operation. When all of the movable contacts 62 are in the positions shown in FIG. 47 none of the transistors will be effectively conducting since a PNP transistor will conduct appreciably only when its base is negative with respect to its emitter.

Referring to FIG. 48 there are shown punch selector solenoid control thyratrons 823 associated with the 1, A and P encoder output conductors 814. For purposes of clarity the thyratrons associated with the 2, 4, 8 and N encoder output conductors are not shown but it is to be understood that they will be similar in all respects to the ones shown. Each thyratron 823 comprises a plate, control grid, shield grid, and grounded cathode. As shown the control grid of each thyratron is biased below its tube firing potential through connection with the negative 17.5 volt terminal 813 by a grid input resistor 824; capacitors 825 being provided to prevent uncontrolled firing. The plate of each thyratron is connected to a common bus conductor 826 through a load resistor 827 and one of the punch selector solenoids 544 adapted, when energized, to effect the selection of associated ones of the punches 1, 2, 4, 8, N, A, and P as will hereinafter be described. Protective diodes 828 are connected in parallel with the solenoids 544 to provide paths for the currents which result from collapsing of the solenoid fields. Plate voltage (100 volts) for the thyratrons is connected to conductor 826 through the data punch selector solenoid release breakers 831 operable by one of the timing cams 413c. The encoder output signals developed across each load resistor 815 are differentiated and the negative spikes clipped by circuits comprising capacitors 832, diodes 833, and grid input resistors 824; the positive voltage spikes developed across resistor 824 being applied to the grids of the punch selector solenoid control thyratrons 823 through coupling resistors 834, 835 and current limiting resistors 836. The signals developed across load resistors 815 are also connected to computer input terminals 837 for reasons which will hereinafter appear. Signals from computer output terminals 838 and "regen" input terminals 841, as will hereinafter appear, are also adapted to be connected across input resistors 824 through properly poled diodes 842 and 843 respectively.

Also shown in FIG. 48 are a reverse tape feed solenoid control thyratron 844, a clutch solenoid control thyratron 845 and a forward tape feed and index punch selector solenoid control thyratron 846; each having a plate, a control grid, a shield grid, and grounded cathode. The control grids are biased below tube firing potentials through connection to a negative 17.5 volt terminal 847 by grid input resistors 848, 851 and 852 respectively. The plate of thyratron 845 is connected to a positive 100 volt supply terminal 853 via a plate load resistor 854, the clutch control solenoid 408, and the clutch solenoid release breakers 855 operable by one of the timing cams 413c. The plate of thyratron 846 is connected to the common 100 volt bus conductor 826 via the forward tape feed solenoid 476, a conductor 856, contacts 2 and 3 of the from C card switch 732 which are normally closed during tape perforating operations, a conductor 857, and an index punch selector solenoid 858. The plate of the reverse feed solenoid control thyratron 844 is supplied with power from termnial 853 via a load resistor 861, the reverse tape feed solenoid 522, and the reverse tape feed solenoid release breakers 862 operable by one of the cams 413c. The signal from the common encoder output conductor 817 developed across load resistor 822 is differentiated and the negative spikes clipped by circuitry comprising capacitor 863, diode 864 and grid input resistors 851 and 852; the signals developed thereacross being applied to the grids of the punch clutch solenoid control thyratron 845 and the punch forward tape feed and index punch selector solenoid control thyratron 846 to thereby fire said thyratrons.

Referring now to FIG. 49 depression of the TW/P button on the control panel will close a "push to close-release to open" form A switch 865 associated therewith thereby completing a 100 volt circuit. Current will flow from a positive 100 volt terminal 866 connected to the movable contact 2 of the form C punch tape tension switch 647 comprising stationary contacts 1 and 3. If a tape being perforated is feeding freely the movable contact 2 will be in the position shown. Hence current will flow through contacts 2 and 3, over a conductor 867 to the movable contact 2 of the form C card switch 732a operable simultaneously as heretofore stated with card switch 732 (FIG. 46). When tapes are being perforated the tape guide 691¹ (FIG. 25) will be elevated and the movable contact 2 will be in the position shown, and otherwise when cards are being perforated. Current will therefore flow through contacts 2 and 3 to the movable contact 2 of the form C preliminary out of tape switch 645 comprising stationary contacts 1 and 3. As heretofore explained when a quantity of tape still to be punched remains on the supply spool, movable contact 2 will be held thereby in the position shown. Current will therefore flow through contacts 2 and 3, a conductor 868 to a computer terminal 871 and also to a conductor 872, the normally closed contacts 1 and 2 of a punch interlock relay 873, comprising normally closed contacts 3 and 4, conductor 874, the closed button controlled TW/P switch contacts 1 and 2, conductors 875 and 876, the coil of a TW/P relay 877, and to ground via a conductor 878 and the normally closed contacts 2 and 3 of a nonlatching form C button controlled punch off switch 881 operable from the control panel.

Upon energization of the TW/P relay 877 its six form C contact stack is operated from the positions shown thereby making TW/P contacts 3–4, 6–7, 9–10, 12–13, 15–16 and 18–19. Closure of contacts 6 and 7 connects a 6.3 volt terminal at contact 7 to an indicator lamp 882 located beneath the TW/P control panel button thereby indicating the mode is energized and that switch 865 may be opened by releasing the TW/P button. Closure of contacts 15 and 16 causes current to flow from a 100 volt terminal 883 at contact 16, over a conductor 884 and through the TW/P relay coil to ground whereby the TW/P relay will remain energized after the TW/P switch 865 is released. Closure of contacts 15 and 16 also causes current to flow over conductors 885 and 886 to ground through the punch interlock relay 873 thereby operating its contact stack and breaking normally closed contacts 1 and 2. This assures that no other mode utilizing the punch unit may be inadvertently placed in operation without first deenergizing the TW/P mode. The latter may be accomplished by operating the punch off switch 881 from the control panel thereby breaking the TW/P relay ground return circuit through contacts 2 and 3 of the punch off switch.

Closure of TW/P contacts 18 and 19 connects a positive 17.5 volt terminal 887 at contact 18 rather than a negative 17.5 volt terminal 888 at contact 20, via conductor 891 (FIGS. 49 and 48) to the cathodes of rectifiers 892 (FIG. 48) whereby junctions 893 in the grid input circuits of thyratrons 832 will be clamped to positive rather than negative 17.5 volt potentials. This conditions the thyratron input circuits whereby signals from the encoder output lines 1, 2, 4, 8, N, A, and P after differentiation will be effective to fire associated thyratrons.

As heretofore stated the encoder common output conductor 817 is adapted to be connected across load resistor 822 (FIG. 48). This accomplished upon closure of TW/P contacts 9 and 10 which connect conductor 817 to a conductor 894 (FIGS. 49 and 48).

Closure of TW/P contacts 12 and 13 connects the positive 100 volt terminal 866 at the punch tape tension switch 647 (FIG. 49) via contacts 3 and 2 of tape tension switch 647, conductors 986, 897, contacts 11 and 10 of the group of switches 105 associated with the typewriter case shift mechanism shown as heretofore stated in a normal lower case position, and conductors 898 and 899 to contact 2 of a tape feed switch 895 (FIG. 48) associated with the tape feed control panel button. This connection permits automatic tape feed only when the typewriter is in lower case. Movable contact 1 of the tape feed switch is connected by a conductor 901 to the grids of the punch clutch and tape feed control thyratrons 845 and 846 through properly poled diodes.

Closure of TW/P contacts 3 and 4 connects the stationary contact 1 of the tape tension switch 647 via conductors 902 and 903 to a stop relay 904 whereby when tape tension is lost for any reason the movable contact 2 of switch 647 moves into contact with contact 1 thereof whereby current will flow from the 100 volt terminal 866 through conductors 905 and 906 to ground through a current limiting resistor 907 and a punch tape malfunction indicator 908 located beneath the punch tape button on the control panel, and through the stop relay via conductors 902 and 903. Closure of stop relay contacts 5 and 6 connects 100 volts on contact 6 via conductors 911 and 778 across the keyboard line lock solenoid 783 which locks the typewriter keyboard.

When the end of the tape being perforated has travelled past the preliminary out of tape switch 645 its movable contact 2 will connect with contact 1 thereof and current will flow from the 100 volt terminal 866 through contacts 2 and 3 of the punch tape tension switch 647, contacts 2 and 3 of the card switch 732a, contacts 2 and 1 of the preliminary out of tape switch 645, conductor 912 to the movable contact 2 of a form C switch 913 comprising stationary contacts 1 and 3. Switch 913 is operable from the interlock nullify button on the control panel as are movable contact arms 5 and 8 of a form A and a form B switch 914 and 915, respectively, associated therewith. The normal position of the movable contact arms 2, 5 and 8 are as shown thereby enabling current to flow via contact 2 to conductor 906 and as heretofore described through the punch tape malfunction indicator 908 and over conductor 902 to the stop relay which will operate to lock the keyboard as before.

If it is desired to perforate the length of tape remaining between the preliminary out of tape switch 645 and the form C final out of tape switch 651 the interlock nullify button on the control panel is depressed thereby operating and latching the ganged movable arms 2, 5 and 8 of the switches 913, 914 and 915 associated therewith to their other positions. As is apparent movement of contact 2 of switch 913 to contact 1 thereof breaks the circuits to the punch tape malfunction indicator 908 and to the stop relay 904, connecting contact 1 of the preliminary out of tape switch 645 via a conductor 916 to the movable contact 2 of the form C final out of tape switch 651 comprising stationary contacts 1 and 3. As long as tape remains the movable contact 2 of switch 651 will be in the position shown. Movement of movable contacts 5 and 4 respectively of the switch associated with the interlock nullify button lights an interlock nullify indicator 917 located beneath the control panel interlock nullify button and breaks the ground return circuit of a computer to punch mode relay as will hereinafter appear.

When the tape being perforated is exhausted the movable contact 2 of the final out of tape switch 651 will move into contact with contact 1 thereof reestablishing the 100 volt circuits to the punch tape malfunction indicator 908 and the stop relay 904.

The form C tape reel full switch 662 not shown in the schematic drawings may be connected so that current from terminal 866 will flow through the tape tension switch 647, card switch 732a and normally closed contacts 2 and 3 of switch 662 and then through preliminary out of tape switch 645. Contact 1 of switch 662 is connected to conductor 902 whereby if the tape reel is full stop relay 904 will be energized.

As heretofore stated the system is operable to punch cards upon depression of the card guide control buttons 711, 712 and 713 mounted on the punch unit. Operation of the control buttons as heretofore explained causes movable contacts 2 of card switches 732 and 732a to move from the normal positions shown in FIGS. 48 and 49 and proper card guides to move upward. Before inserting a card the tape tension switch 647 will be and remain in the normal position shown, while the preliminary out of tape and final out of tape switches will be in other than the normal positions shown. Insertion of a card beneath the punch unit will cause the movable contact 2 of the final out of tape switch 651 to assume its normal position; the malfunction indicator to extinguish and the stop relay to drop out. When the end of the card has passed beyond the final out of tape (now card) switch 651, the malfunction indicator 908 will light and stop relay 904 will pull in; current flowing from the 100 volt terminal 866 through contacts 2 and 3 of the punch tape tension switch 647, contacts 2 and 1 of the card switch 732a, conductor 918, contacts 2 and 1 of the final out of tape switch 651 and to ground as explained above thereby lighting the malfunction indicator and energizing stop relay 904.

The operation of the typewriter to punch mode will now be explained with particular reference to the timing diagram of FIG. 50. Referring therefore to FIG. 50, curve 921 shows the typewriter power roll tooth timing.

Depression of a key lever on the typewriter will initiate a type bar action at the time $t_0$, the motion of the type bar being illustrated by curve 922. As heretofore explained the type bar mechanisms associated with the type bar actuated will encounter a ball lock and effect the closure of type bar switch contacts 61 and 62 at time $t_1$ a predetermined time before the type bar strikes the platen; the striking point being illustrated by reference numeral 923. This arrangement assures that, when a type bar reaches a predetermined point in its arc, no other type bar can interfere with it and that only the switch contacts 61 and 62 associated with the key lever depressed will be operated. The interval over which contacts 61 and 62 are closed is illustrated by a curve 924. Closure of a type bar switch, for example the one associated with an "A" key, energizes discrete encoder circuits between terminals 791 and 797 and the currents flowing therein cause the bases of the transistors associated with the 1 and A $y$ conductors to become negative with respect to their emitters, whereby said transistors conduct. The signals from transistors 1 and A are delivered over the 1 and A output conductors 814 and after differentiation in circuits comprising resistors 824 and capacitors 832 the signal developed across resistors 824 will fire thyratrons 1 and A which thereby energize punch selector solenoids 1 and A. The signal on the common output line 817 of the encoder developed across resistor 822 after differentiation by capacitor 863 and resistor 851, and capacitor 863 and resistor 852, respectively, raises the grid potentials of the punch clutch solenoid control thyratron 845 and the punch tape feed and index punch selector solenoids control thyratron 846 respectively, via closed TW/P relay contacts 9 and 10 in the control circuit thereby firing those thyratrons. The encoder output signals are differentiated so that if for any reason the switch contacts 61 and 62 remain closed too long or the transistors remain conductive after switch contacts 61 and 62 open only one pulse will be delivered to the thyratrons. Carriage return, shift, line feed, tabulation etc. operate their respective switches as hereinbefore described to effect coding in a similar manner.

Referring again to the timing diagram it may be seen that the punch clutch solenoid 408 (current curve 925) the punch and selector solenoids 544 and the tape feed, and index solenoids 476 and 858 (current curve 926), are simultaneously energized at time $t_2$ by the encoder output signals. At time $t_3$ the punch clutch solenoid current is sufficiently built up to pull its associated armature from engagement with its clutch control disk thereby permitting the punch clutch wrap spring to wrap and couple shaft 346 to the punch clutch driven member whereby a cycle is started at time $t_4$. Rotation of the punch clutch driven member causes the punch cam shaft 413 to rotate 360° which in turn causes the forward and reverse tape feed drive arms 462 and 463 (FIG. 32) driven by eccentric flange 457 to go through their cyclic up and down motions (curve 927), and the punch drive arm 552 (FIG. 36) driven by eccentric flange 554 to go through its cyclic right left motion (curve 928).

As heretofore stated the punch cam shaft 413 also carries a plurality of cams 413C adapted to operate the clutch solenoid release breakers 855, and the data punch selector, index punch selector and forward tape feed solenoid release breakers 831, and the reverse tape feed solenoid release breakers 862 at predetermined angular degrees of rotation. As seen in FIG. 50 breakers 855, 831 and 862 are normally closed when cam shaft 413 is at rest; the open and closed intervals being illustrated by curves 931, 932 and 933 respectively. As seen in FIG. 50 breakers 855 open at a time $t_5$ corresponding to 15° cam shaft rotation thereby removing plate voltage from thyratron 845 whereby after completion of 360° rotation of the cam shaft 413 the punch clutch driven member will be uncoupled.

As heretofore explained with reference to FIG. 32 the upward movement of the forward tape feed drive arm 462 rotates the actuator 477 counterclockwise. Since the pawl 482 rotatably mounted on the actuator is linked to the armature 486, which is restrained by the energized tape feed solenoid 476, it rotates relative to the actuator 477 and when the drive arm 462 reaches a position corresponding to 42° rotation of cam shaft 413 at time $t_6$ it engages with the forward feed ratchet wheel 478. Continued rotation of cam shaft 413 to 180° rotates the actuator 477 further counterclockwise causing the pawl 482 to lock with and rotate the ratchet wheel one tooth or $\frac{1}{10}$ inch. As is apparent after the pawl locks with the ratchet wheel, and while the pawl is rotating the ratchet wheel, no further relative movement of the pawl and ratchet wheel can occur.

Thereafter the armature 486 of the tape feed solenoid 476 is forcibly withdrawn from the solenoid pole piece 498. The solenoid 476 is de-energized at time $t_9$ when the cam shaft 413 reaches a position corresponding to the 165° point in its cycle at which point the release breakers 831 open thereby removing plate voltage from the tape feed thyratron 846 and the punch selector thyratrons 823. After 180° rotation of the cam shaft 413 the actuator 477 begins a clockwise rotation due to the downward motion of drive arm 462; the pawl 482 is disengaged from the ratchet wheel 478 and returned to normal by its biasing spring 488.

Referring to FIG. 36 as the punch drive arm 552 goes through a motion corresponding to 90° rotation of cam shaft 413 it causes the actuator arms 548 to rotate clockwise. The pawls 564 rotatably mounted on the pawl carrier bar 563 carried by the actuator arms move therewith thereby causing the armatures 546, through connecting links 567, to reduce the air gaps between armatures and solenoid pole pieces. When the actuator arms 548 reach a position corresponding to 90° rotation of cam shaft 413 or zero air gap position, the currents in the punch selector solenoids 544, which were selectively energized at time $t_2$, are sufficiently built up to exert proper restraining force on their associated armatures 546. Hence, as the actuator arms 548 move in a counterclockwise direction toward a position corresponding to 180° shaft rotation the energized ones of the solenoids, 1, 2, 4, 8, N, A and P restrain their respective armatures 546. The pawls 564 connected to selectively restrained armatures through associated links 567 are caused to pivot at the point of connection to the links, and since the pawls 564 are rotatably mounted on the pawl carrier bar 563 connected across the actuator arms 548 the left hand movement thereof causes the pawls to rotate relative to the actuator arms until the detents 568 thereon engage the complementary detents 588 in associated bell cranks 574. Further movement of the actuator arms 548 in a counterclockwise direction to a position corresponding to 153° shaft rotation causes the pawls to lock with associated bell cranks. At this point, time $t_8$ (curve 928), the selected punches are coupled to the actuator arms. Further motion rotates the bell cranks 574 clockwise and causes associated punches 585 to rise and perforate the tape 332 in their path over an interval corresponding to rotation of cam shaft 413 between 187° and 353°.

As is apparent after the pawls 564 lock with associated bell cranks 574 there can be no further relative movement between the actuator arms 548 and pawls 564 so that while the punches 585 are rising to complete punching as illustrated by the shaded area of curve 928 the armatures 546 associated with energized solenoids 544 are forcibly drawn away from their pole pieces thereby reestablishing air gaps, after which, when the punch drive arm 552 is in a position corresponding to 165° of cam shaft rotation (time $t_9$) the punch selector solenoids are de-energized by the opening of release breakers 831. At time $t_{10}$, corresponding to 195° rotation, release breakers 831 reclose preparatory to the next cycle.

As is apparent from FIG. 36, the counterclockwise movement of the bell cranks 574 is limited by the stop bar 584. After a punching operation, when the pawls are disengaged as a result of the movement of the actuator arms 548 back to normal position, the bell crank return springs 582 pull the punches 585 out of the tape being perforated. The pull out is assured by the bell crank limit bar 562 which, while the actuator arms are moving to normal position, engages the downwardly depending arms 577 of the bell cranks thereby forcing any bell cranks not returned by the springs to rotate counterclockwise to their normal positions.

As seen in FIG. 50 another type action may be initiated after time $t_5$, such as a time $t_7$, whereby another cycle will begin at time $t_{11}$.

Referring again to FIG. 47 the special key 196 which operates in combination with the "x" and backspace keys as heretofore stated, permits tape error correction by enabling a tape to be fed in reverse and a null code punched over the code in error. As shown in the FIG. 47 the switch assembly 195 associated with key 196 comprises movable contacts 2, 5 and 8 which are normally in contact with associated stationary contacts 1, 4 and 7 and when the special key 196 is depressed they move into contact with their other stationary contacts 3, 6 and 9 respectively. Normally then, the movable switch contact 62 associated with the "x" key is connected to the encoder x input conductor via contacts 5 and 4 of the special switch 196. The switch 82 associated with the backspace key has its movable and stationary contacts 61 and 62 connected respectively to movable contacts 2 and 8 of the special key switch assembly 195. Stationary contact 1 is connected via conductor 934 to the encoder backspace input conductor; stationary contact 3 is connected via conductor 935 to a load resistor 936 (FIG. 48); stationary contact 6 is connected to the encoder null input conductor; stationary contact 7 is connected to a negative 17.5 volt terminal 937; and stationary contact 9 is connected to the positive 17.5 volt terminal 887 (FIG. 49) via conductors 938, 891 and TW/P contacts 18 and 19 (FIG. 49). With the special key switch contacts in the position shown, actuation of an "X" or backspace key will cause an x to be typed or the typewriter to backspace, and coded signals representing an x or a backspace will fire associated thyratrons in the manner heretofore described. When however, the special key is depressed and held depressed while the backspace key is actuated, the encoder backspace input conductor will be by-passed; current flowing instead from the positive 17.5 volt terminal 887 through TW/P contacts 18–19, conductor 891, 938, special switch assembly contacts 8–9, backspace contacts 61–62, special switch assembly contacts 2–3, conductor 935 and load resistor 936. The signal developed across load resistor 936 is differentiated and the negative peaks clipped by a circuit comprising capacitor 941, diode 942, and parallel input resistor 848 and resistor 851 whereby the signals developed across the latter resistors will be applied to the grids of the reverse tape feed solenoid control thyratron 844, and the punch clutch solenoid control thyratron 845. Since the clutch release breakers and reverse tape feed release breakers 855 and 862 are closed with the cam shaft 413 at rest both thyratrons will fire and energize associated solenoids. As heretofore explained energization of solenoid 408 will cause a cam shaft cycle to start and as heretofore explained when the cam shaft 413 reaches a position corresponding to 220° rotation thereof the reverse feed ratchet wheel 516 (FIG. 33) will be engaged by the reverse feed pawl and rotated over an interval corresponding to 220° to 360° rotation of cam shaft 413 as seen in FIG. 50. Of course depression of the backspace key will cause the typewriter carriage to backspace also. If the "x" key is actuated while the special key is depressed, the encoder null input line rather than the encoder x input line will be energized with the result that coded signals representing a null will be obtained at the encoder output.

Depressing the line feed carriage return key 181 (L.F.–C.R.) closes switch 193 which is serially connected with switch 157 between a positive 100 volt terminal 943 and the key puller solenoid 321 adapted to operate the carriage return mechanism. Depressing the (L.F.–C.R.) key 181 also initiates the operation of the typewriter line feed mechanism as heretofore described. Operation of the line feed mechanism effects the closure of the line feed switch 158 through a cam 162 as heretofore described with reference to FIG. 13 whereby coded signals representative of a line feed are obtained at the encoder output. A predetermined time later the line feed operation effects the closure of the switch 157 through cam 161 as heretofore described whereby the 100 volt circuit through the carriage return key puller solenoid is completed via switches 157, 193 and conductors 944 and 945. Energization of the carriage return key puller solenoid 321 effects a carriage return operation and closes the carriage return switch contacts 61 and 62 whereby coded signals representative of a carriage return are obtained at the encoder output. The cams 161 and 162 operable by the L.F. mechanisms are so phased that the line feed function is punched in one cycle and the carriage return in a subsequent cycle.

READER TO TYPEWRITER MODE (R/TW)

Figure 54:
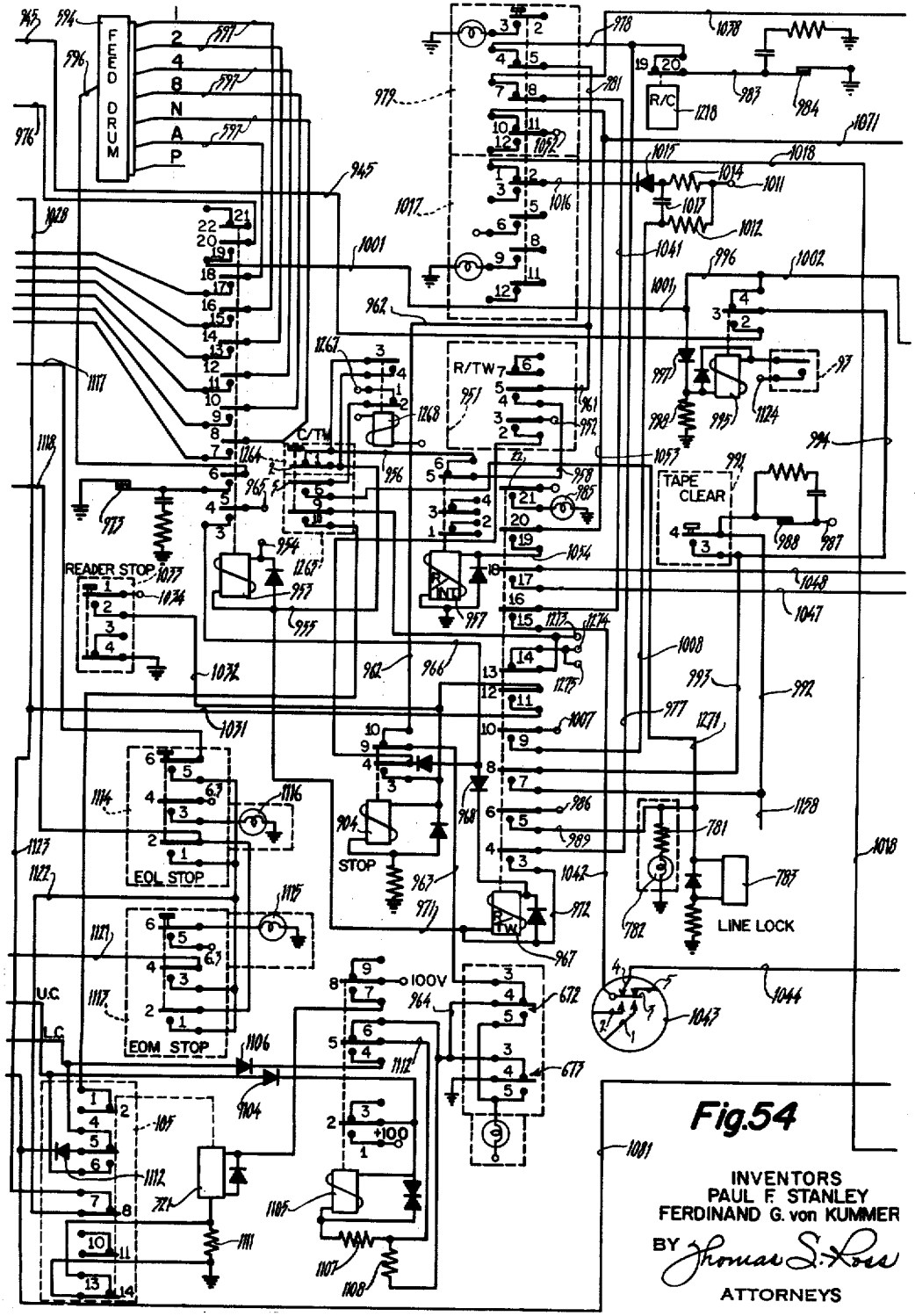

Referring to FIG. 54 depression of the R/TW button on the control panel will move the plunger of a non-latching slide switch 951 comprising movable contacts 3, 5 and 7 and associated stationary contacts 2, 4 and 6. Contacts 6 and 7 are normally closed and contacts 4–5 and 2–3 normally open. Closure of contacts 2 and 3 connects a 100 volt terminal 952 at contact 3 thereof to movable contact 4 of stop relay 904. Closure of contacts 4–5 completes a 100 volt R/TW starting circuit whereby a R/TW relay 953 is energized.

The current path is from a 100 volt terminal 954 through R/TW relay 953, conductor 955, the normally closed contacts 1 and 2 of a switch comprising stationary and movable contacts 5 and 6 and 9–10, respectively, all of which are associated with the C/TW button on the control panel, a conductor 956, the normally closed contacts 5 and 6 of a reader interlock relay 957 comprising normally closed contacts 1 and 2, and 3 and 4 over a conductor 958, through the now closed R/TW button controlled switch contacts 4 and 5, conductors 961 and 962, through the normally closed contacts 10–9 of stop relay 904, a conductor 963 to the stationary contact 3 of the form C tape tension switch 672 comprising movable contact 4 and stationary contact 5. When the tape in the reader is feeding freely the movable contact 4 will remain in the normal position shown. Hence current will flow through contacts 3 and 4 thereof, over a conductor 964 to the stationary contact 3 of the form C out of tape switch 673 comprising movable contact 4 and stationary contact 5. As long as a tape or a card to be read remains in the reader unit the movable contact 4 will be in the position shown. Hence current will flow through contacts 3 and 4 to ground.

Figure 53:
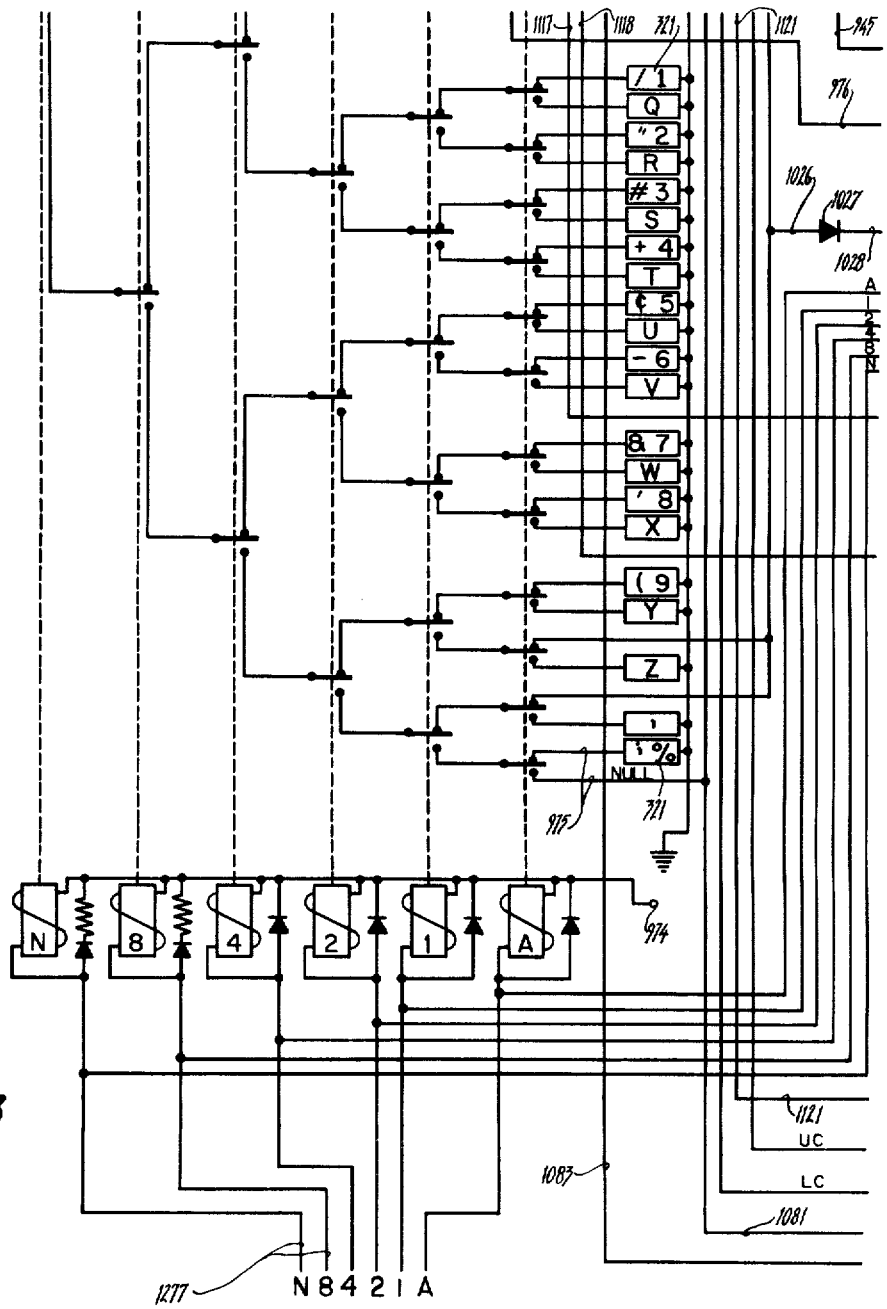

Relay 953 has a contact stack associated therewith comprising stationary and movable contacts 3–4, 5–6, 7–8, 9–10, 11–12, 13–14, 15–16, 17–18, 19–20 and 21–22, respectively. Upon energization of relay 953 the movable contacts are moved from the positions shown. Closure of contacts 3 and 4 of relay 953 connects a 100 volt terminal 965 connected to contact 4 thereof to contact 4 of the stop relay 904 via conductor 966 and a properly poled diode, and to ground through a R/TW relay 967 via conductor 966, diode 968, relay 967 and conductors 971 and 955. Conductor 955 is connected to ground through the starting circuit as traced above thereby energizing relay 967. Closure of contacts 5 and 6 of relay 953 is adapted to connect the reader common brush 596 to ground through normally closed brush interrogate breakers 973 operable by one of the cams 402C on the reader unit cam shaft 402. Closure of contacts 7–8, 9–10, 11–12, 13–14, 15–16 and 17–18 connect the 1, 2, 4, 8, N and A data readout brushes 597 which ride a tape or card to be sensed to one side of associated translator set up relays 1, 2, 4, 8, N and A (FIG. 53). As seen in FIG. 53 the other sides of the set up relays are connected to a common positive 100 volt terminal 974 whereby circuits are completed from said +100 volt source through the set up relays associated with brushes in registry with holes in the tape to be read and to ground through the feed drum 594 and brush interrogate breakers 973.

Figure 52:
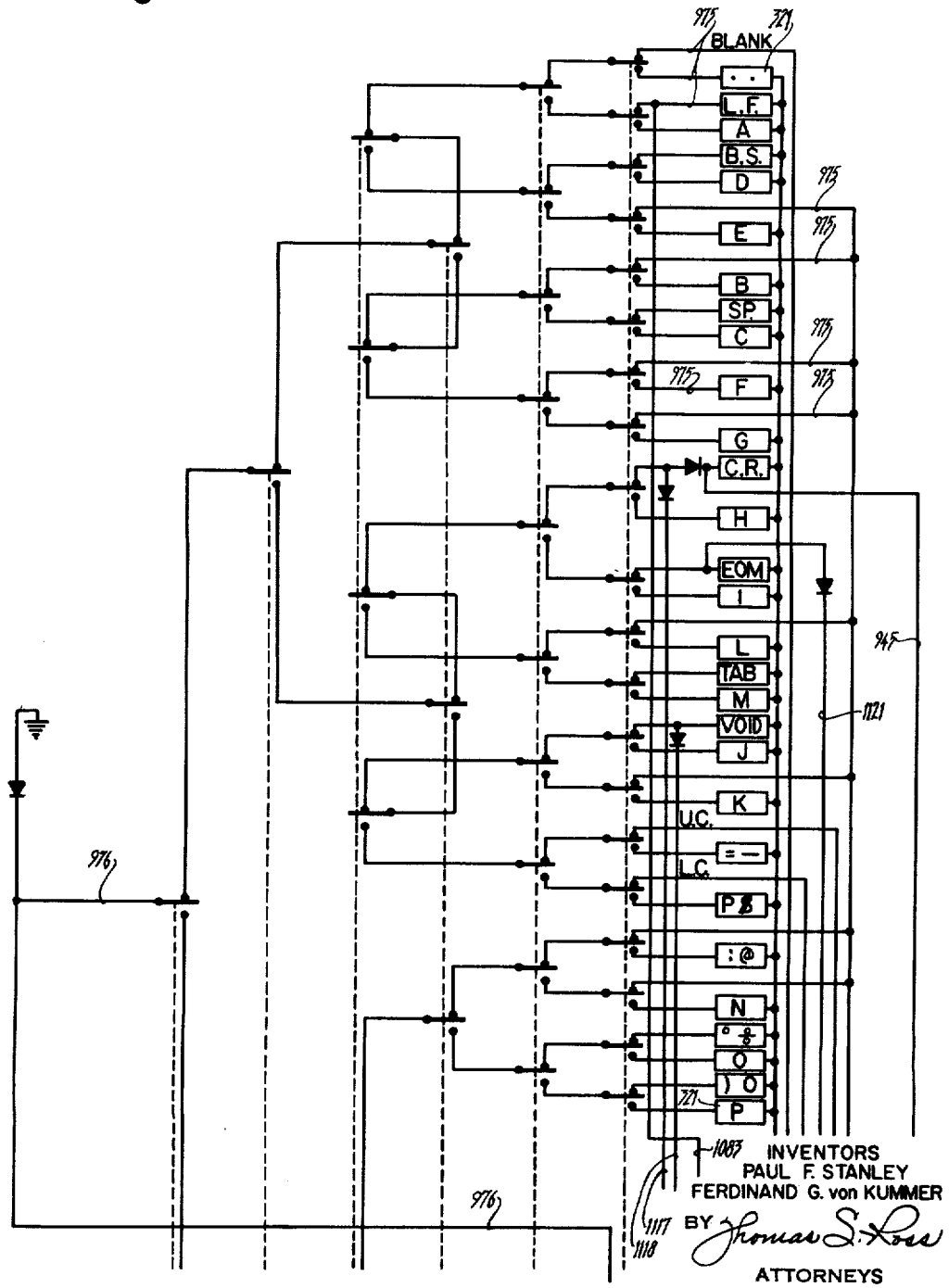

Referring more particularly to FIGS. 52 and 53 the contacts operated by the translator set up relays are connected to form a conventional relay operated six level switching tree having 64 output lines 975. As is understood in the art power applied to an input line 976 of the switching tree, via contacts 19–20 of relay 953 as will hereinafter appear, will be directed to a discrete one of the output lines 975; the particular one depending on the combination of set up relays 1, 2, 4, 8, N, A energized. In the arrangement illustrated the relays representing code levels N, 8, 4, 2, 1 and A are shown as operating 1, 2, 6, 6, 16 and 32 form C contacts respectively. Since the contact stack that may be operated by a single relay is limited by power and time consideration the 16 and 32 form C contact levels, illustratively shown as being operated by single relays, may be operated, as is understood in the art, by three and six relays respectively connected in parallel. The set up relays corresponding to predetermined code levels will be energized when an associated brush is in registry with a hole in the tape or card to be read so that all of the relays are collectively energized in accordance with the columnar hole combination passing beneath all the data readout brushes 597. While a relay switching tree is illustrated it is to be understood that other types of translators may be employed such as the printed circuit translator described and claimed in copending application Serial No. 701,579 now Pat. #2,899,676, filed December 9, 1957. As shown the majority of the output lines are connected to the key puller solenoids 321 which when energized are adapted to initiate a typewriter action as hereinbefore described. The output lines 975 associated with the carriage return key puller, EOM (*) key puller and EOL or void (Δ) key puller are in addition connected to control circuitry which will be described infra as are the upper and lower case output lines.

Referring again to FIG. 54 relay 967 has a contact stack associated therewith comprising stationary and movable contacts 3–4, 5–6, 7–8, 9–10, 11–12, 13–14, 15–16, 17–18, 19–20 and 21–22 respectively. Upon energization of relay 967 its movable contacts will move from the positions shown. Closure of contacts 3 and 4 of relay 967 connects conductors 955, 971 and 972 to ground via conductors 977 and 978, normally closed contacts 4–5 of an inching switch 979, over a conductor 981, conductor 962, normally closed contacts 9–10 of stop relay 904 and conductor 963 whereby relays 953 and 967 will remain energized upon release of the R/TW button. Conductor 978 is also connected through the normally closed contacts 19–20 of a reader to computer (R/C) relay 1218 to a conductor 983 which is adapted to be connected to ground for reasons which will hereinafter appear, through reader hold breakers 984 operable by one of the cams 402C on the reader cam shaft. Closure of contacts 21 and 22 of relay 967 lights a lamp 985 disposed beneath the R/TW button which indicates that the R/TW control circuitry is in operation and that the R/TW button may be released.

Closure of contacts 5 and 6 of R/TW relay 967 connects a positive 100 volt supply terminal 986 at contact 6 across the typewriter line lock solenoid 783 via a conductor 989 whereby operation of the typewriter from its keyboard is prevented.

Figure 55:
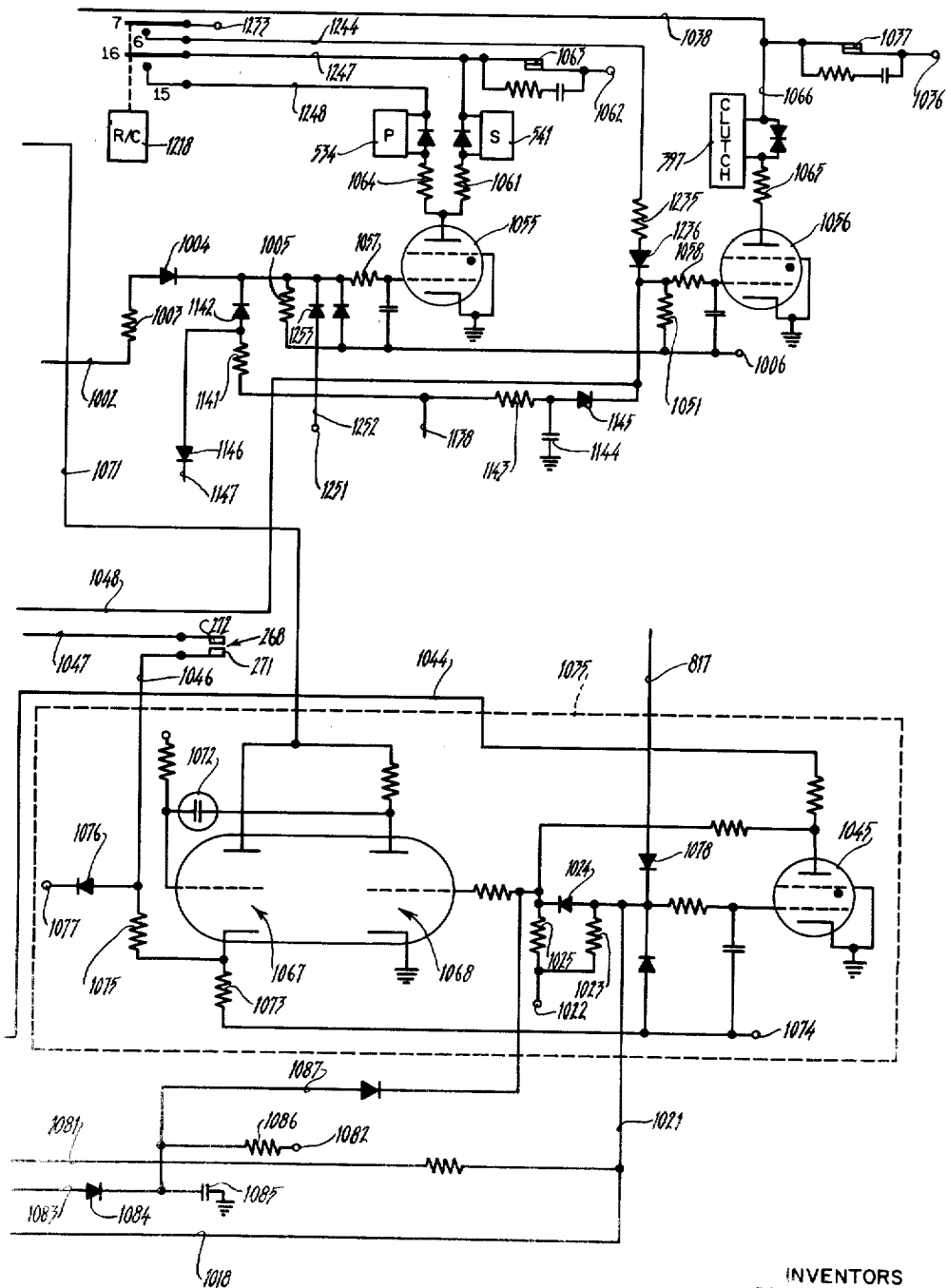

Closure of contacts 7 and 8 of R/TW relay 967 completes a circuit from a positive 100 volt supply terminal 987 connected to one of the breakers of translator interrogate breakers 988 operable by one of the cams 402C on the reader cam shaft 402, via the normally closed breakers 988 to movable contact 4 of a tape clear switch 991, a conductor 992, the now closed contacts 7–8 of relay 967, a conductor 993, contact 3 of the tape clear switch 991, a conductor 994, the normally closed contacts 3 and 4 of an interrogate block relay 995; a conductor 996 and serially a connected diode 997 and resistor 998 to ground. Conductor 996 is also connected to conductor 1001 which in turn is connected to the translator input conductor 976 via contacts 19 and 20 of R/TW relay 953. Conductor 996 is further connected via a conductor 1002 (FIGS. 54 and 55), serially connected resistor 1003, diode 1004, and resistor 1005 to a negative 100 volt source terminal 1006. When the translate interrogate breakers 988 are closed current will flow through the translator over the paths selected by set up solenoids to thereby energize a particular translator output conductor 975, and simultaneously will flow through conductor 1002 whereby a signal will be developed across resistor 1005 (FIG. 55).

Closure of contacts 9 and 10 of R/TW relay 967 connects a positive 17.5 terminal 1007 at contact 10 via conductor 1008 to a negative 17.5 volt terminal 1011 through a resistor 1012. The signal developed across resistor 1012 is differentiated and the negative spike clipped in a circuit comprising capacitor 1013, resistor 1014 and diode 1015, the resulting current pulse flowing through a conductor 1016, contacts 2 and 1 of an inching switch 1017, conductors 1018 and 1021 (FIG. 55) to a negative 17.5 volt terminal 1022 through a resistor 1023, and serially connected diode 1024 and resistor 1025 in parallel with resistor 1023 whereby signals will be developed across resistors 1023 and 1025.

Closure of contact 11 and 12 of R/TW relay 967 connects all of those translator output conductors 975 which are not utilized and which are connected to a common conductor 1026 and diode 1027 (FIG. 53) to the stop relay 904 via conductor 1028, and conductor 1031. With this connection if the hole combination in the tape corresponds to an unassigned code, i.e. a punching error, or if there has been an error in translation such that one of those translator output lines 975 not utilized is energized the stop relay 904 will pull in and open its contacts 9 and 10 whereby the R/TW relays ground return circuit will be broken and operation will stop. Stop relay 904 is also adapted to be energized via a conductor 1032 upon closure of contacts 1 and 2 of a reader stop switch 1033 comprising contacts 3 and 4. Depression of the reader stop button on the control panel closes contacts 1 and 2 of switch 1033 thereby connecting a 100 volt terminal 1034 at contact 1 thereof to the high side of stop relay 904.

Contacts 13 and 14 of R/TW relay 967 are adapted to connect ground to computer terminals as will hereinafter appear.

Closure of contacts 15 and 16 of R/TW relay 967 are adapted to connect plate voltage to the tubes comprising a delay or storage circuit 1035 (FIG. 55). As seen in FIGS. 55 and 54, a + 100 volt terminal 1036 (FIG. 55) is connected through the reader clutch solenoid release breakers 1037 operable by one of the reader cams 402C, a conductor 1038, normally closed contacts 7 and 8 of inching switch 979, conductor 1041, contacts 15 and 16 of R/TW relay 967, a conductor 1042, the normally closed contacts of a probe generator 1043, hereinafter to be described, a conductor 1044 to the plate of a thyratron 1045 in the delay circuit 1035.

Closure of contacts 17 and 18 of R/TW relay 967 connects the delay circuit output line 1046 to the −17.5 volt terminal 1006 (FIG. 55) via the periodically closed contacts 271 and 272 of the typewriter timing switch 268, conductor 1047, contacts 17–18, a conductor 1048 and a resistor 1051 (FIG. 55).

Closure of contacts 19 and 20 of R/TW relay 967 is adapted to connect a positive 100 volt supply terminal 1052 at contact 11 of inching switch 979 (FIG. 54) across the reader interlock relay 957 via the normally closed contacts 10 and 11 of inching switch 979, a conductor 1053, R/TW relay contacts 19–20 and a conductor 1054.

Referring again to FIG. 55 there is shown a reader tape feed solenoid control thyratron 1055 having a plate, a control grid and grounded cathode and a reader clutch solenoid control thyratron 1056 having a plate, control grid and grounded cathode. As is apparent the control grids are biased below the tube firing potentials through connections to the negative supply terminal 1006 via grid input resistors 1005 and 1051 and current limiting resistors 1057 and 1058 respectively. The plate of thyratron 1055 is connected through a plate load resistor 1061 and the secondary tape feed solenoid 541 to a +100 volt terminal 1062 through periodically operated tape feed release breakers 1063 operable by one of cams 402C on the reader cam shaft. The plate of thyratron 1055 is also adapted to be connected to the 100 volt terminal 1062 via breakers 1063 through a parallel plate load resistor 1064, the primary tape feed solenoid 534 and the contacts 15 and 16 of a reader to computer relay 1218 when the system is operating in a reader to computer mode whereby the primary and secondary tape feed solenoids cooperate with their associated actuators as hereinbefore described with reference to FIGS. 34 and 35 to operate the reader at 60 characters per second. The plate of the reader clutch solenoid control thyratron 1056 is connected through a plate load resistor 1065 and the reader clutch control solenoid 397 to the +100 volt terminal 1036 via conductor 1066 through clutch solenoid release breakers 1037.

The delay or storage circuit 1035 comprises in addition to thyratron 1045 triodes 1067 and 1068. The plates of triodes 1067 and 1068 are connected to terminal 1052 via normally closed contacts 10 and 11 of inching switch 979 and a conductor 1071. The connections between the elements of tubes 1045, 1067 and 1068 are as shown with the plate of thyratron 1045 resistively coupled to the grid of triode 1068, and the plate of triode 1068 coupled through a neon tube 1072 to the grid of triode 1067. The cathodes of thyratron 1045 and triode 1068 are connected to ground and the cathode of triode 1067 is connected through a cathode resistor 1073 to a —17.5 terminal 1074. The cathode of triode 1067 is also connected through a resistor 1075 to output conductor 1046 and to the anode of a clamping diode 1076 whose cathode is connected to a positive 17.5 volt terminal 1077. As will be understood triode 1068 is adapted for operation as a switch and is normally conductive and triode 1067 for operation as a cathode follower. When R/TW relay 967 is deenergized and its contacts 9 and 10 are open the delay circuit tubes are non conducting.

As seen in FIG. 55 the encoder common output conductor 817 is connected through a properly poled diode 1078 to the −17.5 volt source terminal 1022 through resistor 1023 and through series diode 1024 and resistor 1025 as are the null and blank translator output conductors 975 (FIGS. 52 and 53) via conductor 1081 and 1021. Repeat signals on case output conductors 975 are also connected to conductor 1081 via the form C contacts 4, 5 and 6 of the group of shift switches 105. The line feed translator output conductor 975 in addition to being connected to an associated key puller 321 is connected to −17.5 volt source terminal 1082 (FIG. 55) via a conductor 1083 (FIGS. 53 and 55), diode 1084, a delay circuit comprising capacitor 1085 and resistor 1086, a conductor 1087 and resistor 1025. As is apparent the grid of triode 1068 is connected across resistor 1025 and the grid of thyratron 1045 across resistor 1023.

The delay circuit comprising tubes 1045, 1067 and 1068 is operable in combination with the timing switch 268 on the typewriter power roll, hereinbefore described, to control and reduce the reader sensing rate to the optimum rate of typewriter operation. For example, the reader drive shaft speed is such that the reader senses 30 characters per second while the typewriter can operate at, for example, only 12 characters per second. The delay circuit 1035 and timing switch 268 operate to energize the reader clutch control thyratron 1056 so that it operates the reader at 12 characters per second.

*R/TW operation*

The operation of the R/TW mode will be explained with reference to the schematic diagrams 52–55 and particularly with reference to the timing diagrams shown in FIG. 56. Depression of the R/TW button on the control panel will energize R/TW relays 953 and 967 as described above with reference to FIG. 54. As shown by timing curves 1091, 1092, and 1093 on the timing diagram of FIG. 56 the reader clutch solenoid release breakers 1037, the brush interrogate breakers 973 and the reader tape feed solenoid release breakers 1063 are closed when the reader cam shaft 402 is at rest as represented by the time interval between $t_0$ and $t_1$ on the timing diagram. Also at time $t_0$ the 1, 2, 4, 8, N and A data readout brushes 597 are in registry with a column of holes in the tape to be read. Hence upon operation of the R/TW relay 953 contact stack, current will flow from the +100 volt terminal 974 (FIG. 53) through those translator set up relays and associated reader brushes in contact with the feed drum 594 through holes in the tape to be read, and to ground through the reader common brush 596 and the closed brush interrogate breakers 973. Energization of the set up relays completes a discrete path from translator input conductor 976 to one of the output conductors 975.

Upon operation of the contact stack of R/TW relay 967 current will flow from the +17.5 volt source terminal 1007 through contacts 9 and 10 thereof to negative 17.5 volt terminal 1011. The voltage developed across resistor 1012 will be differentiated by capacitor 1013 and resistor 1014 and the resulting positive pulse passed via conductors 1016, 1018 and 1021 through resistors 1023 and 1025 whereby thyratron 1045 will fire; triode 1068 remaining conductive. At the termination of the positive pulse thyratron 1045 will remain conducting and for as long as the reader clutch solenoid release breakers 1037 remain closed. The drop in plate voltage of thyratron 1045 upon conduction is effective to cut off amplifier triode 1068 only after termination of the pulse delivered over line 1018. When triode 1068 cuts off its plate voltage rises as is understood in the art, and this change is coupled to the grid of cathode follower triode 1067. Since triode 1067 is connected for operation as a cathode follower, as its grid goes positive its cathode tries to follow. The cathode however is clamped to +17.5 volts by means of diode 1076 so that the maximum voltage that can be developed across cathode resistor 1073 is +17.5 volts. With the typewriter turned on, rotation of the power roll 38 periodically closes the typewriter timing switch contacts 271 and 272 over the intervals shown by timing curve 1094; closure of contacts 271 and 272 being shown as occurring at time $t_0$ in FIG. 56. Closure of the typewriter timing switch contacts 271 and 272 impresses a signal across resistor 1051 whereby the grid of the reader clutch solenoid control thyratron 1056 rises above the cut off potential and the thyratron fires at the time $t_0$. The current (curve 1095) through the clutch solenoid 397 builds up whereby the clutch spring wraps and at time $t_1$ a cycle of the reader cam shaft 402 begins. At a time $t_2$ corresponding to 15° cam shaft rotation the reader clutch solenoid release breakers 1037 will be opened by one of the cams 402C on the reader cam shaft 402 thereby cutting off thyratron 1056 and thyratron 1045 in the delay circuit 1035. Triode 1067 will remain cut off until the clutch release breakers reclose at which time it will resume its normally conductive state. As is understood the reader cam shaft 402, if the clutch solenoid is not again reenergized, would be uncoupled after 360° rotation i.e. at time $t_{10}$. At a time $t_3$ corresponding to 25° cam shaft rotation the translator interrogate breakers 988 (FIG. 54) are closed by one of the cams 402C on the reader cam shaft 402 for a predetermined time interval as shown by curve 1096 thereby energizing the translator by connecting input conductor 976 thereof to the +100 volt source terminal 987 through the paths heretofore described. Closure of the translator interrogate breakers 988 also causes the grid of the reader tape feed thyratron 1055 to rise above cutoff potential whereby thyratron 1055 fires and the current in the secondary tape feed solenoid 541 begins to build up. At time $t_4$ corresponding to 45° cam shaft rotation however the tape feed release breakers 1063 open, cutting off thyratron 1055. During the interval between $t_3$ and $t_4$ the secondary drive arm 471, as heretofore explained with reference to FIG. 35, is ineffective to cause the reader feed drum 594 to rotate since the secondary solenoid armature 538 is not in a zero air gap position until the cam shaft 402 reaches its 180° position. Furthermore the current (curve 1097) in secondary solenoid 541 at time $t_4$ is not sufficiently built up to restrain armature 538. Current flowing through the translator energizes a key puller solenoid 321 at time $t_5$ whereby at time $t_6$ the current flowing therein (curve 1098) is sufficiently built up to effect the release of an associated pawl 36 as heretofore explained with reference to FIGS. 3 and 23. At time $t_5$ the tape feed release breakers 1063 reclose and since the translate interrogate breakers 988 are still closed thyratron 1055 refires and the current in the secondary solenoid 541 begins to build up again at time $t_5$. At the time $t_7$ corresponding to 180° of cam shaft rotation the current in solenoid 571 is sufficiently built up such that it is effective in combination with the secondary drive arm 471 to cause the feed pawl 537 to engage the reader feed drum ratchet wheel 535 whereby it will begin to rotate at a time $t_8$ corresponding to 222° in the cam shaft cycle and continue to rotate over the remainder of the cycle. After the tape begins to feed breakers 1063 open at 225° and reclose at 255° of cam shaft rotation. At time $t_7$ it will be noted that the clutch release breakers 1037 reclose for reasons which will hereinafter be apparent. At time $t_9$, the pawl 36 having dropped, it engages the power roll 38 and initiates a printing stroke;

the motion being shown by curve 1101. It is to be noted that the translator interrogate breakers 983 open at a time corresponding to 215° cam shaft rotation; the tape feed solenoid release breakers 1063 open at a time corresponding to 225° cam shaft rotation; and the brush interrogate breakers 973 open at a time corresponding to 240° cam shaft rotation. At time $t_{10}$ the reader drive shaft will come to rest and all the breakers operated by the cams 402c will be in their initial positions.

At a time $t_{11}$ the switch contacts 61 and 62 associated with the type bar actuated closes for a predetermined time interval as shown by curve 1102. As heretofore explained with reference to FIGS. 14 and 17 if a carriage return or tabulate action was initiated the interval of closure of its associated switch contacts 61 and 62 would be longer depending on the time required for the tab or carriage return operation. The signal initiated by closure of the switch contacts 61 and 62 is encoded and the signal on the common encoder output conductor 817 will maintain triode 1068 conductive and will fire thyratron 1045; plate power being supplied via the clutch solenoid release breakers 1037 reclosed at time $t_7$ in the previous cycle. As long as switch contacts 61 and 62 remain closed the encoder output conductor will remain energized and triode 1068 will remain conductive. As soon as the switch contacts 61 and 62 open triode 1068 will cut off due to the low plate potential of conductive thyratron 1045 whereby its plate voltage will rise and render cathode follower triode 1067 conductive. During the time the cathode follower remains conductive, i.e. as long as the reader clutch solenoid release breakers are closed and thyratron 1045 is conducting, the typewriter timing switch 268 will close and initiate another read cycle at time $t_{12}$ as heretofore explained. As is apparent from FIGS. 48 and 49 the signals on the encoder output lines 817 connected to the punch selecting solenoid control thyratrons 823 are ineffective to fire said thyratrons because unless the TW/P button on the control panel is depressed to place the TW/P mode in operation the grids of the thyratrons will be clamped to −17.5 volts through the action of diodes 892, as heretofore explained.

To stop the R/TW mode the reader stop button on the control panel is depressed thereby operating associated contacts 1 and 2 of switch 1033 (FIG. 54) which connect power to the stop relay 904 as heretofore stated. Energization of the stop relay breaks the normal ground return circuit of R/TW relays 953 and 967 which will drop out if a cycle has been completed. If however the normal ground connection is broken during a cycle the R/TW relays will remain energized through connection to ground via the reader hold breakers 984 over an interval sufficient to enable a cycle to be completed. As shown by curve 1103 of FIG. 56 the reader hold breakers are closed over an interval corresponding to 20°–220° cam shaft rotation.

Shift operation (R/TW)

Referring again to FIGS. 52–55 the group of form C shift switches heretofore described and generally designated by reference numeral 105 comprises stationary contacts 1, 4 and 6, 7, 10 and 13 respectively associated with movable contacts 2, 5, 8, 11 and 14 thereof; stationary contacts 3, 9, 12 and 15 which are not used are not shown. The ganged movable contacts are shown in lower case position and are operable to upper case position upon movement of the case shift segment through shift key depression or through energization of a shift key puller solenoid 321. As shown in FIGS. 53 and 54 the upper case output conductor 975 is connected to stationary contact 6 in the group of switches 105 and through a properly poled diode 1104, to the high side of a shift relay 1105 which is associated with a contact stack comprising three form C contacts i.e. 1–2–3, 4–5–6, 7–8–9, the movable contacts of which are normally in the positions shown. The lower case output conductor 975 is connected to stationary contact 4 and through diode 1106 to stationary contact 4 of the shift relay 1105. As shown in FIG. 54 the low side of the shift relay 1105 is connected to ground via resistor 1107 through parallel paths; one of which is through the normally closed contacts 5 and 6 of the shift relay 1105 and the normally closed contacts 3 and 4 of the reader out of tape switch 673, and the other of which is through a resistor 1108 and the normally closed contacts 3 and 4 of the reader out of tape switch.

The low side of the shift key puller solenoid 321 is connected directly to ground through contacts 13 and 14 of the group of switches 105, and when the shift switch is in upper case position, through a resistor 1111. As heretofore stated repeat upper and lower case signals are connected to the delay circuit via contact 5, a diode 1112, and conductor 1081.

If the typewriter segment is in lower case position as shown in FIG. 24 and an upper case code is read, the upper case output conductor 975 will be energized and current will flow over the paths described above whereby the shift relay 1105 will be energized, whereupon its contacts 7 and 8 will close and connect 100 volts at contact 8 thereof across the shift key puller solenoid 321. Energization of the shift relay also closes its contacts 1 and 2 thereby establishing a 100 volt holding circuit which maintains shift relay 1105 energized. Closure of shift relay contacts 4 and 5 conditions the shift relay for a lower case signal. Energization of the shift key puller solenoid 321 will actuate the typewriter shift mechanisms through rotation of lever 324 by pin 288 (FIG. 24) which moves the case shift segment in the typewriter and operates the movable contacts of the group of switches 105 to an upper case position thereby closing contacts 5 and 6 thereof which connects the upper case line 975 rather than the lower case line to the delay circuit whereby if a repeat upper case signal resulting from a punching error is read the delay circuit will be operative to energize the reader clutch whereby another cycle will begin and the next column of data in a tape or card will be read.

If the typewriter segment is in an upper case position and a lower case signal is read the 100 volt or lower case output line 975 will be applied through the closed contacts 4 and 5 of the shift relay 1105 to the low side of the relay via diode 1106, a conductor 1112 and resistor 1107 which will oppose the 100 volts at a contact 1 thereof connected to its high side whereby it will be deenergized. Deenergization of the shift relay 1105 causes the shift key puller solenoid 321 to be deenergized. Deenergization of the shift key puller solenoid releases pin 288 (FIG. 24) from beneath the ear 325 of lever 324 whereby the case shift mechanism is operative to move the segment back to lower case position whereby the movable contacts of the group of switches 105 are moved back to the lower case position shown. Movement of the segment also closes the shift signal switch 106 associated therewith whereby a signal is delivered to the delay circuit 1035 which operates to initiate another cycle as heretofore explained.

Line feed

When a line feed code is read the signal on the line feed output conductor 975 energizes the line feed key puller solenoid 321 which actuates the line feed mechanisms in the typewriter. Operation of the line feed mechanism closes contacts 61 and 62 of the line feed switch 158 operable by cam 162, as heretofore described, and the signal at the encoder common output conductor 817 raises the grid potentials of thyratron 1045 and amplifier 1068 whereby they are rendered conductive. As heretofore stated the signals on the encoder output lines 1, 2, 4, 8, N, A and P are ineffective to fire associated thyratrons since the grids thereof are clamped to −17.5 volts through diodes 892 as long as the TW/P relay is not energized. The signal on the encoder output conductor 817 is not of sufficient duration to maintain amplifier 1068 conductive to provide sufficient time for a line feed operation to be completed before another code is read.

The translator line feed output conductor 975 is therefor connected to conductor 1083 and the delay circuit (FIG. 55) comprising capacitor 1085 and parallel resistors 1086 and 1025 whereby amplifier 1068 will remain conductive after termination of the encoder signal pulse. As long as amplifier 1068 remains conductive the voltage at the plate of thyratron 1045 coupled to the grid of amplifier 1068 is ineffective to cut the amplifier off. After discharge of capacitor 1085, amplifier 1068 will be cut off to thereby render cathode follower 1067 conductive so that when the typewriter timing switch 268 closes the signal across the cathode resistor 1073 may be utilized to fire the reader clutch solenoid control thyratron 1056 as heretofore explained. The delay period is such that amplifier 1068 remains conductive over an interval including the next timing switch closure so that the reader clutch will not be effective to start another read cycle before completion of the line feed operation.

EOL and EOM control

As heretofore stated the EOL and EOM buttons on the control panel, if depressed and if the typewriter is in lower case position, will stop system operation whenever a carriage return, asterisk (*), or void (Δ) code is sensed.

Referring to FIG. 54 both the EOM and EOL control panel buttons are associated with latching type slide switches 1113, and 1114 respectively, comprising normally open stationary and movable contacts 1–2, 3–4, and 5–6 respectively. Contacts 5 and 6 of EOM switch 1113 are adapted to connect a 6.3 volt source across an EOM indicator lamp 1115 located beneath the control panel button and contacts 3 and 4 of EOL switch 1114 are likewise adapted to connect a 6.3 volt source across an EOL indicator lamp 1116 located beneath the control panel button. As is apparent from FIG. 52, 53 and 54 the translator carriage return output line 975 is connected via a conductor 1117 to movable contact 6 of EOL switch 1114. The translator void output line 975 is connected via a conductor 1118 to movable contact 2, of EOL switch 1114 and movable contact 2 of EOM switch 1113 and the translator asterisk or EOM output line 975 is connected via a conductor 1121 to movable contact 4 of EOM switch 1113. Also as is apparent stationary contacts 1 and 3 of EOM switch 1113 and stationary contacts 1 and 5 of EOL switch 1114 are all connected together to a common conductor 1122 which is connected to a conductor 1123 via the normally closed contacts 7 and 8 of the group of switches 105. Conductor 1123 is connected to conductor 1031 which as heretofore stated is connected to the high side of the stop relay 904 through contacts 11 and 12 of R/TW relay 967.

If the EOL and EOM buttons are depressed and their associated switches latched in closed position and a void, carriage return, or asterisk code is sensed, the stop relay will be energized and thereby open its contacts 9 and 10 which will cause the R/TW relay ground return circuit to open and R/TW operation will stop. Void (Δ) and asterisk signals are also operative in the computer to stop operation thereof when the system is in the R/C mode hereinafter to be described.

Referring again to FIG. 54 there is shown the automatic carriage return switch 93 heretofore described and operable when the carriage reaches a margin stop in a letter spacing direction. When an operator is unaware of the format of the information read from a punched tape or from a computer he will be required to set the line space control on the typewriter to the 1 position rather than the zero position whereby when the carriage returns it automatically line spaces one space as is conventional. This provision is to prevent overprinting if the margin stops have not been set in accordance with the format of the information punched in a record to be read. Upon closure of switch 93, relay 995 is energized from 100 volt terminal 1124 whereby its contacts 2 and 3 close connecting terminal 987 to conductor 945 through translate interrogate breakers 988, conductor 992, contacts 7 and 8 of R/TW relay 967, and conductors 993 and 994 whereby the carriage return key puller is energized thereby initiating a carriage return and a line feed operation.

Regen mode

Referring to FIGS. 57 and 58, it will be seen that depression of the regen button on the control panel connects the reader unit directly to the punch unit whereby information sensed from one tape or card may be used to punch another tape or card at 30 characters per second.

Depression of the regen button closes contacts 3 and 4 of a push to close, release to open regen switch 1124 associated therewith. This completes circuit connections from ground through the normally closed contacts 4 and 3 of the reader out of tape switch 673, the normally closed contacts 4 and 3 of the reader tape tension switch 672, conductor 963, normally closed contacts 9 and 10 of the stop relay 904, conductors 962, 981, the normally closed contacts 5 and 4 of the inching switch 979, conductor 978 and a conductor 1125, the now closed contacts of the regen switch 1124, a conductor 1126, normally closed contacts 1 and 2 of the reader interlock relay 957, a conductor 1127, the normally closed contacts 3 and 4 of the punch interlock relay 873, and over conductors 1128 and 1129 to the low sides of regen relays 1131 and 1132. Conductor 978 is also connected as heretofore described via the normally closed contacts 19 and 20 in a R/C relay and conductor 983 to ground through cam operated relay hold breakers 984. This connection permits a cycle to be completed by supplying a ground connection to the regen relays if the reader stop switch 1033 operable from the reader stop button is depressed during a cycle thereby energizing the stop relay 904 and breaking the normal ground return circuit of the regen relays. The high sides of the regen relays are connected to the 100 volt source terminal 866 through the normally closed contacts 4 and 3 of the punch tape tension switch 647, the normally closed contacts 4 and 3 of the card switch 732A (tape position) the normally closed contacts 4 and 3 of the preliminary out of tape switch 645 and conductors 868 and 1133.

Energization of regen relay 1132 operates its contact stack making contacts 3–4, 5–6, 7–8, 9–10, 11–12, 13–14, 15–16, 17–18, 19–20. Closure of contacts 5–6 lights the indicator lamp 1134 located beneath the control panel regen button to visually indicate that the regen mode is energized and that the regen button may be released.

Contacts 3 and 4 are connected respectively to the low sides of the regen relays and to contact 3 of the regen start switch 1124 via conductors 1135 and 1136 so that closure of contacts 3 and 4 will connect ground to the low sides of the regen relays thereby holding them energized after the regen button is released. Closure of contacts 7–8, 9–10, 11–12, 13–14, 15–16, 17–18, and 19–20 connects the data readout brushes 1, 2, 4, 8, N, A and P across the grid input resistors 824 of associated punch selector solenoid control thyratrons 823 via terminals 841 and associated rectifiers 843.

Energization of regen relay 1131 operates its contact stack comprising stationary and movable contacts 3–4, 5–6, 7–8, 9–10, 11–12, 13–14. Closure of contacts 13–14 connects a 100 volt terminal 1137 at contact 13 across the grid circuit input resistor 1005 of the reader tape feed thyratron 1055 via a conductor 1138, a resistor 1141 and a diode 1142, and across the grid circuit input resistor 1051 of the reader clutch solenoid control thyratron 1056 via conductor 1138, a resistor 1143 and parallel capacitor 1144 comprising a delay circuit and rectifier 1145; and across the grid circuit input resistor 851 of the punch clutch thyratron 845 via conductor 1138, resistor 1141, a diode 1146, and a conductor 1147, whereby the punch clutch thyratron 845 fires immediately upon closure of associated breakers 855; the reader clutch thyratron 1056 firing a predetermined interval later depending on the parameters of the delay circuit comprising circuit elements 1143, 1144 and 1051.

Closure of contacts 11–12 connects a positive 100 volt terminal 1148 at contact 11 across the reader interlock relay 957 via a conductor 1151 whereby its contacts 1–2, 3–4, and 5–6 open thereby breaking the regen starting circuit through contacts 3 and 4, as well as the R/C and R/TW starting circuits through contacts 1 and 2 and 5 and 6 respectively. This prevents operation of the other modes without first deenergizing the regen mode.

Closure of contacts 9–10 of relay 1131 connects a +100 volt terminal 1152 at contact 9 across the punch interlock relay 873 via a conductor 1153 and the conductor 886 whereby its contacts 1–2 and 3–4 open thereby breaking the regen C/P and TW/P starting circuits so that other modes requiring the punch unit may not be inadvertently energized.

Closure of contacts 5–6, 7–8 of regen relay 1131 are adapted to connect a +17.5 volt terminal 1154 through regen breakers 1155 operable by a cam 413C on the punch cam shaft 413 to the reader common brush 596 via a conductor 1156, and across the grid input resistor 852 of the punch tape feed and index punch selector solenoid control thyratron 846 via a conductor 1157.

Closure of contacts 3 and 4 of relay 1131 is adapted to connect the high sides of relays 1131 and 1132 to the positive 100 volt terminal 987 via a conductor 1158, conductor 992, contact 4 of the tape clear switch 991 and the translator interrogate breakers 988. This connection maintains the regen relays energized to enable the completion of a cycle should the 100 volt circuit normally conected thereto via conductor 868 and 1133 open during a cycle due to movement of the tape tension or preliminary out of tape switch arms 2 from their normal operative positions.

The regen mode may be stopped by depressing the reader stop button thereby closing its associated switch contacts 1 and 2. This operation energizes the stop relay 904 causing its contacts to open thereby breaking the regen relay ground return circuit; the reader hold breakers 984 providing a ground to enable the completion of a cycle.

*Regen operation*

With the punch and reader cam shafts 402 and 413 at rest, the punch and reader clutch solenoid release breakers 855 and 1037 respectively, the punch selector and tape feed solenoid release breakers 831, and the reader tape feed solenoid release breakers 1063 are closed as seen from curves 1161, 1162, 1163 and 1164 of FIG. 59.

With the regen relays 1131 and 1132 energized at time $t_0$ the 100 volt circuits completed through contacts 13 and 14 of regen relay 1131 causes the punch clutch solenoid and the reader tape feed solenoid control thyratrons 845 and 1055 to fire immediately, energizing their respective solenoids 408 and 541 as shown by current curves 1165 and 1166 respectively. Energization of the punch clutch solenoid 408 enables the punch clutch to wrap and start a punch cam shaft cycle at time $t_1$. Rotation of the punch cam shaft causes the punch and feed eccentrics as heretofore explained to follow through their motions as shown by curves 1167 and 1168.

Since the regen breakers 1155 operable by a cam 413C on the punch cam shaft 413 remain open until time $t_4$, as shown by curve 1171 the 17.5 volt circuits completed through contacts 5–6 and 7–8 of regen relay 1131 are ineffective to operatively connect the data readout brushes 597 to the punch selector solenoid control thyratrons 823 or to fire the punch feed and index solenoid control thyratron 846. At a time corresponding to 180° punch cam shaft rotation the punch clutch control thyratron, cut off by the opening of the clutch release breakers at a time corresponding to 15° rotation is again reenergized whereby the clutch is not allowed to unwrap at the end of a 360° cam shaft cycle thereby enabling the punch cam shaft 413 to continue rotation in another 360° cycle.

At time $t_4$ corresponding to 200° rotation of punch cam shaft 413 the regen breakers 1155 close whereby the +17.5 volt circuit through contacts 5–6 and 7–8 is energized and current flows from the reader common brush 596 through the feed drum 594 and through those brushes 597 in registry with holes in a tape to be regenerated which in turn are coupled to associated punch selector solenoid control thyratrons 823 via diodes 843 and grid input resistors 824 to the −17.5 volt terminals 813; the voltage developed across resistors 824 firing their associated thyratrons. Current also flows through conductor 1157 and resistor 852 to the −17.5 volt terminal 847 associated with the punch feed and index solenoid control thyratron 846 whereby the voltage developed across resistor 852 fires thyratron 846; the punch and feed solenoid release breakers 831 being closed at time $t_4$. Firing of the punch selector and feed solenoid control thyratrons will energize their associated solenoids as shown by current curve 1172. At time $t_4$ corresponding to 200° cam shaft rotation however, the punch drive arm 552 and forward feed drive arm 462 positions are such, as explained with reference to FIGS. 36 and 32 respectively that they are ineffective to cause the punch tape to feed or punches to be selected in the initial cycle. As seen from curve 1172 on the timing diagram however the selected punch and feed solenoids remain energized into the next cycle.

At time $t_1$ capacitor 1144 (FIG. 57) is sufficiently charged so that the reader clutch thyratron 1056 fires. Energization of thyratron 1056 energizes the reader clutch control solenoid 397 whereby a reader cam shaft cycle will begin at time $t_3$ and drive the reader secondary drive arm 471 (FIG. 35) through its motion as shown by curve 1173. At time $t_5$ corresponding to 45° rotation of the reader cam shaft 402 the reader feed release breakers 1063 open thereby deenergizing the secondary feed solenoid 531 at a time in the cycle such that the positions of the secondary drive arm and actuator, 471 and 536 respectively, are ineffective to cause the reader tape to feed. At a time $t_6$ corresponding to 75° rotation of the reader cam shaft, release breakers 1063 reclose and the reader feed thyratron 1055 refires whereby at a time $t_7$ corresponding to 222° of rotation of cam shaft 402 the position of the secondary drive arm 471 and actuator 536 is such that the pawl 537 connected thereto engages the ratchet wheel 535 and feeds the reader tape forward over the remainder of the cycle. After the tape begins feeding forward the feed release breakers 1063 open at a time corresponding to 225° rotation, deenergizing the feed solenoid 541; but the feeding continues over the remainder of the cycle as hereto described with reference to FIG. 35.

Also at a time $t_7$ corresponding to 42° rotation in the second punch cycle, the feed solenoid 476 energized at time $t_4$ in the previous punch cam shaft cycle is effective in combination with the forward tape feed drive arm 462 and actuator 477 (FIG. 32) to cause the punch tape to feed forward. At time $t_8$ corresponding to 153° rotation of the punch cam shaft 413 the selected punch solenoids 1177 also energized at time $t_4$ in the previous cycle in combination with the punch drive arm 542 and actuators 548 select punches 585 which thereafter are moved toward and punch the tape during the interval between $t_{10}$ and $t_{13}$ corresponding to 187° and 353° rotation of cam shaft 413.

After the punches are selected release breakers 831 open clearing the punch control thyratrons 823 and 846 at time $t_9$ corresponding to 165° rotation. At a time $t_{11}$ the release breakers 931 close again whereby, when the regen breakers 1155 close at a time $t_{12}$ the control thyratrons 123 may be selectively rendered conductive in accordance with the hole combinations of the next column beneath the reader brushes and control thyratron 846 rendered conductive preparatory to the third punch cycle. It will be apparent from the foregoing that a column sensed in one punch cycle is punched in the next and the tapes in the reader and punch are simultaneously fed.

Any tape malfunction in the reader or punch unit will as heretofore explained stop operation of the mode by breaking the circuits to the low or the high sides of the regen relays. To advance the punch tape while in the "regen" mode the tape feed button on the control panel may be depressed to close switch 895 associated therewith thereby connecting terminals 866 and 847 via contacts 3 and 4 of the tape tension switch 647, normally closed contacts 13 and 14 of the TW/P relay 877 conductors 899 and 901 and resistors 851 and 852. As heretofore explained the signals across resistors 851 and 852 will fire the clutch control and the tape feed and index punch selector control thyratrons 845 and 846.

FIG. 59 also shows the timing curves 1174 and 1175 for the translator interrogate breakers and reader hold breakers which function in this mode as described above.

Record editing

Record editing may be performed when the system is in an inching mode. In editing operations the reader, typewriter and punch units are selectively employed. As will hereinafter more clearly appear, with the system in the inching mode the R/TW control circuitry is conditioned so that to read successive columns an operator is required to repeatedly depress the R/TW mode button. If the TW/P mode is also energized successive depressions of the R/TW mode button will, in addition to printing, cause tape in the punch unit to be perforated column by column. With the system in the inching mode the tape clear control circuitry is conditioned so that the reader tape may be advanced column by column without being read by repeatedly depressing the tape clear button on the control panel. With the system in the inching mode the code buttons on the control panel visually indicate the next character to be sensed whereby an operator may act accordingly to perform editing operations such as error corrections, message deletions and/or additions.

Referring more particularly to FIG. 60 there is shown the push to latch, push to release plunger type inch switch 979 adapted to operate 4 form C contacts comprising movable contacts 2, 5, 8 and 11 and operatively associated stationary contacts 3, 4, 7, 10 and 12 respectively; stationary contacts 1, 6 and 9 not being shown, and similarly operated inch switch 1017 adapted to operate 4 form C contacts comprising movable contacts 2, 5, 8 and 11 and operatively associated contacts 1 and 3, 6, 9 and 12 respectively. The movable switch contacts are operative from the normal positions shown and latched upon depression of the inch button on the control panel to which both switch plungers are ganged. Closure of contacts 2 and 3 of inch switch 979 and 8 and 9 of switch 1017 energizes lamps 1176 and 1177 located beneath the inch button to visually indicate to an operator that the mode has been placed in operation. Opening contacts 4 and 5 of inch switch 979 breaks the regen starting circuit heretofore described with reference to FIGS. 57 and 58 thereby preventing energization of the regen relays, and also breaks the R/TW relay holding circuits heretofore described with reference to FIGS. 52–55. Opening contacts 7 and 8 of inch switch 979 breaks the line 1044 (FIG. 54) which supplies power to thyratron 1045 in the delay circuit 1035 when the R/TW mode is in operation as heretofore described.

Closure of contacts 11 and 12 of inch switch 979 connects the +100 volt terminal 1052 at contact 11 thereof via a conductor 1178 to the high side of an inch relay 1181 whose low side is connected to ground via a conductor 1182, the normally closed contacts 6–7 of the R/TW mode switch 951, a conductor 1183, and the normally closed contacts 21 and 22 of R/TW relay 953. This circuit energizes the inching relay 1181 whose contact stack effects the connection of the reader brushes 1, 2, 4, 8, N, A and P to a 6.3 volt source terminal 1184 through associated code lamps 1185 which are located beneath the control panel code buttons.

Opening contacts 10 and 11 of inch switch 979 removes power from conductors 1053 and 1071, FIG. 54, whereby the reader interlock relay circuit will be opened thereby maintaining the R/TW starting circuit through the contacts 5–6 of the reader interlock relay 957 closed for as long as the R/TW mode button is held depressed. Removal of power from conductor 1071 removes power from delay circuits tubes 1067 and 1068. As will hereinafter appear opening of contacts 10 and 11 also breaks the R/C starting circuit thereby preventing operation of this mode when the inch circuit is operative.

Opening of contacts 1 and 2 of inch switch 1017 disconnects conductor 1016 from conductor 1018 (FIG. 54) which connection as heretofore described supplied a pulse to the delay circuit 1035 to initiate R/TW operation when in the R/TW mode. Closure of contacts 2 and 3 of inch switch 1017 connects conductor 1016 to conductor 1043 via a conductor 1186 whereby, if R/TW relay 967 is energized, the current pulse developed by the differentiating circuit comprising capacitor 1013 and resistor 1014 flows through conductors 1016, 1186, 1048, and through resistor 1051 whereby the signal developed across resistor 1051 will fire the clutch solenoid control thyratron 1056.

Closure of contacts 5 and 6 of inching switch 1017 connects a 17.5 volt terminal 1187 connected to contact 6 over a conductor 1188 to contact 1 of the button controlled tape clear switch 991.

Closure of contacts 11 and 12 of inch switch 1017 connects the reader common brush 596 to ground through the brush interrogate breakers 973 whereby those brushes in contact with the feed drum 594 through holes in a tape or card will be energized and their associated lamps 1185 lighted.

As heretofore stated the inching mode is employed to correct errors in a tape or card, delete portions of a tape or card or make insertions in a tape or card.

Error correction

If a tape is found to contain an error, such as a misspelled word, an operator can insert the errored tape into the reader unit and insert a new tape in the punch unit. Then by energizing the R/TW and TW/P modes the information on the original tape will be typed and repunched. By observing the typed information the operator, upon determining that the errored portion of the tape is approaching the data readout brush station, will depress the reader stop button on the control panel thereby deenergizing the R/TW mode as described with reference to FIG. 54 which will stop but will not deenergize the TW/P mode. The operator may then depress the inching button.

With the system in the inching mode the operator may check the next character in the tape to be read by looking at the code lights and if it is correct depress the R/TW mode button and energize the R/TW mode relays. Since the R/TW relay holding circuit through contacts 4 and 5 of inch switch 979 is open, the R/TW button must be held depressed until the reader hold breakers close at a time corresponding to 20° rotation of the reader cam shaft 402, at which time the R/TW relays will be connected to ground until the reader hold breakers open at a time corresponding to 220° in the reader cycle. During this interval the column of perforations is sensed and printed as heretofore described. Operation of the typewriter will cause the information read and printed to be punched also as heretofore described. After the reader hold breakers open the R/TW mode is again deenergized requiring that the R/TW button be depressed once more to read the next column in the tape. By so operating the reader to typewriter button when in the inching mode an operator can move the reader and punch tapes one column at a time until the portion of the tape to be corrected is just before the sensing station.

To pass over the information containing the error the operator need only depress the tape clear button. Depression of the tape clear button closes contacts 1 and 2 and 3 and 4 of the switch 991 associated therewith. Closure of contacts 1 and 2 thereto connects a circuit between the +17.5 volt terminal 1187 at contact 6 of inching switch 1017 to the −17.5 volt terminal 1011. The current flowing therein is differentiated by capacitor 1013 and resistor 1014 and the current pulse resulting therefrom flows through contacts 2 and 3 of inch switch 1017, conductors 1186, and through resistor 1051 to terminal 1006. The signal developed across resistor 1051 overcomes the grid bias voltage and reader clutch solenoid control thyratron 1056 fires and thereby starts a reader cam shaft cycle.

Simultaneously closure of contacts 3 and 4 of tape clear switch 991 also completes a circuit between terminals 987 and 1006 whereby when the translator interrogate breakers 988 close current flows from terminal 987 therethrough, conductor 944, contacts 3 and 4 of the interrogate block relay 995, conductor 1002, resistor 1003, diode 1004 and resistor 1005. The signal developed across resistor 1005 fires the tape feed solenoid control thyratron 1055 whereby the reader tape will feed during the camshaft cycle as hereinbefore explained. Since the R/TW relays are not energized the reader common brush 596 is not connected to ground so that the reader tape will not be read. The tape clear button may be successively repeatedly depressed to move the reader tape past the errored word. During tape clear the punch tape remains stationary so that after clearing the word in error the operator may type and punch the correct word. After the correct word has been punched the operator may depress the inching mode thereby unlatching it so that it may return to normal position thereby enabling the remainder of the original tape to be read, printed and punched by energizing the R/TW mode. If desired, after the inching mode has been deenergized, the punch off button on the control panel may be depressed thereby to deenergize the TW/P mode after which the regen mode button may be depressed to read and punch the remainder of the tape without going through the typewriter.

*Computer modes*

The system of the instant invention is adapted to operate with a digital computer which per se does not form part of the invention. In the description of the modes which follow therefor only the manner in which the computer acts on or is acted upon by the instant apparatus necessary to an understanding thereof will be explained; it being understood that any digital computer may be employed.

*Computer to punch (C/P) mode*

In this mode information from the computer will be punched at the basic punch unit rate of 30 characters/sec.; the punch unit being cycled as will hereinafter appear by control signals from the computer. Referring again to FIG. 49 depression of the C/P button on the control panel operates an associated non-latching slide switch 1191 and completes a 100 volt circuit whereby a C/P relay 1192 is energized. The circuit is from the 100 volt terminal 866 through the normally closed contacts of the punch tape tension switch 647, through the normally closed contacts of the card switch 732A, through the normally closed contacts of the preliminary out of tape switch 645, conductor 868, normally closed contacts 1 and 2 of the punch interlock relay 873, conductor 874, contacts 2 and 3 of the button controlled C/P switch 1191, through relay 1192, a conductor 1193, normally closed contacts 8 and 9 of the interlock nullify switch 915, which is operable from the control panel interlock nullify button, a conductor 1194, and to ground through the normally closed contacts of the punch off switch 881 operable from the punch off button on the control panel.

With the C/P relay 1192 energized its contact stack is operated from the normal positions shown. Closure of contact 3 and 4 thereof will connect a 100 volt holding circuit across the C/P relay whereby it will remain energized after the C/P button on the control panel is released. Closure of contacts 5 and 6 will connect a 100 volt circuit via a conductor 1195 and conductor 886 across the punch interlock relay 873 which upon energization will open its associated contacts whereby no other mode which utilizes the punch may be energized. Closure of contacts 7 and 8 will light a lamp 1196 located beneath the C/P button on the control panel indicating that the C/P relay is energized and that the C/P button may be released.

Closure of contacts 11–12 will connect a ground via C/P ready breakers 1197 operable by one of the cams on the punch cam shaft 413 to a computer terminal 1198, said ground terminal also being connected through breakers 1197 directly to a computer terminal 1201. Closure of contacts 13–14 connects a 100 volt terminal 1202 at contact 14 via conductor 1203 across resistor 851 whereby the punch clutch solenoid control thyratron 845 (FIG. 48) will be fired each time breakers 855 close.

As heretofore stated with reference to FIG. 48 signals from the computer representing binary bits are connected to terminals 838 whereby signals developed across resistors 824 will selectively fire the punch selector solenoid control thyratrons 823. Signals from a computer terminal 1204 (FIG. 48) are also connected to the grid circuit of the tape feed and index punch selector solenoid control thyratron 846 via a conductor 1205 whereby the signals developed across resistor 852 will fire said thyratron.

Referring to FIGS. 48 and 49 and particularly to FIG. 61, depression of the C/P button on the control panel will cause the C/P relay to be energized. Closure of its contacts 13 and 14 will fire the punch clutch thyratron 845; breakers 855 being closed, thereby energizing the punch clutch solenoid 408 at times $t_0$ as shown by current curve 1206. Energization of the clutch solenoid 408 causes a punch cycle to begin at time $t_1$ with the punch drive arm and the forward feed drive arm being driven through their cyclic right-left and up-down motions respectively as shown by curves 1207 and 1208. After the C/P mode has been selected the computer may be energized. As shown on the timing diagram the C/P ready breakers are normally open and as long as they remain open a punch command flip flop in the computer remains in a state such that bit information to thyratrons 823 and tape feed thyratron firing signals to terminals 838 and 1204 are not delivered. The computer will test terminal 1198 to determine if the punch off switch is normal and the C/P relay is energized. The computer will also test terminal 871 and a terminal 1211 to determine if the punch tape tension and preliminary out of tape switches are normal, and if the computer is in an output mode rather than a compute mode, the initial closure of the computer to punch ready breakers 1197 will cause the punch command flip flop in the computer to change to a state such that bit information that will be fed to terminals 838 and a tape feed command signal (curve 1212) to terminal 1204. As shown in FIG. 61 the C/P ready breakers are closed and opened at times corresponding to 270° and 310° of cam shaft rotation as shown by curve 1213. The initial closing of these breakers is employed to assure that bit information will be delivered to the punch unit at a time in a punch cycle such that it will not be lost; thereafter only the opening or trailing edge of these breakers is employed as will hereinafter be explained. The command signal therefor will continue to be applied to terminal 1204 for as long as the computer remains in an output state or as long as tape tension is normal. Delivery of the command pulse and bit information to the tape feed thyratron and punch selector control thyratrons via terminal 1204 and terminals 838 respectively causes the feed and index solenoids 476 and 858 and selected ones of the punch selector solenoids 544 to be energized as shown by curve 1214; breakers 831 being closed at this time as shown by curve 1215. With the feed, index and punch selector solenoids energized a tape in the punch unit will be fed and perforated in the second cycle in accordance with the time sequence with reference to TW/P operation. As will be understood by those skilled in the art the reopening of the C/P ready breakers at 310° is used via terminal 1201 as a gate control within the computer for releasing the next bit information to terminals 838 whereby upon reclosure of the punch selector solenoid release breakers 831 at 195° in the second cycle selected ones of the punch thyratrons 823 will refire as will the tape feed thyratron whereby bit information will be punched in the third cycle etc.

As will be understood if the tape tension switch is not normal as determined from terminals 1211 and 871 or if the computer has released its full load and switched to a compute state the punch command flip flop will reset and command signals and bit information signals will stop.

Operation of the preliminary out of tape switch from its normal position will remove 100 volts from terminal 871 and condition circuitry within the computer so that it will stop sending bit information and command signals after counting down the number of characters that may be punched in the tape between the preliminary out of tape and final out of tape switches. As before, either of these malfunctions will light the malfunction indicator. In the C/P mode the interlock nullify and final out of tape switches are not employed. To stop the C/P mode an operator must wait until the computer has dumped a buffer load and gone into a compute state before depressing the punch off switch which drops out the C/P relay.

Reader to computer mode

Referring to FIG. 62 it may be seen that depression of the reader to computer (R/C) button on the control panel operates a non-latching switch 1216 associated therewith which is adapted to connect +100 volts across R/C relays 1217 and 1218. The current path is from the +100 volt terminal 1052 through contacts 11 and 19 of inching switch 979, conductor 1053 and in parallel via conductors 1221 and 1222 through R/C relays 1217 and 1218, conductors 1223 and 1224 respectively, and through the normally closed contacts 3 and 4 of the reader interlock relay 957, a conductor 1225, contacts 3 and 2 of R/C switch 1216, a conductor 1226, the normally closed contacts 3 and 4 of the reader tape tension switch 672, and through the normally closed contacts 3 and 4 of the reader out of tape switch 673 to ground.

Relay 1217 is associated with a contact stack comprising stationary and movable contacts 3–4, 5–6, 7–8, 9–10, 11–12, 13–14, 15–16, 17–18 and 19–20 which are operable to closed positions when relay 1217 is energized. Closure of contacts 3–4 connects contact 3 of the tape tension switch to a computer terminal 1227 whereby it will normally be at ground potential. Closure of contacts 5–6 connects a 17.5 volt terminal 1228 at contact 5 to the reader common brush 596. Closure of the remaining contacts connects a reader brush 1, 2, 4, 8, N, A and P to associated computer input terminals 1231.

Relay 1218 is associated with a contact stack having six form C contacts the movable arms of which are normally in the positions shown but operable to their other positions upon energization of relay 1218. Closure of contacts 3–4 of relay 1218 connects the low sides of R/C relays 1217 and 1218 to ground over a holding circuit comprising a conductor 1232 and the normally closed contacts 3 and 4 of reader stop switch 1033 associated with the stop button on the control panel whereby, upon release of the R/C button, relays 1217 and 1218 will remain energized. Closure of contacts 6 and 7 connects a 100 volt terminal 1233 at contact 7 to the grid of reader clutch solenoid control thyratron 1056 via a conductor 1234, resistor 1235 and diode 1236 and across the reader interlock relay 957 via conductor 1234 and a conductor 1237. Energization of the reader interlock relay breaks the R/C starting circuit as well as the starting circuits of any other mode requiring the reader i.e. R/TW and Regen. Closure of contacts 9–10 lights a 6.3 volt indicator lamp 1238 located beneath the R/C button on the control panel which indicates that the R/C relays are energized so that the R/C button may be released. Closure of contacts 12 and 13 connects ground to a computer terminal 1241 through R/C ready breakers 1242 via a conductor 1243. A computer terminal 1244 is also adapted to be connected to ground over predetermined time intervals as will hereinafter appear via conductor 1245 and the R/C sensing breakers 1246 operable by one of the cams 402C on the reader cam shaft. Closure of contacts 15–16 connects the +100 volt terminal 1062 via tape feed release breakers 1063 to the plate of the reader tape feed thyratron 1055 through the primary reader tape feed solenoid 534 via conductors 1247 and 1248. As heretofore stated the 100 volt terminal 1062 is also connected to the plate of thyratron 1055 through the relase breakers 1063 and the secondary reader tape feed solenoid 541, and the 100 volt terminal 1036 to the reader clutch thyratron 1056 through the clutch release breakers 1037 and the clutch solenoid 397.

Signals from a computer terminal 1251 are adapted to be coupled to the grid of the reader tape feed thyratron 1055 via a conductor 1252, a rectifier 1253 and resistor 1005.

R/C operation

Referring to FIG. 62 and particularly to FIG. 63, time $t_0$ represents the time at which the R/C relays are effectively energized after depression of the R/C mode button. At time $t_0$, the reader cam shaft being at rest, the reader clutch and tape feed release breakers (curves 1254 and 1255 respectively) are closed, the R/C sense or interrogate breakers (curve 1256) are open and the R/C ready breakers (curve 1257) are open. Since the reader clutch breakers 1037 are closed the reader clutch solenoid 397 is also energized at time $t_0$ and causes the drive shaft to be coupled to the reader cam shaft 402 at time $t_1$; at which time the primary and secondary drive arms 468 and 471 are caused as heretofore explained with reference to FIGS. 33 and 34 to go through their cyclic motions (curves 1258 and 1261). As with the C/P mode the computer will be provided with a read command flip flop and a mode flip flop. The computer will be conditioned to deliver tape feed command signals to the reader tape feed thyratron 1055 via terminal 1251 and to receive bit information from the reader via terminals 1231 if the mode flip flop is in an input rather than a compute state, and the command flip flop is in a true state. The command flip flop is normally in a false state until the R/C ready breakers 1242 close. Upon the initial closure of the R/C ready breakers, the signal at terminal 1241 will cause the command flip flop to switch to a true state if the R/C relay contacts 12 and 13 are closed; if the reader is not out of tape and the tape is not under tension; if contacts 3 and 4 of R/C relay 1217 are closed as determined from terminal 1227, and if the mode flip flop is in an input state. With these conditions met the read command flip flop will send a command pulse (curve 1262) to fire the tape feed thyratron 1055 via terminal 1251. As is apparent from the timing diagram the command pulse once initiated continues until the computer mode flip flop goes to a compute state or a tape malfunction occurs, either of which will switch the read command flip flop back to a false state. As seen in the timing diagram, in the first cycle the reader tape will not be fed nor will the computer be ready to receive the bit information sensed at times corresponding to 15–45° and 195–225° rotation of the cam shaft; times when the R/C sense breakers 1246 are closed. Closure of the R/C ready breakers 1242 at a time $t_2$ corresponding to 270–310°, assures that the tape feed solenoid will be energized in proper time relation to the motion of their actuators. Closure of breakers 1242 causes the reader primary and secondary feed solenoids 534 and 541 to be energized at time $t_2$ (curve 1263) and the computer to be conditioned via a signal on terminal 1241 for the reception of bit information. These solenoids remain energized into the next cycle which occurs immediately after the first cycle since the clutch breakers 1037 are reclosed at a time corresponding to 180° cam shaft rotation in the first cycle. In the second cycle now, and at a time $t_4$, the R/C sense breakers 1246 close whereby the bit information in the tape will be delivered via terminals 1231 to computer buffers. During the sense interval (15°–45°) the reader primary drive arm and actuator are so positioned as to be effective to cause the pawl 532 associated therewith, as hereinbefore described with reference to FIG. 33, to engage the ratchet wheel 528 and begin feeding the record one increment over a time interval corresponding to rotation of the reader cam shaft from 42°–180°. At a time $t_5$ corresponding to 45° the tape feed solenoid release breakers 1063 open; the primary and secondary drive arms continuing their motion, and the R/C sense or interrogate breakers 1246 open; the negative rate of change of current telling the computer via terminal 1244 to act upon the information stored and condition the computer for the next readout of the record. At time $t_6$ corresponding to 75° rotation of the tape feed release breakers close and the computer command signal again fires the tape feed thyratron 1055; the current building up so that the secondary tape feed solenoid 541 is effective to restrain its armature 538 whereby its associated pawl 537 engages and drives the tape feed ratchet wheel 535 one increment over a time interval corresponding to rotation of the reader cam shaft from 222° to 360°. As seen in the timing diagram, at a time $t_7$ corresponding to 195° rotation of cam shaft 402 the R/C sense breakers again close whereby signals read from the tape are delivered to computer terminals 1231. Any reader malfunction such as out of tape or tape tension will remove ground from computer terminal 1227 which will halt command signals to the reader tape feed control thyratron 1055 and stop reader operation. Any computer malfunction will likewise stop reader operation.

*Computer to typewriter to computer modes*

Depression of the computer to typewriter button on the control panel is operative through associated switch means to effect circuit connections whereby, depending on how the computer is programmed, coded signals initiated by operation of the typewriter will be channeled to the computer or whereby coded signals from the computer will be employed to operate the typewriter automatically.

Referring to FIG. 64 there are shown two ganged push to latch, push to release plunger type switches 1264 and 1265 respectively comprising normally closed contacts 1 and 2 and normally open contacts 3 and 4, 5 and 6, 7 and 8, and 9 and 10. Movable contacts 2, 3, 5, 7 and 9 of the switches are operative from the normal positions shown and latched upon depression of the C/TW button on the control panel.

As is apparent closure of contacts 3 and 4 and 7 and 8 will light indicator lamps 1266 and 1269 located beneath the C/TW control panel button.

Opening contacts 1 and 2 will break the R/TW starting circuit heretofore described with reference to FIGURE 54. Closure of contacts 5 and 6 will connect a 100 volt terminal 1267 via contacts 1 and 2 of a computer input relay 1268 via a conductor 1271 to the keyboard line lock solenoid 783 if relay 1268 is not energized. Closure of contacts 9 and 10 is adapted to connect the ground terminal at contact 2 of the group of shift switches 105, directly over a conductor 1272 to a computer terminal 1273, and indirectly through normally closed contacts 13 and 14 of R/TW relay 967 to computer terminals 1274 and 1275.

*Computer programmed for TW/C operation*

With the C/TW button depressed, the connections described with reference to FIG. 64 will be effected. In this mode control circuitry in the computer will test for ground on terminals 1273 and 1275 and if so found will energize TW/C input relay 1268 which will open its normally closed contacts 1 and 2 and close its normally open contacts 3 and 4. Opening contacts 1 and 2 will deenergize the line lock solenoid 783 to enable the typewriter to be operated from the keyboard. Closure of contacts 3 and 4 of relay 1268 as seen from FIGS. 54 and 64 reestablishes the R/TW starting circuit broken by the opening of the button controlled C/TW contacts 1 and 2. Also if ground is found on terminals 1273 and 1275 a flip flop in the computer is adapted to switch to a true state and condition gate circuitry. Upon receipt of a signal from the encoder common output line 817 via a conductor 1276, the gate circuitry is opened to allow the receipt of coded information from the encoder output lines 1, 2, 4, 8, N, A and P which are connected to computer terminals 837 (FIG. 48). Inasmuch as the computer may act on coded information much more rapidly that it can be typed the computer will handle information as fast as it can be typed. As seen in FIG. 48 the signals from the encoder delivered to the computer terminals 837 over conductors 814 are ineffective to operate the punch unit since junctions 893 in the grid input circuits of the punch selector solenoid control thyratrons are clamped to −17.5 volts when the TW/P relay is not energized as heretofore explained. As is obvious however by energizing the TW/P relay 877, typed information can be fed both to the computer and the punch unit i.e. a TW/P and C mode. A R/TW/P and C mode may also be accomplished by energizing the R/TW mode, the R/TW starting circuit being through contacts 3 and 4 of relay 1268. After the R/TW relays have been energized, ground is removed from computer terminals 1274 and 1275 because of the opening of R/TW relay contacts 13 and 14. Removal of ground from terminal 1274 causes control circuitry in the computer programmed for TW/C operation to release relay 1268 thereby reenergizing the line lock solenoid 783. Reader or punch unit tape malfunctioning will stop operation in the manner heretofore described.

*Computer programmed for C/TW operation*

Since the computer is capable of processing data at extremely high speeds relative to typewriter speeds, circuitry must necessarily be provided whereby information from the computer will be delivered to the typewriter at a controlled rate commensurate with its maximum rate of operation or less.

FIG. 64 shows the elements utilized when the system is operative from computer to typewriter. As shown the computer output terminals 1, 2, 4, 8, N and A, generally designed by reference numeral 1277 are connected to corresponding set up solenoids in the translator shown in FIGS. 52 and 53. As heretofore described with reference to the R/TW mode, when the translator is interrogated one of its outputs will be energized whereby a key puller solenoid is energized and operation of the typewriter is effected. Operation of the typewriter closes an associated encoder switch as heretofore described whereby a signal will be developed on the encoder common output conductor 817. The common output conductor 817 in the C/TW mode is connected to the input circuit of delay circuit tubes 1045 and 1068, as are the null, blank and line feed translator output conductors 1081 and 1083 as heretofore described.

A probe generator circuit generally designated by reference numeral 1288 is provided for operation in the computer to typewriter mode to control the release of information from the computer. The probe generator circuit comprises a relay 1281 adapted to operate a movable contact 3 associated with stationary contacts 4 and 5 and stationary contacts 1 and 2. The movable contact 3 is normally in the position shown with relay 1281 deenergized. The probe generator circuit also comprises a thyratron 1282 having a plate, control grid, shield grid and cathode. The grid is negatively biased through connection to a negative 17.5 volt terminal 1283 via a grid resistor and current limiting resistor. As shown contact 4 of relay 1281 is connected via conductor 1044 to the plate of delay thyratron 1045 as heretofore described. Contact 5 of relay 1281 is connected to the plate of probe generator thyratron 1282 through parallel paths, one including a plate load resistor 1284 and the other including relay 1281 and a second plate load resistor 1285. A capacitor 1286 is connected across relay 1281 for reasons which will hereinafter be apparent. Contact 2 of relay 1281 is connected to the translator input conductor 976 and contact 1 thereof is connected to a computer terminal 1287. As heretofore described the 100 volt terminal 1052 is connected to the grids of delay circuit tubes 1045 and 1068 via contacts 10 and 11 of inch switch 979. As shown in the FIG. 64, a computer output relay 1289 is connected to a computer terminal 1291 and is adapted when energized to operate its contacts 1 and 2, 3 and 4, 5 and 6 from the normally open positions shown.

Referring now to the C/TW timing diagram shown in FIG. 65 curves 1292 and 1293 represent the typewriter snatch roll tooth frequency and the typewriter timing switch frequency respectively; closure of the latter shown as occurring at time $t_0$. Time $t_1$ represents the time that the C/TW button is depressed and the switches thereof operated.

With the connections effected by depression of the C/TW button heretofore described and with the computer energized the computer will test for ground on terminal 1273 to determine that the typewriter segment is in a lower case position, that the C/TW mode button is depressed and that the R/TW relay is not energized. If these conditions are met and a mode flip flop in the computer is in an output rather than a compute state, at time $t_2$ as shown by curve 1294, output relay 1289 will be energized, and after the current therethrough is sufficiently built up its contacts 1 and 2, 3 and 4, 5 and 6, will close at time $t_3$. Closure of contacts 1 and 2 connects a 100 volt terminal 1295 at contact 1 thereof to movable contact 3 of the probe generator relay 1281. Closure of contacts 3 and 4 of output relay 1289 connects a 17.5 volt terminal 1296 to the grids of delay tubes 1068 and 1045 via the differentiating circuit comprising capacitor 1013 and resistor 1014 and the normally closed contacts 1 and 2 of inch switch 1017. Closure of contacts 5 and 6 connects the typewriter timing switch contacts 272 to the grid resistor of the probe generator thyratron 1282. Hence at time $t_3$ with computer output relay 1289 energized the plates of the delay circuit tubes 1067, 1068, and 1045 and the probe generator thyratron 1282 will be connected to power and a starting pulse 1297 developed across resistors 1023 and 1025 will operate the delay circuit as heretofore described. When the TW timing contacts 271 and 272 close at time $t_4$ the positive 17.5 volts developed across cathode resistor 1073 will cause the probe generator thyratron 1282 to fire. Conduction of thyratron 1282 causes current to flow through relay 1281 and to charge capacitor 1286. Energization of relay 1281 (curve 1298) pulls movable contact 3 into contact with terminals 1 and 2 at time $t_5$ thereby removing power from the plates of the probe generator thyratron 1282 and the delay circuit thyratron 1045 which will cut off. Since capacitor 1286 is very large however, relay 1281 will remain energized over an interval ($t_5$–$t_6$) required for discharge of capacitor 1286 therethrough. During the discharge interval therefor contacts 1 and 2 of relay 1281 are connected to the 100 volt terminal 1295 whereby the translator is interrogated via conductor 976 as shown by curve 1301 and the computer is probed via computer terminal 1287. The probe signal at terminal 1287 is differentiated and the pulse 1302 (FIG. 65) resulting from the differentiation of the leading edge thereof is utilized to switch a flip flop in the computer adapted to condition gate circuits to which output lines 1277 are connected. The gate circuits are adapted to be selectively opened whereby output lines 1277 are selectively grounded when bit information flip flops are set up in accordance with the information to be sent to the typewriter. The pulse 1303 resulting from differentiation of the trailing edge of the probe signal at terminal 1287 is adapted to cause the bit information flip flops to set up at time $t_6$. At time $t_5$ therefore none of the translator set up solenoids will be energized because none of the lines 1277 are grounded. The interrogate (probe) signal 1301 therefore energizes the translater blank output line over the interval $t_5$–$t_6$ as shown by the blank echo signal 1303. As heretofore stated and as shown in FIG. 64, the blank output line 1081 connects the blank echo signal 1303 to the delay circuit 1635 which operates as heretofore explained in readiness for the next typewriter timing switch closure.

At the next power roll switch closure at time $t_7$ then, the probe generator thyratron will refire, relay 1281 will pull in contract 3, and another probe or interrogate signal 1301 will be applied to the translator and to the computer. Inasmuch as the trailing edge of the initial interrogate pulse selectively set up the bit information flip flops at time $t_6$, the leading edge of the following interrogate pulse opens the gate circuits at time $t_8$ whereby computer terminals 1277 are selectively grounded at time $t_8$ thereby energizing translator set up solenoids. As is apparent a particular key puller solenoid will be energized and effective at time $t_9$ to initiate a type action (curve 1304); and upon closure of the type bar switch (curve 1305) associated therewith a signal on the encoder common output conductor 817 will be developed. The encoder output signal will set up the delay circuit to be in readiness for the next power roll switch closure at time $t_{10}$. As before the trailing edge of the interrogate pulse at time $t_9$ will set up the next character in the bit information flip flops thereby enabling lines 1277 to be selectively grounded upon receipt of the leading edge of the next interrogate pulse at time $t_{11}$.

The punch unit may also be employed with the C/TW mode whereby a C/TW/P mode will be placed into operation by depressing the TW/P button on the control panel. The circuits effected by depression of the TW/P button will be as described with reference to FIGS. 47–49. Referring again to FIG. 64 and to FIG. 49 it may be seen that closure of TW/P relay contacts 18 and 19 connects the positive 17.5 volt terminal 887 to contact 7 of the stop relay 904 so that if any punch unit tape malfunction occurs in the C/TW/P mode which will energize the stop relay 904 as heretofore described, terminal 887 will be connected to a computer terminal 1305 whereby control circuitry in the computer will stop the operation thereof.

It should be understood, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. In a data processing system including a typewriter unit and a record sensing and feeding unit, circuit means statically interconnecting said units, operator controlled means for effecting the operative interconnection of said circuit means between said units, said typewriter unit comprising means for automatically actuating the key controlled mechanisms thereof, means for initiating signals representative of said key controlled mechanisms actuated, and periodically closed timing breakers, said record sensing and feeding unit comprising cyclically operable means and record feed means operable in response to electrical feed signals and the movement of said cyclically operable means, said interconnected circuit means comprising translator means for converting signals sensed from a record into discrete electrical signals; means connecting said translator means to said means for automatically actuating the key controlled typewriter mechanism, means in said interconnected circuit means for generating a cycle initiating signal upon closure of said operator controlled switch means, means for storing said signal, said timing breakers being adapted upon closure to release said stored signal, means responsive to said released signal for initiating a cycle of said cyclically operable means, first means in said interconnected circuit means operable by said cyclically operable means for connecting and disconnecting said record sensing means to said translator at predetermined times in a cycle, second means in said interconnected circuit means operable by said cyclically operable means for interrogating said translator whereby a mechanism in the typewriter is automatically operated and for initiating a feed signal at predetermined times in a cycle whereby a record is sensed and fed in timed relation, and means in said interconnected circuit means operable in response to signals representative of automatically operated typewriter mechanism for generating another cycle initiating signal whereby subsequent data items in the record are sensed and the record is fed.

2. In a data processing system as recited in claim 1 wherein said signal storing means and said timing breakers are operable to delay the initiation of another cycle of said cyclically operable means over a time interval at least as great as that required for typewriter mechanism operation.

3. In a data processing system as recited in claim 2 wherein said signal storing means comprises a thyratron having at least a plate, grid and cathode, first and second electron discharge devices each having at least a plate, grid and cathode, means connecting signals representative of typewriter mechanisms actuated to the grid of said thyratron and said first electron discharge device whereby said thyratron is rendered conductive and said first electron discharge device is maintained conductive, means connecting the plate of said thyratron to the grid of said first electron discharge device whereby at the termination of said cycle initiating signals said first electron discharge device is cut off, and means connecting the plate of said first electron discharge device to the grid of said second electron discharge device whereby when the former is cut off the latter is rendered conductive, said second discharge device having a load device, said timing breakers being adapted to connect the signal developed across said load device to said means for initiating a cycle of said cyclically operable means.

4. In a data processing system as recited in claim 1 wherein said interconnected circuit means includes circuitry responsive to record tape malfunctions for stopping operation of said cyclically operable means.

5. In a data processing system as recited in claim 1, further comprising reader stop means normally operative to render said interconnected circuit means ineffective, and third means in said interconnected circuit means operable by said cyclically operable means for rendering said stop means ineffective during the effective part of a cycle of said cyclically operated means.

6. In a data processing system as recited in claim 1 wherein said interconnected circuit means comprises stop means adapted to break said interconnected circuit means, and operator controlled switch means for conditioning said circuit means whereby said stop means will be operative to break said interconnected circuit means when predetermined information is sensed by said record sensing unit.

7. Apparatus for controlling a typewriter and a record perforating unit in response to electrical signals representative of columnar code groupings on a record in a record sensing unit, circuit means for operatively interconnecting said units, switch means periodically operable by said typewriter power roll for cycling said record sensing unit, means responsive to signals generated by said record sensing unit for selectively operating typewriter instrumentalities, means for generating signals in response to operated instrumentalities for cycling said record perforating unit, means for conditioning said interconnected circuit means whereby the operative connection between said record sensing and typewriter units is broken after each cyclic operation of said record sensing unit, and operator controlled means for re-establishing said operative connection after each cycle of said record sensing unit whereby data is printed and perforated by said typewriter unit and said perforating unit character by character.

8. In a data processing system as recited in claim 7 comprising means for visually indicating the code grouping in the next column of information to be sensed, said means being effective after each cyclic operation of said record sensing unit.

9. In a data processing system as recited in claim 7 further comprising operator controlled switch means for controlling said conditioned interconnected circuit means whereby a record in said record sensing unit may be moved without being sensed.

10. In a data processing system having circuitry statically interconnecting and adapted to operatively interconnect a record perforating unit and a computer unit, operator controlled means for operatively connecting said circuitry between said computer unit and said record perforating unit whereby said record perforating unit will control the release of signals from and be operated by said computer unit, said perforating unit having cyclically operable means, record feeding means and record punching, means responsive to operation of said operator controlled means for initiating a cycle of said cyclically operable means, means in said circuitry adapted to condition said computer to deliver record feed and data information signals, and means responsive to said cyclically operable means for releasing tape feed and data information signals from said conditioned computer to said record perforating unit during each cycle thereof.

11. In a data processing system having circuit means statically interconnecting and adapted to operatively interconnect a record sensing unit and a computer unit, and operator controlled means comprising switch means for effecting the operative interconnection of said circuit means between said record sensing unit and said computer unit, said record sensing unit comprising cyclically operable means, first and second record feed means, and means adapted to generate signals representative of the binary information in a record, means responsive to the operation of said switch means for initiating a cycle of said cyclically operable means, means in said circuitry for conditioning said computer to deliver record feed signals, first means operable in response to operation of said cyclically operable means for enabling record feed signals from said computer to be delivered to said record feed means, means responsive to the operation of said cyclically operable means adapted to periodically connect said signal generating means to the computer, and means responsive to record feed signals and to the operation of said cyclically operable means for actuating said first and second record feed means in each cycle.

12. In a data processing system having an electric typewriter unit, a cyclically operable record sensing unit, and a cyclically operable record perforating unit, operator controlled circuit means for effecting the interconnection of said units whereby said typewriter is operable in response to signals generated by said record sensing unit from a record and said perforating unit is operable to perforate a record in response to signals generated by said typewriter, circuit means including switch means periodically operable by said typewriter unit, means for generating a signal simultaneously with the interconnection of said record sensing and typewriter units, means for storing said signal, said switch means being adapted upon closure to release said stored signal, means responsive to said released signal for cycling said record sensing unit, means for operating typewriter instrumentalities in response to signals generated by said record sensing means, means for generating control and data signals in response to actuated typewriter instrumentalities for cycling said record perforating unit thereby to record said data signals, and means connecting said control signals to said signal storage means whereby upon subsequent closures of said switch means said record sensing means is recycled.

13. In a data processing system as recited in claim 15 further comprising typewriter keyboard lock mechanism, means responsive to the interconnection of said record sensing and typewriter units for actuating said mechanism, and additional operator controlled means for disabling said interconnection between said record sensing and typewriter units whereby said lock mechanism is deactivated to permit control of said perforating unit from the typewriter keyboard.

14. In a data processing system as recited in claim 16 further comprising additional operator controlled means for disabling said typewriter and perforating unit interconnection.

15. In a data processing system having a typewriter unit and a record perforating and feeding unit, circuit means adapted to selectively interconnect said units whereby desired operations may be performed, operator controlled switch means for effecting the interconnection of said circuit means between said units, said typewriter unit including a carriage back spacing mechanism, said record perforating and feeding unit including means for feeding a record therethrough in forward and reverse directions, means in said interconnected circuit means to effect the operation of said feed means in a reverse direction, and switch means for conditioning said last named means to effect reverse feeding in response to the actuation of said carriage back spacing mechanism.

16. In a data processing system having a typewriter unit, a record sensing unit provided with cyclically operable means, with feed means adapted to be driven by said cyclically operable means when coupled thereto, and with record sensing means, and a record perforating unit provided with cyclically operable means, and with record perforating and feed means adapted to be driven by said cyclically operable means when coupled thereto, circuit means statically interconnecting said units, operator controlled means for operatively interconnecting said record sensing and perforating units and for preventing the operative interconnection of said circuit means between said record sensing and typewriter units and between said typewriter and record perforating units, means responsive to the operative interconnection of said circuit means for generating a cycle initiating signal, means responsive to said signal for initiating a cycle of said perforating unit cyclically operable means, means operative by said perforating unit cyclically operable means to connect the output of said record sensing means to said record perforating and feed means whereby they are coupled to said cylically operable means and effect the perforation of a record and feed movement thereof at predetermined times, means for initiating a cycle of said record sensing unit cyclically operable means after a predetermined time delay, and means operative by said cyclically operable means in said record sensing and perforating units to control said interconnected circuit means whereby data sensed during one perforating unit cycle is perforated in the next and said feed means in said units are simultaneously coupled to associated cyclically operable means.

17. In a data processing system including an electric typewriter unit, a record sensing unit having a cyclic operating rate greater than the operating rate of said typewriter unit, circuit means statically connecting said units, operator controlled means for operatively connecting said circuit means to enable operation of instrumentalities in said typewriter unit in response to signals issued by said record sensing unit, means for generating a start signal simultaneously with the operative connection of said circuit means, means for storing said start signal, means operative in response to the release of said signal from storage to cycle said record sensing unit whereby signals are issued to said typewriter unit, means periodically operable at a predetermined typwriter operating rate for releasing stored signals, means responsive to the operation of instrumentalities in said typewriter unit for generating control signals, and means connecting said control signals to said storage means whereby said record sensing unit may be recycled upon release of said control signals from storage.

18. In a data processing system having a typewriter unit, a continuously operating power roll for powering selected typewriter instrumentalities, switch means periodically operable by said power roll, a record sensing unit, drive means adapted to cyclically operate said record sensing unit at a rate greater than the rate of said switch means, circuit means statically interconnecting said units, operator controlled means for effecting the operative interconnection of said units and for generating a start signal, means for storing said start signal and for releasing said stored signal in response to the operation of said switch means, means responsive to said released signal for coupling said drive means to said record sensing unit, means responsive to the cycylic operation of said record sensing unit for issuing signals representative of typewriter instrumentalities thereby to operate said instrumentalities, and means responsive to operated instrumentalities for issuing recycling signals to said storage means.

19. In a data processing system having a typewriter unit adapted for manual operation and in the alternative by key puller solenoids selectively energized in response to data translated from a storage tape, means for generating signals representative of operated typewriter unit instrumentalities, and record perforating mechanism operable in response to said representative signals for recording data representative of said operative instrumentalities in a record, said typewriter unit including carriage return mechanism, line feed mechanism, and corresponding keys for manually initiating operation of said mechanisms, first switch means, a line feed-carriage return key operable when depressed to close said first switch means and to initiate operation of said line feed mechanism, said line feed mechanism including a timing cam, second switch means closable by said cam a predetermined time after initiation of said line feed operation, and circuit means including said first and second switch means for energizing a carriage return key puller solenoid when both said switches are closed thereby to initiate operation of said carriage return mechanism.

(References on following page)

References Cited by the Examiner

UNITED STATES PATENTS

| | | | |
|---|---|---|---|
| 2,335,981 | 12/43 | Watson | 234—79 |
| 2,615,629 | 10/52 | Dayger et al. | 235—61.9 |
| 2,859,851 | 11/58 | Tholstrup et al. | 197—20 |
| 2,905,299 | 9/59 | Hildebrandt | 197—20 |
| 2,964,239 | 12/60 | Whitson | 234—79 |
| 3,000,555 | 9/61 | Innes | 235—61.6 |

ROBERT C. BAILEY, *Primary Examiner.*

DARYL W. COOK, CORNELIUS D. ANGEL, LEO SMILOW, *Examiners.*